(12) United States Patent
Shimizu et al.

(10) Patent No.: US 11,578,174 B2
(45) Date of Patent: *Feb. 14, 2023

(54) POLYROTAXANE, PRODUCTION METHOD THEREFOR, AND OPTICAL COMPOSITION CONTAINING SAID POLYROTAXANE

(71) Applicant: Tokuyama Corporation, Shunan (JP)

(72) Inventors: Yasutomo Shimizu, Shunan (JP); Katsuhiro Mori, Shunan (JP); Junji Momoda, Shunan (JP); Hiromasa Yamamoto, Shunan (JP)

(73) Assignee: Tokuyama Corporation, Shunan (JP)

( * ) Notice: Subject to any disclaimer, the term of this patent is extended or adjusted under 35 U.S.C. 154(b) by 11 days.

This patent is subject to a terminal disclaimer.

(21) Appl. No.: 16/598,010

(22) Filed: Oct. 10, 2019

(65) Prior Publication Data

US 2020/0071467 A1 Mar. 5, 2020

Related U.S. Application Data

(63) Continuation of application No. 15/757,062, filed as application No. PCT/JP2016/075463 on Aug. 31, 2016, now Pat. No. 10,494,488.

(30) Foreign Application Priority Data

Sep. 3, 2015 (JP) .................................. 2015-174232
Sep. 4, 2015 (JP) .................................. 2015-175101

(51) Int. Cl.
*C08G 83/00* (2006.01)
*G02C 7/10* (2006.01)
(Continued)

(52) U.S. Cl.
CPC ........ *C08G 83/007* (2013.01); *C08B 37/0015* (2013.01); *C08G 18/242* (2013.01);
(Continued)

(58) Field of Classification Search
CPC ....... C08G 83/007; G02B 1/041; G02C 7/102
See application file for complete search history.

(56) References Cited

U.S. PATENT DOCUMENTS 10,494,488 B2 * 12/2019 Shimizu ............. C08G 18/6644
2002/0009599 A1 1/2002 Welch et al.
(Continued)

FOREIGN PATENT DOCUMENTS

CN 102046662 A 5/2011
CN 102781986 A 11/2012
(Continued)

OTHER PUBLICATIONS

Abu Bin Imran,w, Kenta Esaki, Hiroaki Gotoh, Takahiro Seki, Kohzo Ito, Yasuhiro Sakai & Yukikazu Takeoka, Extremely stretchable thermosensitive hydrogels by introducing slide-ring polyrotaxane cross-linkers and ionic groups into the polymer network,Nature Commu 5:5124 | DOI: 10.1038/ncomms6124, 2014 (Year: 2014).*
(Continued)

*Primary Examiner* — Bijan Ahvazi
(74) *Attorney, Agent, or Firm* — The Webb Law Firm

(57) ABSTRACT

The present invention provides an optical composition from which an optical article having reduced poor appearance such as cloudiness and optical strain during lens base material production can be obtained, and when a photochromic compound is added, a photochromic cured body having excellent photochromism and mechanical strength can also be formed, and a polyrotaxane used therefor. The polyrotaxane has a composite molecular structure formed of an axle molecule and a plurality of cyclic molecules clathrating the axle molecule, satisfying at least one of (X) and (Y). (X): A side chain having a secondary or tertiary hydroxyl group is introduced into at least part of the cyclic molecule of the polyrotaxane. (Y): A side chain having a group represented by -A (A is an organic group, and contains at least one
(Continued)

hydroxyl group) is introduced into at least part of the cyclic molecule of the polyrotaxane, and a pKa of the hydroxyl group of the compound represented by H-A is 6 or more and less than 14.

15 Claims, 1 Drawing Sheet

(51) Int. Cl.
| | |
|---|---|
| *G02B 1/04* | (2006.01) |
| *C09K 9/02* | (2006.01) |
| *C08G 65/04* | (2006.01) |
| *C08L 71/02* | (2006.01) |
| *C08G 18/76* | (2006.01) |
| *C08G 18/28* | (2006.01) |
| *C08G 18/24* | (2006.01) |
| *C08K 5/00* | (2006.01) |
| *C08G 18/64* | (2006.01) |
| *C08G 18/75* | (2006.01) |
| *C08G 18/71* | (2006.01) |
| *C08G 18/38* | (2006.01) |
| *C08G 18/40* | (2006.01) |
| *C08G 18/66* | (2006.01) |
| *C08B 37/16* | (2006.01) |
| *C08G 18/77* | (2006.01) |
| *C08G 81/02* | (2006.01) |
| *G02B 5/23* | (2006.01) |

(52) U.S. Cl.
CPC ......... *C08G 18/283* (2013.01); *C08G 18/288* (2013.01); *C08G 18/3876* (2013.01); *C08G 18/4018* (2013.01); *C08G 18/6484* (2013.01); *C08G 18/6644* (2013.01); *C08G 18/718* (2013.01); *C08G 18/757* (2013.01); *C08G 18/7642* (2013.01); *C08G 18/7678* (2013.01); *C08G 18/778* (2013.01); *C08G 65/04* (2013.01); *C08G 81/02* (2013.01); *C08K 5/0041* (2013.01); *C08L 71/02* (2013.01); *C09K 9/02* (2013.01); *G02B 1/04* (2013.01); *G02B 1/041* (2013.01); *G02B 5/23* (2013.01); *G02C 7/10* (2013.01); *G02C 7/102* (2013.01)

(56) References Cited

U.S. PATENT DOCUMENTS

| | | |
|---|---|---|
| 2004/0220292 A1 | 11/2004 | Momoda et al. |
| 2008/0097039 A1 | 4/2008 | Ito et al. |
| 2009/0214871 A1* | 8/2009 | Fukuda .................. C08B 33/00 428/413 |
| 2010/0230650 A1 | 9/2010 | Nagoh et al. |
| 2011/0118376 A1 | 5/2011 | Hayashi et al. |
| 2013/0015416 A1 | 1/2013 | Takenaka et al. |
| 2014/0107314 A1 | 4/2014 | Kawato et al. |
| 2014/0340727 A1 | 11/2014 | Mori et al. |
| 2016/0222285 A1* | 8/2016 | Shimizu ............... C08F 290/10 |
| 2018/0244931 A1 | 8/2018 | Mori et al. |

FOREIGN PATENT DOCUMENTS

| | | | |
|---|---|---|---|
| EP | 3330751 A1 | 6/2018 | |
| JP | 2011144338 A | 7/2011 | |
| JP | 2011178931 A * | 9/2011 | ........... C08G 65/329 |
| JP | 2011178931 A | 9/2011 | |
| WO | 01/55269 A1 | 8/2001 | |
| WO | 03/011967 A1 | 2/2003 | |
| WO | 2005/095493 A1 | 10/2005 | |
| WO | 2009/075388 A1 | 6/2009 | |
| WO | 2009/145073 A1 | 12/2009 | |
| WO | 2011/125956 A1 | 10/2011 | |
| WO | 2012/176439 A1 | 12/2012 | |
| WO | 2013/099640 A1 | 7/2013 | |
| WO | 2013/099842 A1 | 7/2013 | |
| WO | 2015/068798 A1 | 5/2015 | |

OTHER PUBLICATIONS

Jun Araki, Toshiyuki Kataoka and Kohzo Ito, Preparation of a "sliding graft copolymer", an organic solvent-soluble polyrotaxane containing mobile side chains, and its application for a crosslinked elastomeric supramolecular film, Soft Matter, 2008, 4, 245-249 (Year: 2008).*

Jun Araki et al., Polyrotaxane derivatives. I. Preparation of modified polyrotaxanes with nonionic functional groups and their solubility in organic solvents, Journal of Polymer Science Part A: Polymer Chemistry, Nov. 1, 2006, pp. 6312-6323, vol. 44, No. 21, Wiley Periodicals, Inc.

Jun Araki et al., Preparation of a 'sliding graft copolymer', an organic solvent-soluble polyrotaxane containing mobile side chains, and its application for a crosslinked elastomeric supermolecular film, Soft Matter, 2008, 4, 245-249 (Year: 2008).

* cited by examiner

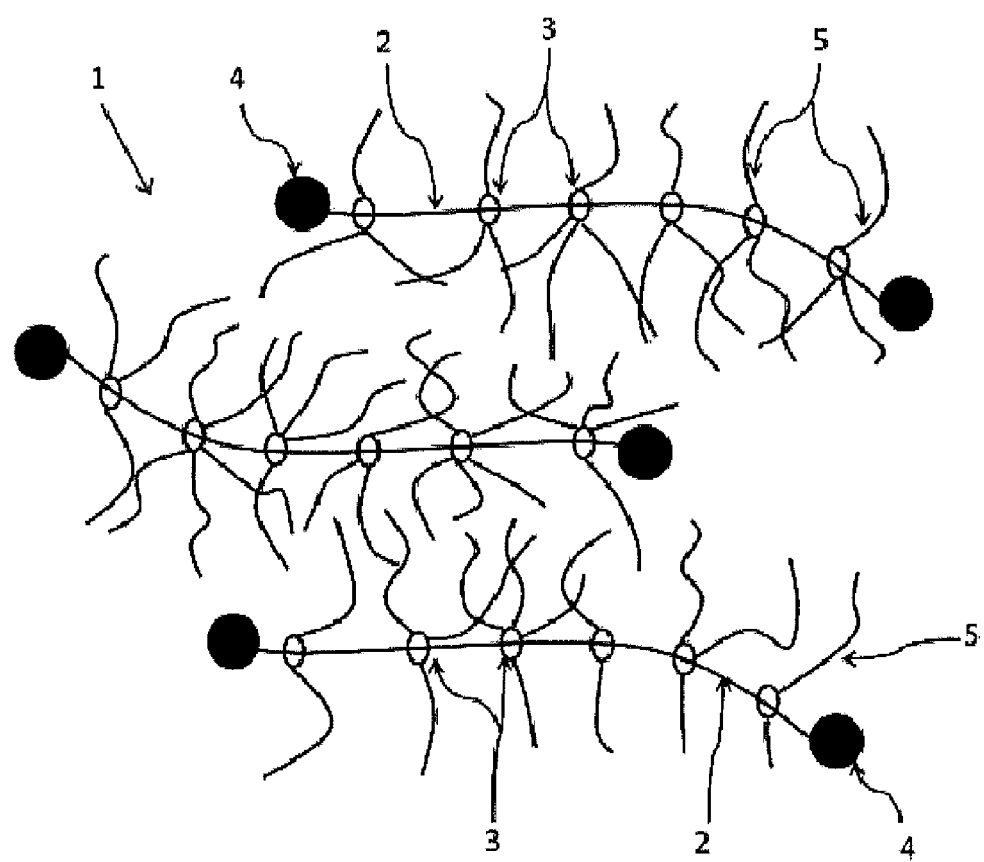

POLYROTAXANE, PRODUCTION METHOD THEREFOR, AND OPTICAL COMPOSITION CONTAINING SAID POLYROTAXANE

CROSS REFERENCE TO RELATED APPLICATIONS

This application is a continuation of U.S. patent application Ser. No. 15/757,062, filed, Mar. 2, 2018, which is the U.S. national phase of International Application No. PCT/JP2016/075463 filed Aug. 31, 2016, and claims priority to Japanese Patent Application Nos. 2015-174232 and 2015-175101, filed Sep. 3, 2015 and Sep. 4, 2015, respectively, the disclosures of all of which are hereby incorporated in their entirety by reference.

TECHNICAL FIELD

The present invention relates to a new polyrotaxane and a production method therefor, and an optical composition containing the polyrotaxane.

BACKGROUND ART

A polyrotaxane has a specific structure of having a cyclic molecule, and a straight-chain molecule threaded through the cyclic molecule in a skewered manner, and blocking groups arranged at both ends of the straight-chain molecule to prevent the cyclic molecule from being separated from the straight-chain molecule. In this polyrotaxane, the cyclic molecule can move on the straight-chain molecule relatively. Therefore, the polyrotaxane has various characteristics, particularly, excellent mechanical characteristics, and is expected to be applied and developed in various manners, and has also been used in an optical material such as a contact lens (see Patent literature 1), or the like. Meanwhile, in many optical materials, plastic lenses are used, and lighter in weight, harder to break and dyeable in comparison with inorganic lenses, and therefore have been widely used rapidly in every industrial field in recent years. One of the fields is a field of an eyeglass lens. The eyeglass lens is required to satisfy many functions such as transparency, excellent durability, easy dyeability, and resin strength enough to withstand processing, and various resin materials for lenses have been developed and used so far. Moreover, one of kinds of the eyeglass lenses is a photochromic eyeglass lens. The photochromic eyeglass lens means a material which is immediately colored in an outdoor place where the material is irradiated with light including ultraviolet rays such as sunlight to function as sunglasses, and in an indoor place where the material is not irradiated with such light, the material is faded to function as ordinary transparent eyeglasses. A demand therefor has increasingly grown in recent years.

In order to provide the optical material with photochromism, a photochromic compound is generally used in combination with a plastic material. Specifically, the following means are known: (a) a method for dissolving a photochromic compound into a polymerizable monomer, and polymerizing the resulting mixture to directly shape an optical material such as a lens, which method is called a kneading method; (b) a method for providing, on a surface of a plastic molded product such as a lens, a resin layer into which a photochromic compound is dispersed, by coating or cast polymerization, which method is called a lamination method; and (c) a method for bonding two optical sheets with an adhesive layer formed by an adhesive material resin into which a photochromic compound is dispersed, which method is called a binder method.

Incidentally, the optical material such as an optical article provided with the photochromism is further required to satisfy the characteristics as described below.

(I) A degree of coloring (initial coloring) in a visible light region before being irradiated with ultraviolet rays should be low.

(II) A degree of coloring (color optical density) upon being irradiated with ultraviolet rays should be high.

(III) A rate (color fading rate) from stopping irradiation with ultraviolet rays to return to an original state should be high.

(IV) Durability against repetitive reversible action of color development and color fading should be satisfactory.

(V) Storage stability should be high.

(VI) The optical material should be easily shaped into various shapes.

(VII) Photochromism should be provided without causing reduction of mechanical strength.

Accordingly, also upon producing the optical material having photochromism or the like by using the means (a) to (c) described above, various proposals have been made so that the requirements as described above may be satisfied. With regard to the color optical density, the color fading rate or the like, however, development of superb photochromism has been required in a current status.

For example, the kneading method described above has an advantage of capability of producing a photochromic plastic lens in bulk and at a low cost by using a glass mold, in which most of the photochromic plastic lenses are currently produced using this method.

In the kneading method, however, sufficient strength is required for a lens base material. Therefore, it is necessary to enhance mechanical strength of a matrix resin in which the photochromic compound is dispersed. Therefore, it becomes difficult to develop excellent photochromism. More specifically, a degree of freedom of molecules in the photochromic compound existing in the matrix resin is reduced, and therefore a photochromic reversible reaction is adversely affected.

With regard to such a kneading method, for example, Patent literature 2 describes a technique on adding a photochromic compound to a monomer composition containing an isocyanate monomer and a thiol monomer. Moreover, Patent literature 3 discloses a photochromic curable composition containing a specific (meth)acrylic polymerizable monomer and a photochromic compound.

Photochromic lenses shaped by allowing polymerization curing of these compositions, however, are unsatisfactory in view of photochromic characteristics, while the mechanical strength is high.

On the other hand, in the lamination method or the binder method, the photochromism is developed in a thinner layer formed on surfaces of various base materials in comparison with the kneading method described above. Therefore, in order to develop the color optical density equivalent to the density according to the kneading method, the photochromic compound is required to be dissolved thereinto with a high concentration. In the above case, such problems have remained as insufficiency of solubility and occurrence of precipitation during storage depending on a kind of the photochromic compound. Moreover, the layer in which the photochromism is developed is thin, and therefore durability of the photochromic compound has been deteriorated in several cases.

For example, Patent literature 4 discloses a method for coating a photochromic curable composition on a plastic lens by spin coating or the like to allow photocuring of the resulting material to form a photochromic coating layer (This lamination method is also called a coating method).

Moreover, Patent literature 5 discloses a method for forming a photochromic layer by securing a space between a plastic lens and a glass mold by using a member such as an elastomer gasket, a pressure-sensitive adhesive tape or a spacer, and flowing a photochromic curable composition into the space to allow polymerization curing thereof (hereinafter, also called two-step polymerization method).

Further, Patent literature 6 discloses a production method for a laminated sheet prepared by bonding a transparent carbonate sheet therewith by a polyurethane resin adhesive layer containing a photochromic compound (binder method).

Also in all the methods in Patent literature 4 to 6, however, the photochromism is developed in the thin layer in which the photochromic compound is blended. Therefore, when the photochromic compound having low solubility is used, the color optical density tends to be reduced, and further the durability of the photochromic compound has been also deteriorated in several cases.

Patent literature 7 discloses a lamination method for forming a photochromic coating layer by coating a photochromic urethane curable composition composed of polyol, isocyanate and the like on a plastic lens by spin coating or the like to allow thermal curing thereof. Also in this method, however, sufficient color optical density is unable to be secured.

As an art for solving the problems described above, Patent literature 8 discloses a photochromic composition consisting of a polyrotaxane having a composite molecular structure formed of an axle molecule and a plurality of cyclic molecules clathrating the axle molecule, and having a side chain containing a hydroxyl group in a part of the cyclic molecule, a polyisocyanate monomer and a photochromic compound. In the photochromic composition, both high mechanical strength caused by a urethane bond by incorporating the polyrotaxane thereinto, and excellent photochromism (color optical density and a color fading rate) by existence of a free space formed by bonding of the polyrotaxane to a part of the polyurethane are satisfied (see Patent literature 8).

PATENT LITERATURE

Patent literature 1: WO 2005/095493 A
Patent literature 2: WO 2012/176439 A
Patent literature 3: WO 2009/075388 A
Patent literature 4: WO 2011/125956 A
Patent literature 5: WO 2003/011967 A
Patent literature 6: WO 2013/099640 A
Patent literature 7: WO 2001/055269 A
Patent literature 8: WO 2015/068798 A Patent literature 8 above describes evaluation results indicating a level having substantial no problem on moldability (optical strain and cloudiness). When an evaluation with higher accuracy is conducted, however, the moldability has become insufficient in several cases. Moreover, when various lens shapes have been evaluated in a similar manner, in particular, a problem of moldability has become significant in the case of a thick lens, and room for further improvement has remained.

SUMMARY OF THE INVENTION

Accordingly, an object of the present invention is to provide an optical composition from which an optical article having reduced poor appearance such as cloudiness and optical strain during producing a lens base material can be obtained, and when a photochromic compound is added thereto, a photochromic cured body having good photochromism and mechanical strength in addition thereto can be formed, and an object of the present invention is also to provide a production method therefor, and a new polyrotaxane used for the optical composition.

The present inventors have diligently continued to conduct study in order to solve the problems described above. As a result, the present inventors have found out that, when a polymerizable group reacting with an iso(thio)cyanate group of a polyrotaxane is a primary hydroxyl group, reactivity with the iso(thio)cyanate group is excessively high, and therefore poor performance is easily caused. Moreover, the present inventors have found that the poor performance is caused in many cases, when a pKa of a compound having a hydroxyl group corresponding to an organic group having the hydroxyl group is less than 6 or 14 or more. The present inventors have found out that, when the pKa of the hydroxyl group reacting with the iso(thio)cyanate group of the polyrotaxane is 14 or more, the reactivity with the iso(thio)cyanate group is excessively high, and therefore the poor performance is easily caused. More specifically, the present inventors have obtained findings in which, if one molecule of the polyrotaxane has a high molecular weight of several hundred thousands or more, and therefore viscosity of the optical composition becomes high, and the reaction heterogeneously progresses, phase separation with other monomers is easily caused, and poor moldability is easily caused. Moreover, the present inventors have obtained findings in which, in the case of the hydroxyl group the pKa of which is less than 6, the reactivity with the iso(thio)cyanate is excessively low, and therefore the hydroxyl group exists in the form of an unpolymerized monomer, and thus the reaction heterogeneously progresses, and the phase separation and the poor moldability are easily caused.

More specifically, if the reactivity is excessively high upon obtaining the optical article such as the plastic lens, a polymerization reaction locally progresses and a molded body becomes heterogeneous, and therefore a stria causing the optical strain is conceivably formed. Moreover, when the polymerization is unable to be controlled and a large quantity of polymerization heat that does not follow polymerization conditions is produced, the stria is conceivably formed also by occurrence of convection. Further, the present inventors have found that the polymerization reaction locally progresses and the molded body becomes heterogeneous, and therefore a polyrotaxane-rich oligomer is formed, and the phase separation is caused by such an oligomer, and thus cloudiness is caused.

Accordingly, as one aspect for reducing the reactivity, the present inventors have succeeded in solving such problems by using a new polyrotaxane having a secondary or tertiary hydroxyl group in a side chain introduced into a cyclic molecule to reduce the reactivity of the polyrotaxane with iso(thio)cyanate, and have completed the present invention.

Moreover, as another aspect for reducing the reactivity, the present inventors have succeeded in solving such problems by using a new polyrotaxane having a hydroxyl group a pKa of which is 6 or more and less than 14 in a side chain introduced into a cyclic molecule to reduce the reactivity of the polyrotaxane with iso(thio)cyanate, and also to keep the polyrotaxane reactable with the iso(thio)cyanate, and have completed the present invention.

More specifically, the present invention relates to a polyrotaxane having a composite molecular structure formed of an axle molecule and a plurality of cyclic molecules clathrating the axle molecule, and satisfying at least one of requirements (X) and (Y), and also relates to a production method therefor and an optical composition containing the polyrotaxane:

requirement (X): a side chain having a secondary or tertiary hydroxyl group is introduced into at least part of the cyclic molecule of the polyrotaxane; and requirement (Y): a side chain having a group represented by the following formula (1):

$$-A \qquad (1)$$

(where, A is an organic group having 1 to 10 carbon atoms and contains at least one hydroxyl group) is introduced into at least part of the cyclic molecule of the polyrotaxane; and a pKa of a hydroxyl group of a compound represented by the following formula (2):

$$H-A \qquad (2)$$

is 6 or more and less than 14.

An optical composition in which a polyrotaxane satisfying at least one of requirements (X) and (Y) is used as the polyrotaxane to suppress moldability and cloudiness, as indicated in Examples described later. Thus, an optical article having good moldability and high mechanical strength can be produced with a sufficient yield. Further, upon adding a photochromic compound to the optical composition to produce a photochromic lens, the photochromic lens also having excellent photochromism (color optical density and a color fading rate) can be produced.

In the present invention, the polyrotaxane satisfying the requirement (X) is used to reduce the reactivity with the iso(thio)cyanate in comparison with a primary hydroxyl group. Thus, polymerization can be controlled and the moldability and the cloudiness described above can be suppressed. Further, the polyrotaxane has the side chain. Thus, a crosslinking structure can be formed, and excellent mechanical strength can be obtained as well.

In the present invention, the polyrotaxane satisfying the requirement (Y) is used to suppress the reactivity with the iso(thio)cyanate. Thus, a rate of polymerization can be adjusted and the moldability and the cloudiness described above can be suppressed. Further, the polyrotaxane has the side chain. Thus, the crosslinking structure can be formed, and therefore the excellent mechanical strength can be obtained as well.

Further, also upon adding the photochromic compound thereto to produce a photochromic optical article, excellent photochromic characteristics can be developed by using the polyrotaxane according to the present invention. More specifically, the cyclic molecule of the polyrotaxane is formed to be slidable on the axle molecule. Therefore, a space is formed around the cyclic molecule. A reversible structural change of the photochromic compound is immediately caused by this space. As a result, the color fading rate and the color optical density are improved. Further, the reversible structural change of the photochromic compound existing in the vicinity of a highly flexible side chain can be further immediately caused by introducing the cyclic molecule in which the side chain is introduced thereinto.

BRIEF DESCRIPTION OF THE DRAWINGS

FIG. 1 is a schematic diagram showing a molecular structure of a polyrotaxane used in the present invention.

DESCRIPTION OF THE INVENTION

A polyrotaxane according to the present invention has a composite molecular structure formed of an axle molecule and a plurality of cyclic molecules clathrating the axle molecule, and satisfies at least one of requirements (X) and (Y); moreover, an optical composition according to the present invention contains the polyrotaxane according to the present invention:

requirement (X): a side chain having a secondary or tertiary hydroxyl group is introduced into at least part of the cyclic molecule of the polyrotaxane; and requirement (Y): a side chain having a group represented by the following formula (1):

$$-A \qquad (1)$$

(where, A is an organic group having 1 to 10 carbon atoms and contains at least one hydroxyl group) is introduced into at least part of the cyclic molecule of the polyrotaxane; and a pKa of a hydroxyl group of a compound represented by the following formula (2):

$$H-A \qquad (2)$$

is 6 or more and less than 14.

Hereinafter, each component structuring the present invention will be described.

In addition, unless otherwise specified herein, as described above, the pKa of the hydroxyl group refers to the pKa of the hydroxyl group when a compound H-A represented by the formula (2) is formed by substituting, for hydrogen, an atom in a bonding site at which the group represented by the formula (1) in the polyrotaxane according to the present invention is bonded with the side chain.

In addition, the polyrotaxane having the composite molecular structure formed of the axle molecule and the plurality of cyclic molecules clathrating the axle molecule and satisfying the requirement (X) is also described as the polyrotaxane according to Aspect I; and the polyrotaxane having the composite molecular structure formed of the axle molecule and the plurality of cyclic molecules clathrating the axle molecule and satisfying the requirement (Y) is also described as the polyrotaxane according to Aspect II. Moreover, the polyrotaxane according to the present invention is also described as the polyrotaxane (A).

As shown in FIG. 1, the polyrotaxane is shown by "1" as a whole. A polyrotaxane molecule has a composite molecular structure formed of a chain axle molecule "2" and a cyclic molecule "3". More specifically, a plurality of cyclic molecules "3" clathrates the chain axle molecule "2" and the axle molecule "2" threads through an inside of a ring of the cyclic molecule "3". Accordingly, the cyclic molecule "3" can freely slide on the axle molecule "2", but bulky end groups "4" are formed at both ends of the axle molecule "2", in which the cyclic molecule "3" is prevented from being dethreaded from the axle molecule "2".

As described above, such a cyclic molecule "3" of the polyrotaxane is formed to be slidable on the axle molecule "2". Therefore, when a photochromic cured body including the photochromic compound is produced, a space is formed around the cyclic molecule, and a reversible structural change of the photochromic compound is immediately caused by this space. As a result, a color fading rate and color optical density are improved.

<Polyrotaxane in which a Side Chain Having a Secondary or Tertiary Hydroxyl Group is Introduced into at least Part of a Cyclic Molecule (Polyrotaxane According to Asptect 1)>

In the polyrotaxane according to Aspect 1, a side chain "5" having a secondary or tertiary hydroxyl group is introduced into at least part of a cyclic molecule.

Moreover, in the present invention, the polyrotaxane may have a primary hydroxyl group, in addition to the secondary or tertiary hydroxyl group, in the side chain. From a viewpoint of moldability, however, when the total mole number of the primary, secondary, and tertiary hydroxyl groups in the side chain is taken as 100%, a proportion of the primary hydroxyl group is preferably 50% or less.

In the polyrotaxane according to Aspect 1, such a side chain "5" having the secondary or tertiary hydroxyl group is introduced into the ring to facilitate to react the iso(thio)cyanate compound, while the polymerization with the iso(thio)cyanate compound or the like is controlled, to be described later, and an optical article having improved moldability can be obtained. Moreover, a proper space can be further reliably formed between adjacent axle molecules, a clearance in which a reversible reaction of the photochromic compound molecule is allowable can be reliably secured, and excellent photochromism can be conceivably developed. Further, such a side chain "5" causes formation of a crosslinking structure in the polyrotaxane. Thus, mechanical strength of the photochromic cured body formed using the optical composition according to the present invention can be improved.

<Polyrotaxane in which a Side Chain Having a Group Represented by the Formula (1), a pKa of a Hydroxyl Group Being 6 or More and Less than 14, is Introduced into at Least Part of an End of the Side Chain of a Cyclic Molecule (Polyrotaxane According to Aspect II)>

In the polyrotaxane according to Aspect II, in which a side chain "5" being characterized in that the side chain having the group represented by the formula (1), the pKa of the hydroxyl group being 6 or more and less than 14, is introduced thereinto is introduced into at least part of the cyclic molecule.

Moreover, in the present invention, the polyrotaxane may have the hydroxyl group the pKa of which is less than 6 or 14 or more in the side chain. From the viewpoint of the moldability, however, when the total mole number of the hydroxyl groups in the side chain is taken as 100%, a proportion of the hydroxyl group the pKa of which is less than 6 or 14 or more is preferably 50% or less.

In the polyrotaxane according to Aspect II, such a side chain "5" having the hydroxyl group the pKa of which is 6 or more and less than 14 is introduced into the ring to facilitate to react the iso(thio)cyanate compound, while the polymerization with the iso(thio)cyanate compound is controlled, to be described later, and the optical article having improved moldability can be obtained. Moreover, the proper space can be further reliably formed between the adjacent axle molecules, the clearance in which the reversible reaction of the photochromic compound molecule is allowable can be reliably secured, and the excellent photochromism can be conceivably developed. Further, such a side chain "5" causes formation of the crosslinking structure in the polyrotaxane. Thus, the mechanical strength of the photochromic cured body formed using the optical composition according to the present invention can be improved.

In the polyrotaxane according to the present invention, as the axle molecule, various materials can be used. For example, a chain portion may have a straight chain or branched chain, as long as the chain portion can thread through the ring of the cyclic molecule, and is generally formed of a polymer.

Specific examples of the polymer that forms such a chain portion of the axle molecule include: polyvinyl alcohol; polyvinyl pyrrolidone; a cellulose-based resin (such as carboxymethyl cellulose, hydroxyethyl cellulose and hydroxypropyl cellulose); polyacrylamide; polyethylene oxide; polyethylene glycol; polypropylene glycol; polyvinyl acetal; polyvinyl methyl ether; polyamine; polyethyleneimine; casein; gelatin; starch; an olefin-based resin (such as polyethylene and polypropylene); polyester; polyvinyl chloride; a styrene-based resin (polystyrene and an acrylonitrile-styrene copolymer resin); an acrylic resin (such as poly(meth)acrylate, polymethyl methacrylate, polymethyl acrylate and an acrylonitrile-methyl acrylate copolymer resin); polycarbonate; polyurethane; a vinyl chloride-vinyl acetate copolymer resin; polyvinyl butyral; polyisobutylene; polytetrahydrofuran; polyaniline; an acrylonitrile-butadiene-styrene copolymer (ABS resin); polyamide (such as nylon); polyimide; polydiene (such as polyisoprene and polybutadiene); polysiloxane (such as polydimethylsiloxane); polysulfone; polyimine; polyacetic anhydride; polyurea; polysulfide; polyphosphazene; polyketone; polyphenylene; and polyhaloolefin. These polymers may be appropriately copolymerized or may be modified.

A preferred material as the polymer that forms the chain portion in the present invention include: polyethylene glycol; polyisoprene; polyisobutylene; polybutadiene; polypropylene glycol; polytetrahydrofuran; polydimethylsiloxane; polyethylene; polypropylene; polyvinyl alcohol; or polyvinyl methyl ether, and most preferably polyethylene glycol.

Further, the bulky groups to be formed at both ends of the chain portion are not particularly limited, as long as the group prevents the cyclic molecule from being dethreaded from the axle molecule. From a viewpoint of bulkiness, however, specific examples thereof can include an adamantyl group, a trityl group, a fluoresceinyl group, a dinitrophenyl group and a pyrenyl group. In particular, in view of ease of introduction, specific examples thereof can include an adamantyl group.

A molecular weight of the axle molecule described above is not particularly limited, but if the molecular weight is excessively large, compatibility with other components tends to be deteriorated, and if the molecular weight is excessively low, mobility of the cyclic molecule tends to be reduced and the photochromism tends to be reduced. From such a viewpoint, a weight average molecular weight (Mw) of the axle molecule is in the range preferably from 1,000 to 100,000, particularly from 5,000 to 80,000, and particularly preferably from 10,000 to 50,000.

Moreover, the cyclic molecule has a ring having a size capable of clathrating the axle molecule as described above, and specific examples of such a ring can include a cyclodextrin ring, a crown ether ring, a benzocrown ring, a dibenzocrown ring and a dicyclohexanocrown ring, and a cyclodextrin ring is particularly preferable.

In addition, the cyclodextrin ring has an α-form (ring inner diameter: 0.45 to 0.6 nm), a β-form (ring inner diameter: 0.6 to 0.8 nm) and a γ-form (ring inner diameter: 0.8 to 0.95 nm). In the present embodiment, however, an α-cyclodextrin ring and a γ-cyclodextrin ring are particularly preferable, and an α-cyclodextrin ring is most preferable.

With regard to the cyclic molecule having the ring as described above, a plurality of the cyclic molecules clathrate one axle molecule. In general, when the maximum clathration number of the cyclic molecules which can form clathration per one axle molecule is taken as 1, the clathration number of the cyclic molecules is in the range preferably from 0.001 to 0.6, further preferably from 0.002 to 0.5, and still further preferably from 0.003 to 0.4. If the clathration number of the cyclic molecules is excessively large, the cyclic molecules thickly exist relative to one axle molecule, and therefore the movability of the cyclic molecules is reduced and the photochromism tends to be reduced. Moreover, if the clathration number thereof is excessively small, the clearance between the axle molecules is narrowed, resulting in reducing the clearance in which the reversible reaction of the photochromic compound molecule is allowable, and the photochromism tends to be reduced as well.

In addition, the maximum clathration number of the cyclic molecules relative to one axle molecule can be calculated from a length of the axle molecule and a thickness of the ring of the cyclic molecule.

To take an example of a case where the chain portion of the axle molecule is formed of polyethylene glycol and the ring of the cyclic molecule is the α-cyclodextrin ring, for example, the maximum clathration number thereof can be calculated as described below.

More specifically, an equivalent to two repeating units [—$CH_2$—$CH_2$O—] of the polyethylene glycol is approximated to a thickness of one a-cyclodextrin ring. Accordingly, the number of repeating units is calculated from a molecular weight of this polyethylene glycol, and one half of this number of repeating units is determined as the maximum clathration number of the cyclic molecules. This maximum clathration number is taken as 1.0, and the clathration number of the cyclic molecules is to be adjusted within the range described above.

Moreover, in the polyrotaxane according to Aspect II, the side chain is a side chain having a group represented by the following formula (1):

$$-A \qquad (1)$$

(where, A is an organic group having 1 to 10 carbon atoms, and contains at least one hydroxyl group), in which a pKa of a hydroxyl group of a compound represented by the following formula (2):

$$H-A \qquad (2)$$

is 6 or more and less than 14.

In addition, as a matter of course, H in the formula (2) described above represents a hydrogen atom.

As A in the formula (1), an organic group having 1 to 10 carbon atoms, and a group represented by the following formula (A-1) or (A-2) can be preferably used.

[Formula 1]

(A-1)

(A-1')

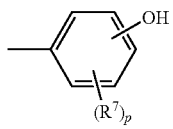
(A-2)

(where, $R^7$ is a group selected from a hydrocarbon group having 1 to 4 carbon atoms, a halogen atom, a nitro group, an acyl group, a methylsulfonyl group, a trifluoromethyl group, a cyano group and a carboxyl group; p is an integer from 0 to 4; and when the number of $R^7$ is two or more, $R^7$ may be a different group from each other; and $R^8$ is a trifluoromethyl group or hydrogen).

The group represented by (A-1) is most preferably a group in which p is 0. Moreover, as the group represented by (A-1), a group represented by (A-1') is preferable.

In the polyrotaxane according to Aspect II, the compound represented by the formula (2) is a compound having a structure formed by substituting, for hydrogen, the atom in the bonding site at which the group represented by the formula (1) is bonded with the side chain, in which the pKa of the compound represented by the formula (2) is 6 or more and less than 14.

Moreover, with regard to the side chain having the secondary or tertiary hydroxyl group in the polyrotaxane according to Aspect I, the side chain preferably has the secondary or tertiary hydroxyl group and is preferably formed by repetition of organic chains in which the number of carbon atoms is within the range from 3 to 20. As the side chain in the polyrotaxane according to Aspect II, the side chain preferably has the group represented by -A and is preferably formed by repetition of the organic chains in which the number of carbon atoms is within the range from 3 to 20.

A weight average molecular weight of such a side chain is in the range from 200 to 10,000, preferably from 250 to 5,000, and further preferably from 300 to 1,500. More specifically, if the side chain is excessively small, a function of securing the clearance in which the reversible reaction of the photochromic compound molecule is allowable becomes insufficient. If the side chain is excessively large, compatibility with other monomers, to be described later, is deteriorated to easily cause the phase separation. Moreover, it becomes difficult to densely mix the photochromic compound, to be described later, in the polyrotaxane and eventually tends to be difficult in sufficiently utilizing the space to be secured by the polyrotaxane.

Further, in the polyrotaxane according to Aspect I, the polyrotaxane may have the primary hydroxyl group in the side chain. From the viewpoint of the moldability, however, when the total mole number of the primary, secondary and tertiary hydroxyl groups in the side chain is taken as 100%, a proportion of the primary hydroxyl group is preferably 50% or less, further preferably 20% or less, and most preferably 0%. More specifically, the reason is that, if the primary hydroxyl group is low in amount, the reactivity of the polyrotaxane with the iso(thio)cyanate is reduced, and the moldability is improved.

The side chain having the secondary or tertiary hydroxyl group as described above is introduced thereinto by using a functional group of the ring of the cyclic molecule and modifying this functional group. For example, the α-cyclodextrin ring has eighteen hydroxyl groups as the functional group, and the side chain is introduced thereinto through this hydroxyl group. More specifically, a maximum of up to eighteen side chains can be introduced into one α-cyclodextrin ring. In the present invention, in order to sufficiently develop the function of the side chain described above, 6% or more, and particularly 30% or more of the total number of functional groups of such a ring is preferably modified with the side chain. More specifically, 6% or more and 100% or less of the total number of functional groups are preferably modified with the side chain, 30% or more and 100% or less of the total number of functional groups are further preferably modified with the side chain, and 30% or more and 80% or less of the total number of functional groups are still further preferably modified with the side chain. Incidentally, when the side chains are bonded with nine hydroxyl groups among the eighteen hydroxyl groups in the α-cyclodextrin ring, a degree of modification therewith is deemed to be 50% (namely, 0.5).

In the polyrotaxane according to Aspect I, as long as the side chain (the organic chain) as described above has the secondary or tertiary hydroxyl group, and further a size of the side chain is within the range described above, the side chain may have the straight chain or branched chain. The side chain having an appropriate size can be introduced thereinto by using ring-opening polymerization; radical polymerization; cationic polymerization; anionic polymerization; and living radical polymerization such as atom transfer radical polymerization, RAFT polymerization and NMP polymerization, and by reacting an appropriate compound with the functional group of the ring. When the side chain has neither the secondary hydroxyl group nor the tertiary hydroxyl group upon introducing the side chain by polymerization, a reaction only needs to be performed so that the polyrotaxane may have such a structure at the end of the side chain. Although the details will be described later, for example, if the hydroxyl group introduced into the side chain is the primary hydroxyl group, the side chain into which the secondary or tertiary hydroxyl group is introduced can be obtained by reacting, with the primary hydroxyl group of the side chain, the isocyanate compound in which the secondary or tertiary hydroxyl group is protected, and then deprotecting the resulting material.

As a preferred structure of the side chain, the polyrotaxane most preferably has a side chain represented by the following formula (1):

[Formula 2]

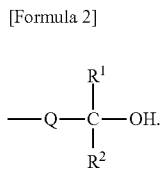

(1)

In the formula (1), Q is formed of at least one kind selected from structures represented by the following formulas (Q-1), (Q-2) and (Q-3).

[Formula 3]

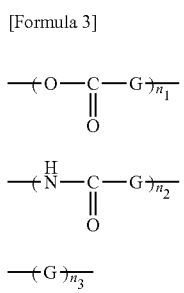

(where, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond or a —SiO— bond; or an alkylene group formed by replacement of a part of hydrogen of the alkylene group by at least one kind selected from the group consisting of a hydroxyl group, a carboxyl group, an acyl group, a phenyl group, a halogen atom and an olefin group, and when a plurality of G exist, each G may be a same group or a different group, and $n_1$, $n_2$ and $n_3$ are each independently an integer from 1 to 200), and when Q is formed of two or more kinds selected from the formulas (Q-1), (Q-2) and (Q-3), G constituting (Q-1) to (Q-3) may be a same group or a different group, a total of $n_1$, $n_2$ and $n_3$ is an integer from 1 to 200, and $R^1$ and $R^2$ are each independently a group selected from hydrogen, a straight-chain alkyl group having 1 to 6 carbon atoms or a branched-chain alkyl group having 1 to 6 carbon atoms, excluding a group in which $R^1$ and $R^2$ are simultaneously hydrogen.

Moreover, as a preferred structure of the side chain, the polyrotaxane most preferably has a side chain represented by the following formula (1') as well:

[Formula 4]

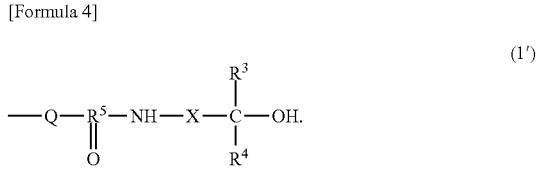

(1')

In the formula (1'), Q is formed of at least one kind selected from structures represented by the following formulas (Q-1), (Q-2) and (Q-3).

[Formula 5]

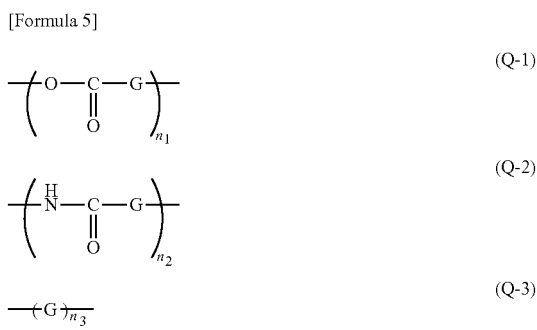

(where, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond or a —SiO— bond; or an alkylene group formed by replacement of a part of hydrogen of the alkylene group by at least one kind selected from the group consisting of a hydroxyl group, a carboxyl group, an acyl group, a phenyl group, a halogen atom and an olefin group, and when a plurality of G exist, each G may be a same group or a different group, and $n_1$, $n_2$ and $n_3$ are each independently and integer from 1 to 200), and when Q is formed of two or more kinds selected from the formulas (Q-1), (Q-2) and (Q-3), G constituting (Q-1) to (Q-3) may be a same group or a different group, a total of $n_1$, $n_2$ and $n_3$ is an integer from 1 to 200, X is an alkylene group or alkenylene group having 2 to 20 carbon atoms, or an alkylene group or alkenylene formed by replacement of a part of the alkylene group or alkenylene group by a —O— bond or a —NH— bond, and $R^3$ and $R^4$ are each independently selected from hydrogen, a straight-chain alkyl group having 1 to 6 carbon atoms or a branched-chain alkyl group having 1 to 6 carbon atoms, excluding a group in which $R^3$ and $R^4$ are simultaneously hydrogen; and $R^5$ is carbon or sulfur.

Further, in the polyrotaxane according to Aspect II, the polyrotaxane may have the hydroxyl group the pKa of which is less than 6 or 14 or more in the side chain. From the viewpoint of the moldability, however, when the total mole number of the hydroxyl groups in the side chain is taken as 100%, a proportion of the hydroxyl group the pKa of which is less than 6 and 14 or more is preferably 50% or less, further preferably 20% or less, and most preferably 0%. More specifically, the reason is that, if the hydroxyl group the pKa of which is less than 6 and 14 or more is low in amount, the reactivity with the iso(thio)cyanate can be easily controlled, the rate of polymerization can be adjusted, and the moldability or the cloudiness described above can be suppressed.

The side chain having the hydroxyl group the pKa of which is 6 or more and less than 14 is introduced thereinto by using the functional group of the ring of the cyclic molecule and modifying the functional group. For example, the α-cyclodextrin ring has eighteen hydroxyl groups as the functional group, and the side chain is introduced thereinto through the hydroxyl group. More specifically, the maximum of up to eighteen side chains can be introduced into one α-cyclodextrin ring. In the present invention, in order to sufficiently develop the function of the side chain described above, 6% or more, and particularly 30% or more of the total number of the functional groups of such a ring is preferably modified with the side ring. More specifically, 6% or more and 100% or less of the total number of the functional groups are preferably modified with the side chain, 30% or more and 100% or less of the total number of functional groups are further preferably modified with the side chain, and 30% or more and 80% or less of the total number of the functional groups are still further preferably modified with the side chain. Incidentally, when the side chains are bonded with nine hydroxyl groups among the eighteen hydroxyl groups of the α-cyclodextrin ring, the degree of modification therewith is deemed to be 50% (namely, 0.5).

In the polyrotaxane according to Aspect II, as long as the side chain (the organic chain) as described above has the hydroxyl group the pKa of which is 6 or more and less than 14, and further the size of the side chain is within the range described above, the side chain may have the straight chain or branched chain. The side chain having an appropriate size can be introduced thereinto by using ring-opening polymerization; radical polymerization; cationic polymerization; anionic polymerization; and living radical polymerization such as atom transfer radical polymerization, RAFT polymerization and NMP polymerization, and by reacting an appropriate compound with the functional group of the ring. When the side chain has no hydroxyl group the pKa of which is 6 or more and less than 14 upon introducing the side chain by polymerization, a reaction only needs to be further performed so that the polyrotaxane may have a structure in which the hydroxyl group the pKa of which is 6 or more and less than 14 is introduced into the side chain. Although the details will be described later, for example, when the pKa of the hydroxyl group introduced into the side chain is less than 6 or 14 or more, the side chain into which the hydroxyl group the pKa of which is 6 or more and less than 14 is introduced can be obtained by reacting, with the hydroxyl group in the side chain, the compound having the hydroxyl group the pKa of which is 6 or more and less than 14 or the compound in which the hydroxyl group the pKa of which is 6 or more and less than 14 is protected.

As a preferred structure of the side chain, a side chain represented by the following formula (3) is most preferably introduced thereinto.

-Q-A     (3)

In the formula (3), Q is formed of at least one kind selected from structures represented by the following formulas (Q-1), (Q-2) and (Q-3).

[Formula 6]

(where, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond or a —SiO— bond; or an alkylene group formed by replacement of a part of hydrogen of the alkylene group by at least one kind selected from the group consisting of a carboxyl group, an acyl group, a phenyl group, a halogen atom and an olefin group, and when a plurality of G exist, each G may be a same group or a different group, and $n_1$, $n_2$ and $n_3$ are each independently an integer from 1 to 200), and when Q is formed of two or more kinds selected from the formulas (Q-1), (Q-2) and (Q-3), G constituting (Q-1) to (Q-3) may be a same group or a different group, a total of $n_1$, $n_2$ and $n_3$ is an integer from 1 to 200, and A is an organic group having 1 to 10 carbon atoms and contains at least one hydroxyl group. In addition, the pKa of the hydroxyl group of the compound represented by H-A is 6 or more and less than 14.

As a preferred structure of the side chain, a side chain represented by the following formula (3') is most preferably introduced thereinto.

[Formula 7]

In the formula (3'), Q is formed of at least one kind selected from structures represented by the following formulas (Q-1), (Q-2) and (Q-3).

[Formula 8]

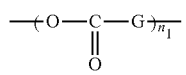  (Q-1)

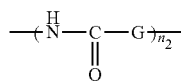  (Q-2)

  (Q-3)

(where, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond or a —SiO— bond; or an alkylene group formed by replacement of a part of hydrogen of the alkylene group by at least one kind selected from the group consisting of a carboxyl group, an acyl group, a phenyl group, a halogen atom and an olefin group, and when a plurality of G exist, each G may be a same group or a different group, and $n_1$, $n_2$ and $n_3$ are each independently an integer from 1 to 200), and when Q is formed of two or more kinds selected from the formulas (Q-1), (Q-2) and (Q-3), G constituting (Q-1) to (Q-3) may be a same group or a different group, a total of $n_1$, $n_2$ and $n_3$ is an integer from 1 to 200, and $R^6$ is carbon or sulfur, X is an alkylene group or alkenylene group having 2 to 20 carbon atoms; or an alkylene group or alkenylene group formed by replacement of a part of the alkylene group or alkenylene group by a —O— bond, or a —NH— bond, and A is an organic group having 1 to 10 carbon atoms and contains at least one hydroxyl group.

In the preferred structure of the side chain represented by the formula (1), Q has either a structure represented by the formula (Q-1) or a structure represented by the formula (Q-2) or both the structures, and $n_1$ and $n_2$ are each independently in the range from 1 to 100, and in the range from 1 to 100 in total, further preferably, Q has either a structure represented by the formula (Q-1) or a structure represented by the formula (Q-2) or both the structures, and $n_1$ and $n_2$ are each independently in the range from 1 to 75, and in the range from 1 to 75 in total, and most preferably, Q has a structure represented by the formula (Q-1), and $n_1$ is in the range from 1 to 50.

In the polyrotaxane according to Aspect I, as the method for introducing the side chain having the secondary or tertiary hydroxyl group thereinto as described above, the side chain is preferably introduced thereinto by the ring-opening polymerization, and as the ring-opening polymerization, the side chain derived from the cyclic compound such as the cyclic ether, cyclic siloxane, cyclic lactone, cyclic lactam, cyclic acetal, cyclic amine or cyclic carbonate can be introduced thereinto. When the end is the primary hydroxyl group upon being introduced thereinto, the primary hydroxyl group only needs to be changed to the secondary or tertiary hydroxyl group according to the technique as described above.

Among these compounds, from viewpoints of ease of availability, high reactivity, and ease of adjustment of the size (molecular weight), cyclic ether, cyclic lactone, cyclic lactam, or cyclic carbonate is preferably used. If the ring-opening polymerization is performed by using such a compound, the hydroxyl group can be introduced into the end, but a category of the hydroxyl group at the end is determined by a structure of the compound used. When the hydroxyl group of the side chain introduced thereinto is the primary hydroxyl group, the secondary or tertiary hydroxyl group may be introduced thereinto according to the technique described above. Specific examples of the cyclic ether, the cyclic lactone, the cyclic lactam and the cyclic carbonate which may be the side chain are described below.

Cyclic ether from which the primary hydroxyl group may be introduced into the side chain by the ring-opening polymerization:
 ethylene oxide, 1,2-propylene oxide and oxetane.

Cyclic ether from which the secondary or tertiary hydroxyl group may be introduced into the side chain by the ring-opening polymerization:
 epichlorohydrin, epibromohydrin, 1,2-butylene oxide, 2,3-butylene oxide and isobutylene oxide.

Cyclic lactone from which the primary hydroxyl group may be introduced into the side chain by the ring-opening polymerization:
 β-propiolactone, γ-butyrolactone, α-hexyl-γ-butyrolactone, α-heptyl-γ-butyrolactone, α-hydroxy-γ-butyrolactone, α-methylene-γ-butyrolactone, α,α-dimethyl-γ-butyrolactone, α-methyl-γ-butyrolactone, γ-nonanolactone, γ-undecanolactone, γ-valerolactone, α-bromo-γ-butyrolactone, γ-crotonolactone, α-methylene-γ-butyrolactone, α-methacryloyloxy-γ-butyrolactone, β-methacryloyloxy-γ-butyrolactone, δ-valerolactone, α-methyl-δ-valerolactone, α-ethyl-δ-valerolactone, α-hexyl-δ-valerolactone, 1,4-dioxan-2-one, 1,5-dioxepan-2-one, ε-caprolactone, α-methyl-ε-caprolactone, α-ethyl-ε-caprolactone, α-hexyl-ε-caprolactone, 5-n-propyl-ε-caprolactone, 5-n-hexyl-ε-caprolactone and ζ-enantholactone.

Cyclic lactone from the secondary or tertiary hydroxyl group may be introduced into the side chain by the ring-opening polymerization:
 β-methylpropiolactone, γ-hexanolactone, γ-heptanolactone, γ-octanolactone, γ-decanolactone, γ-dodecanolactone, γ-methyl-γ-decanolactone, DL-pantolactone, δ-hexanolactone, δ-octanolactone, δ-nonanolactone, δ-decanolactone, δ-undecanolactone, δ-dodecanolactone, δ-tridecanolactone, δ-tetradecanolactone, α,ε-dimethyl-ε-caprolactone and 7α-nonyloxepan-2-one.

Cyclic lactam from which the primary hydroxyl group may be introduced into the side chain by the ring-opening polymerization:
 ε-caprolactam, γ-butyrolactam and DL-α-amino-ε-caprolactam.

Cyclic carbonate from which the primary hydroxyl group may be introduced into the side chain by the ring-opening polymerization:
 ethylene carbonate and vinylene carbonate.

Cyclic carbonate from which the secondary hydroxyl group may be introduced into the side chain by the ring-opening polymerization:
 propylene carbonate and 1,2-butylene carbonate.

The cyclic compounds described above can be used not only alone but also in combination with a plurality of kinds.

In the polyrotaxane according to Aspect I, a compound further preferably used for the ring-opening polymerization is cyclic lactone and cyclic lactam. Among these compounds, a compound preferably used is lactone such as ε-caprolactone, α-acetyl-γ-butyrolactone, α-methyl-γ-butyrolactone, γ-butyrolactone, γ-valerolactone, ε-caprolactam and γ-butyrolactam. In view of simplicity of synthesis and ease of control of the molecular weight, the side chain is most preferably ε-caprolactone or ε-caprolactam. In addition, if the side chain is introduced thereinto by using γ-valerolactone in the compounds, the polyrotaxane having the side chain in which the secondary hydroxyl group is introduced into the end of the side chain can be obtained. When a group introduced thereinto after the ring-opening polymerization is the primary hydroxyl group, also as described above, for example, the secondary or tertiary hydroxyl group only needs to be introduced thereinto by reacting the primary hydroxyl group with the isocyanate compound in which the secondary or tertiary hydroxyl group is protected, and then deprotecting the resulting material.

In the polyrotaxane according to Aspect II, as the method for introducing the side chain having the hydroxyl group the pKa of which is 6 or more and less than 14 as described above, the side chain is preferably introduced thereinto by the ring-opening polymerization, and as the ring-opening polymerization, the side chain derived from the cyclic compound of cyclic ether, cyclic siloxane, cyclic lactone, cyclic lactam, cyclic acetal, cyclic amine and cyclic carbonate can be introduced thereinto.

Among these compounds, from the viewpoints of ease of availability, high reactivity and further ease of adjustment of the size (molecular weight), cyclic ether, cyclic lactone, cyclic lactam or cyclic carbonate is preferably used. If the ring-opening polymerization is performed by using such a compound, the hydroxyl group can be introduced into the end, but the pKa of the hydroxyl group at the end is determined by the structure of the compound used. When the pKa of the hydroxyl group of the side chain introduced thereinto is less than 6 or 14 or more, the hydroxyl group the pKa of which is 6 or more and less than 14 only needs to be introduced thereinto according to the technique described above. Specific examples of the cyclic ether, the cyclic lactone, the cyclic lactam and the cyclic carbonate which may be the side chain are described below.

Cyclic ether:
ethylene oxide, 1,2-propylene oxide, oxetane, epichlorohydrin, epibromohydrin, 1,2-butylene oxide, 2,3-butylene oxide and isobutylene oxide.

Cyclic lactone:
β-propiolactone, γ-butyrolactone, α-hexyl-γ-butyrolactone, α-heptyl-γ-butyrolactone, α-hydroxy-γ-butyrolactone, α-methylene-γ-butyrolactone, α,α-dimethyl-γ-butyrolactone, α-methyl-γ-butyrolactone, γ-nonanolactone, γ-undecanolactone, γ-valerolactone, α-bromo-γ-butyrolactone, γ-crotonolactone, α-methylene-γ-butyrolactone, α-methacryloyloxy-γ-butyrolactone, β-methacryloyloxy-γ-butyrolactone, δ-valerolactone, α-methyl-δ-valerolactone, α-ethyl-δ-valerolactone, α-hexyl-δ-valerolactone, 1,4-dioxan-2-one, 1,5-dioxepan-2-one, ε-caprolactone, α-methyl-ε-caprolactone, α-ethyl-ε-caprolactone, α-hexyl-ε-caprolactone, 5-n-propyl-ε-caprolactone, 5-n-hexyl-ε-caprolactone, ζ-enantholactone, β-methylpropiolactone, γ-hexanolactone, γ-heptanolactone, γ-octanolactone, γ-decanolactone, γ-dodecanolactone, γ-methyl-γ-decanolactone, DL-pantolactone, δ-hexanolactone, δ-octanolactone, δ-nonanolactone, δ-decanolactone, δ-undecanolactone, δ-dodecanolactone, δ-tridecanolactone, δ-tetradecanolactone, α,ε-dimethyl-ε-caprolactone and 7α-nonyloxepan-2-one.

Cyclic lactam: ε-caprolactam, γ-butyrolactam and DL-α-amino-ε-caprolactam.

Cyclic carbonate: ethylene carbonate, vinylene carbonate, propylene carbonate and 1,2-butylene carbonate.

The cyclic compounds described above can be used not only alone but also in combination with a plurality of kinds.

In the polyrotaxane according to Aspect II, a compound further preferably used for the ring-opening polymerization is cyclic lactone and cyclic lactam. Among these compounds, a compound preferably used is lactone such as ε-caprolactone, α-acetyl-γ-butyrolactone, α-methyl-γ-butyrolactone, γ-butyrolactone, γ-valerolactone, ε-caprolactam and γ-butyrolactam. In view of simplicity of synthesis and ease of control of the molecular weight, the side chain is most preferably ε-caprolactone or ε-caprolactam. When the hydroxyl group the pKa of which is less than 6 or 14 or more is introduced thereinto after polymerization in the side chain, also as described above, for example, the hydroxyl group the pKa of which is 6 or more and less than 14 only needs to be introduced thereinto by reacting the hydroxyl group with the isocyanate compound in which the hydroxyl group the pKa of which is 6 or more and less than 14 is protected, and then deprotecting the resulting material.

Thus, when the side chain is introduced thereinto by reacting the cyclic compound therewith by the ring-opening polymerization, the functional group (for example, the hydroxyl group) bound to the ring has poor reactivity, and has difficulty in directly reacting a large molecule therewith particularly by steric hindrance or the like in several cases. In such a case, for example, the production method can employ a means in which, in order to react caprolactone or the like therewith, the functional group (hydroxyl group) enriched with reactivity is introduced thereinto by performing hydroxypropylation by reacting a low molecular-weight compound such as propylene oxide with the functional group, and then the side chain is introduced thereinto by the ring-opening reaction using the cyclic compound described above.

Further, as the production method for the polyrotaxane being characterized in that the side chain having the secondary or tertiary hydroxyl group is introduced into at least part of the cyclic molecule (polyrotaxane according to Aspect I) according to the present invention, in view of simplicity of synthesis and ease of control of the molecular weight, the production method preferably includes reacting, with a compound represented by the following formula (2), a polyrotaxane having a composite molecular structure formed of an axle molecule and a plurality of cyclic molecules clathrating the axle molecule, and the polyrotaxane in which a side chain having a primary hydroxyl group is introduced into at least part of the cyclic molecule of the polyrotaxane. Moreover, the production method most preferably includes reacting, with the compound represented by the following formula (2), the polyrotaxane in which the side chain having the primary hydroxyl group is introduced into at least part of the cyclic molecule of the polyrotaxane, and then deprotecting Z.

[Formula 9]

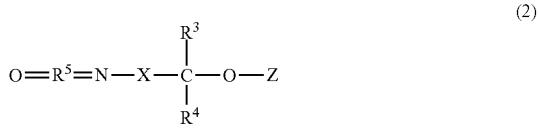

(2)

(where, X is an alkylene group or alkenylene group having 2 to 20 carbon atoms, or an alkylene group or alkenylene group formed by replacement of a part of the alkylene group or alkenylene group by a —O— bond or a —NH— bond; Z is a group selected from the group consisting of the following formulas Z-1 to Z-9; $R^3$ and $R^4$ are each independently selected from hydrogen, a straight-chain alkyl group having 1 to 6 carbon atoms or a branched-chain alkyl group having 1 to 6 carbon atoms, excluding a group in which $R^3$ and $R^4$ are simultaneously hydrogen; and $R^5$ is carbon or sulfur).

[Formula 10]

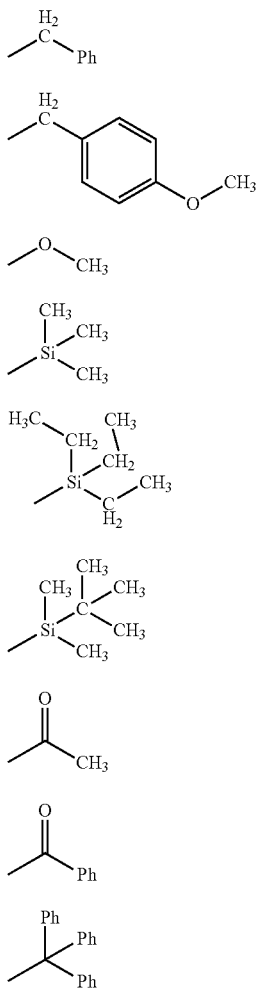

The alkylene group may be a branched-chain alkylene group or straight-chain alkylene group. Moreover, the alkenylene group may be a branched-chain alkenylene group or straight-chain alkenylene group.

Specific examples of the compound represented by the formula (2) include: 2-methyl-2-(trimethylsiloxy)propyl isocyanate, 2-methyl-2-(t-butyldimethylsiloxy)propyl isocyanate, 2-(trimethylsiloxy)propyl isocyanate, 2-(t-butyldimethylsiloxy)propyl isocyanate, [(2-isocyanato-1,1-dimethylethoxy)methyl]benzene and (2-isocyanato-1-methylpropoxy)benzene, and particularly preferably include: 2-methyl-2-(trimethylsiloxy)propyl isocyanate and 2-methyl-2-(t-butyldimethylsiloxy)propyl isocyanate.

As the production method including reacting, with the compound represented by the following formula (2), the polyrotaxane in which the side chain having the primary hydroxyl group is introduced into at least part of the cyclic molecule, and then deprotecting Z, the following method can be employed.

The polyrotaxane in which the side chain having the tertiary hydroxyl group is introduced into at least part of the cyclic molecule can be obtained by preparing the polyrotaxane having the primary hydroxyl group in the side chain, according to the method described in Patent literature 8, and introducing 2-methy-2-(trimethylsiloxy)propyl isocyanate into the primary hydroxyl group of the polyrotaxane, and then deprotecting the resulting material by using tetra-n-butylammonium fluoride (TBAF). When the secondary hydroxyl group is introduced thereinto according to the production method described above, 2-(trimethylsiloxy)propyl isocyanate or 2-(t-butyldimethylsiloxy)propyl isocyanate only needs to be used in place of 2-methyl-2-(trimethylsiloxy)propyl isocyanate.

In the polyrotaxane according to Aspect I, as the polyrotaxane most preferably used, a polyrotaxane in which polyethylene glycol having adamantyl groups bound at both ends is applied as an axle molecule, and a cyclic molecule having an a-cyclodextrin ring is applied as a ring, and a side chain is further introduced into the ring by ε-polycaprolactone, and a secondary or tertiary hydroxyl group is introduced into an end according to the production method described above is preferably used.

Further, as the production method for the polyrotaxane being characterized in that the side chain having the hydroxyl group the pKa of which is 6 or more and less than 14 is introduced into at least part of the cyclic molecule (polyrotaxane according to Aspect II) according to the present invention, in view of simplicity of synthesis and ease of control of the molecular weight, the production method preferably includes reacting, with a compound represented by the following formula (4), a polyrotaxane having a composite molecular structure formed of an axle molecule and a plurality of cyclic molecules clathrating the axle molecule, and the polyrotaxane in which a side chain having a primary hydroxyl group a pKa of which is 14 or more is introduced into at least part of the cyclic molecule of the polyrotaxane. Moreover, the production method most preferably includes reacting, with the compound represented by the following formula (4), the polyrotaxane in which the side chain having the primary hydroxyl group the pKa of which is 14 or more is introduced into at least part of the cyclic molecule of the polyrotaxane, and then deprotecting Z.

[Formula 11]

$$O=R^6=N-X-T-O-Z \qquad (4)$$

[where, $R^6$ is carbon or sulfur, X is an alkylene group or alkenylene group having 2 to 20 carbons, or an alkylene group or alkenylene group formed by replacement of a part of the alkylene group or alkenylene group by a —O— bond or a —NH— bond, where, T is a group selected from the group consisting of the following formulas (T-1) or (T-2):

[Formula 12]

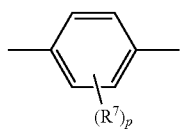
(T-1)

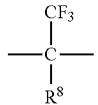
(T-2)

(where, $R^7$ is a group selected from a hydrocarbon group having 1 to 4 carbon atoms, a halogen atom, a nitro group, an acyl group, a methylsulfonyl group, a trifluoromethyl group, a cyano group and a carboxyl group; p is an integer from 0 to 4; and when the number of $R^7$ is two or more, $R^7$ may be a different group from each other, $R^8$ is a trifluoromethyl group or hydrogen), and where, Z is a group selected from the group consisting of the following formulas Z-1 to Z-9]:

[Formula 13]

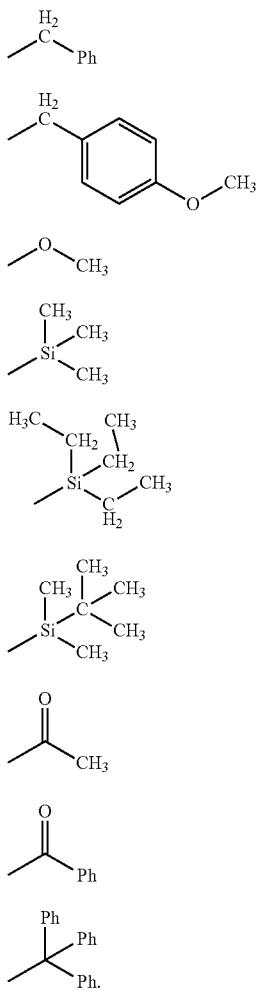

The group represented by (T-1) is most preferably a group in which p is 0.

The alkylene group may be a branched-chain alkylene group or straight-chain alkylene group. Moreover, the alkenylene group may be a branched-chain alkenylene group or straight-chain alkenylene group.

Specific examples of the compound represented by the formula (4) include: 1-(2-isocyanatoethyl)-4-[(trimethylsilyl)oxy]-benzene, 1-(2-isothiocyanateethyl)-4-[(trimethylsilyl)oxy]-benzene, 1-[[(1,1-dimethylethyl)dimethylsilyl]oxy]-4-(2-isocyanatepropyl)benzene, 1-(2-isocyanatoethyl)-4-methoxybenzene, 1-(2-isocyanatoethyl)-4-(phenylmethoxy)-benzene, 3,3,3-trifluoro-2-(phenylmethoxy)-2-(trifluoromethyl)-1-propane isocyanate, 4,4,4-trifluoro-3-(phenylmethoxy)-1-butane isocyanate and 4,4,4-trifluoro-3-[(4-methoxyphenyl)methoxy]-1-butane isocyanate. In addition, 3,3,3-trifluoro-2-(phenylmethoxy)-2-(trifluoromethyl)-1-propane isocyanate, 4,4,4-trifluoro-3-(phenylmethoxy)-1-butane isocyanate or 4,4,4-trifluoro-3-[(4-methoxyphenyl)methoxy]-1-butane isocyanate can be obtained by converting a primary amine group into an isocyanate group by reacting, with phosgene, the primary amine group of 3,3,3-trifluoro-2-(phenylmethoxy)-2-(trifluoromethyl)-1-propaneamine, 4,4,4-trifluoro-3-(phenylmethoxy)-1-butaneamine or 4,4,4-trifluoro-3-[(4-methoxyphenyl)methoxy]-1-butaneamine.

As the production method including reacting, with the compound represented by the formula (4), the polyrotaxane in which the side chain having the primary hydroxyl group the pKa of which is 14 or more is introduced into at least part of the cyclic molecule, and then deprotecting Z, the method as described below can be employed.

The polyrotaxane in which the side chain having the hydroxyl group the pKa of which is 6 or more and less than 14 is introduced into at least part of the cyclic molecule can be obtained by preparing the polyrotaxane having the hydroxyl group the pKa of which is 14 or more in the side chain, according to the method described in Patent literature 8, and introducing 1-(2-isocyanatoethyl)-4-[(trimethylsilyl)oxy]-benzene into the primary hydroxyl group the pKa of which is 14 or more in the polyrotaxane, and then deprotecting the resulting material by using tetra-n-butylammonium fluoride (TBAF).

In the polyrotaxane according to Aspect II, as the polyrotaxane most preferably used, a polyrotaxane in which polyethylene glycol having adamantyl groups bound at both ends is applied as an axle molecule, and a cyclic molecule having an α-cyclodextrin ring is applied as a ring, and a side chain is further introduced into the ring by ε-polycaprolactone, and a hydroxyl group a pKa of which is 6 or more and less than 14 is introduced into an end according to the production method described above is preferably used.

The polyrotaxane (A) according to the present invention (for example, the polyrotaxane according to Aspect I or Aspect II) can be used as an optical composition. For example, when the polyrotaxane (A) is used together with a (B) component to be described later to form the optical composition, the optical composition can be preferably used for a plastic lens such as an eyeglass lens.

Next, (B) will be described.

<(B) Compound Having Two or More Groups of at Least One Kind Selected from an Isocyanate Group and an Isothiocyanate Group in One Molecule>

A compound having two or more groups of at least one kind selected from an isocyanate group and an isothiocyanate group in one molecule (hereinafter, also referred to simply as "polyiso(thio)cyanate compound") that forms the optical composition according to the present invention is a compound having two or more groups (in total) of an isocyanate group and an isothiocyanate group in one molecule of the polyiso(thio)cyanate compound. Among the polyiso(thio)cyanate compounds, specific examples of the polyisocyanate compound include: aliphatic isocyanate, alicyclic isocyanate, aromatic isocyanate, sulfur-containing aliphatic isocyanate, aliphatic sulfide-based isocyanate, aromatic sulfide-based isocyanate, aliphatic sulfone-based isocyanate, aromatic sulfone-based isocyanate, sulfonate-based isocyanate, aromatic sulfonic acid amide-based isocyanate and sulfur-containing heterocyclic ring isocyanate.

Moreover, specific examples of the polyisothiocyanate compound include: aliphatic isothiocyanate, alicyclic isothiocyanate, aromatic isothiocyanate, heterocyclic ring-containing isothiocyanate, carbonyl isothiocyanate, sulfur-containing aliphatic isothiocyanate, sulfur-containing aromatic isothiocyanate and sulfur-containing heterocyclic ring isothiocyanate. Specific examples of these polyiso(thio)cyanate compounds can include the compounds described below.

Aliphatic isocyanate; ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-atrimethylhexamethylene diisocyanate, decamethylene diisocyanate, butene diisocyanate, 1,3-butadiene-1,4-diisocyanate, 2,4,4-trimethylhexamethylene diisocyanate, 1,6,11-trimethylundecamethylene diisocyanate, 1,3,6-trimethylhexamethylene diisocyanate, 1,8-diisocyanato-4-isocyanatomethyloctane, 2,5,7-trimethyl-1,8-diisocyanato-5-isocyanatomethyloctane, bis(isocyanatoethyl)carbonate, bis(isocyanatoethyl)ether, 1,4-butylene glycol dipropyl ether-ω,ω'-diisocyanate, lysine diisocyanatomethyl ester, lysine triisocyanate, 2-isocyanatoethyl-2,6-diisocyanate hexanoate and 2-isocyanatopropyl-2,6-diisocyanate hexanoate.

Alicyclic isocyanate: isophorone diisocyanate, (bicyclo[2,2,1]heptane-2,5-diyl)bismethylene diisocyanate, (bicyclo[2,2,1]heptane-2,6-diyl)bismethylene diisocyanate, 2β,5α-bis(isocyanato)norbornane, 2β,5β-bis(isocyanato)norbornane, 2β,6α-bis(isocyanato)norbornane, 2β,6β-bis(isocyanato)norbornane, 2,6-di(isocyanatomethyl)furan, bis(isocyanatomethyl)cyclohexane, dicyclohexylmethane diisocyanate, 4,4-isopropylidene bis(cyclohexylisocyanate), cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimer acid diisocyanate, 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo[2,2,1]-heptane, 2-isocyanatomethyl-2-(3-isocyanatopropyl)-5-isocyanatomethyl-bicyclo[2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-5-(2-isocyanatoethyl)-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-2-(3-isocyanatopropyl)-5-(2-isocyanatoethyl)-bicyclo[2,2,1]-heptane, 2-isocyanatomethyl-2-(3-isocyanatopropyl)-6-(2-isocyanatoethyl)-bicyclo[2,2,1]-heptane, 2,5-bis(isocyanatomethyl)-bicyclo[2,2,1]-heptane, 2,6-bis(isocyanatomethyl)-bicyclo[2,2,1]-heptane, 1,3,5-tris(isocyanatomethyl)cyclohexane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, 1,5-diisocyanatodecalin, 2,7-diisocyanatodecalin, 1,4-diisocyanatodecalin, 2,6-diisocyanatodecalin, a mixture of bicyclo[4,3,0]nonane-3,7-diisocyanate and bicyclo[4,3,0]nonane-4,8-diisocyanate, a mixture of bicycle[2,2,1]heptane-2,5-diisocyanate and bicyclo[2,2,1]heptane-2,6-diisocyanate, a mixture of bicycle[2,2,2]octane-2,5-diisocyanate and bicyclo[2,2,2]octane-2,6-diisocyanate and a mixture of tricycle[5,2,1,0$^{2.6}$]decane-3,8-diisocyanate and tricyclo[5,2,1,0$^{2,6}$]decane-4,9-diisocyanate.

Aromatic isocyanate: xylylene diisocyanate (o-, m-, p-), tetrachloro-m-xylylene diisocyanate, 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate, 4-ethyl-m-xylylene diisocyanate, bis(isocyanatoethyl)benzene, bis(isocyanatopropyl)benzene, 1,3-bis(α,α-dimethylisocyanatomethyl)benzene, 1,4-bis(α,α-dimethylisocyanatomethyl)benzene, α,α,α',α'-tetramethylxylylene diisocyanate, bis(isocyanatobutyl)benzene, bis(isocyanatomethyl)naphthalene, bis(isocyanatomethyl)diphenyl ether, bis(isocyanatoethyl)phthalate, mesitylene triisocyanate, 2,6-di(isocyanatomethyl)furan, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, 1,3,5-triisocyanatomethylbenzene, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,4',6-triisocyanate, 4-methyl-diphenylmethane-2,3,4',5,6-pentaisocyanate, phenylisocyanatomethyl isocyanate, phenylisocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate and dichlorocarbazole diisocyanate.

Sulfur-containing aliphatic isocyanate: thiodiethyl diisocyanate, thiodipropyl diisocyanate, thiodihexyl diisocyanate, dimethylsulfone diisocyanate, dithiodimethyl diisocyanate, dithiodiethyl diisocyanate, 1-isocyanatomethylthio-2,3-bis(2-isocyanatoethylthio)propane, 1,2-bis(2-isocyanatoethylthio)ethane, 1,1,2,2-tetrakis(isocyanatomethylthio)ethane, 2,2,5,5-tetrakis(isocyanatomethylthio)-1,4-dithiane, 2,4-dithiapentane-1,3-diisocyanate, 2,4,6-trithiaheptane-3,5-diisocyanate, 2,4,7,9-tetrathiapentane-5,6-diisocyanate, bis(isocyanatomethylthio)phenylmethane, bis(isocyanatomethylthio)methane, bis(isocyanatoethylthio)methane, bis(isocyanatoethylthio)ethane, bis(isocyanatomethylthio)ethane and 1,5-isocyanato-2-isocyanatomethyl-3-thiapentane.

Aliphatic sulfide-based isocyanate: bis[2-(isocyanatomethylthio)ethyl]sulfide, dicyclohexylsulfide-4,4'-diisocyanate, bis(isocyanatomethyl)sulfide, bis(isocyanatoethyl)sulfide, bis(isocyanatopropyl)sulfide, bis(isocyanatohexyl)sulfide, bis(isocyanatomethyl)disulfide, bis(isocyanatoethyl)disulfide and bis(isocyanatopropyl)disulfide.

Aromatic sulfide-based isocyanate: diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)sulfide, 4,4'-methoxybenzenethioethylene glycol-3,3'-diisocyanate, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimeth=yldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Aliphatic sulfone-based isocyanate: bis(isocyanatomethyl)sulfone.

Aromatic sulfone-based isocyanate: diphenylsulfone-4,4'-diisocyanate, diphenylsulfone-3,3'-diisocyanate, benzylidenesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzyl sulfone, 4,4'-dimethyldiphenylsulfone-3,3'-diisocyanate, 4,4'-di-tert-butyldiphenylsulfone-3,3'-diisocyanate, 4,4'-dimethoxybenzeneethylenedisulfone-3,3'-diisocyanate and 4,4'-dichlorodiphenylsulfone-3,3'-diisocyanate.

Sulfonate-based isocyanate: 4-methyl-3-isocyanatobenzenesulfonyl-4'-isocyanatophenol ester and 4-methoxy-3-isocyanatobenzenesulfonyl-4'-isocyanatophenol ester.

Aromatic sulfonic acid amide-based isocyanate: 4-methyl-3-isocyanatobenzenesulfonylanilide-3'-methyl-4'-isocyanate, dibenzenesulfonyl-ethylenediamine-4,4'-diisocyanate, 4,4'-dimethoxybenzenesulfonyl-ethylenediamine-3,3'-diisocyanate and 4-methyl-3-isocyanatobenzensulfonylanilide-4-methyl-3'-isocyanate.

Sulfur-containing heterocyclic ring isocyanate: thiophene-2,5-diisocyanate, thiophene-2,5-diisocyanatomethyl, 1,4-dithiane-2,5-diisocyanate, 1,4-dithiane-2,5-diisocyanatomethyl, 1,3-dithiolane-4,5-diisocyanate, 1,3-dithiolane-4,5-diisocyanatomethyl, 1,3-dithiolane-2-methyl-4,5-diisocyanatomethyl, 1,3-dithiolane-2,2-diisocyanatoethyl, tetrahydrothiophene-2,5-diisocyanate, tetrahydrothiophene-2,5-diisocyanatomethyl, tetrahydrothiophene-2,5-diisocyanatoethyl, tetrahydrothiophene-3,4-diisocyanatomethyl, tricyclothiaoctane diisocyanate, 2-(1,1-diisocyanatomethyl)thiophene, 3-(1,1-diisocyanatomethyl)thiophene, 2-(2-thienylthio)-1,2-diisocyanatopropane, 2-(3-thienylthio)-1,2-diisocyanatopropane, 3-(2-thienyl)-1,5-diisocyanato-2,4-dithiapentane, 3-(3-thienyl)-1,5-diisocyanato-2,4-dithiapentane, 3-(2-thienylthio)-1,5-diisocyanato-2,4-dithiapentane, 3-(3-thienylthio)-1,5-diisocyanato-2,4-dithiapentane, 3-(2-thienylthiomethyl)-1,5-diisocyanato-2,4-dithiapentane, 3-(3-thienylthiomethyl)-1,5-diisocyanato-2,4-dithiapentane, 2,5-(diisocyanatomethyl)thiophene, 2,3-(diisocyanatomethyl)thiophene, 2,4-(diisocyanatomethyl)thiophene, 3,4-(diisocyanatomethyl)thiophene, 2,5-(diisocyanatomethylthio)thiophene, 2,3-(dissocyanatomethylthio)thiophene, 2,4-(diisocyanatomethylthio)thiophene, 3,4-(diisocyanatomethylthio)thiophene and 2,4-bisisocyanatomethyl-1,3,5-trithiane.

Further, a halogen-substituted product of the polyisocyanate, an alkyl-substituted product thereof, an alkoxy-substituted product thereof or a nitro-substituted product thereof; a prepolymer-type modified product with polyhydric alcohol; a carbodiimide-modified product therewith; a urea-modified product therewith; a biuret-modified product therewith; and a dimerized or trimerized reaction product or the like can also be used.

Aliphatic isothiocyanate: 1,2-diisothiocyanatoethane, 1,3-diisothiocyanatopropane, 1,4-diisothiocyanatobutane, 1,6-diisothiocyanatohexane and p-phenylenediisopropylidene diisothiocyanate.

Alicyclic isothiocyanate: cyclohexyl isothiocyanate, cyclohexane diisothiocyanate, 2,4-bis(isothiocyanatomethyl)norbornane, 2,5-bis(isothiocyanatomethyl)norbornane, 3,4-bis(isothiocyanatomethyl)norbornane and 3,5-bis(isothiocyanatomethyl)norbornane.

Aromatic isothiocyanate: phenyl isothiocyanate, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene diisocyanate, 4,4'-diisothiocyanato-1,1'-biphenyl, 1,1'-methylene bis(4-isothiocyanatobenzene), 1,1'-methylene bis(4-isothiocyanato-2-methylbenzene), 1,1'-methylene bis(4-isothiocyanato-3-methylbenzene), 1,1'-(1,2-ethanediyl) bis (4-isothiocyanatobenzene), 4,4'-diisothiocyanato benzophenone, 4,4'-diisothiocyanato-3,3'-dimethyl benzophenone, benzanilide-3,4'-diisothiocyanate, diphenylether-4,4'-diisothiocyanate and diphenylamine-4,4'-diisothiocyanate.

Heterocyclic ring-containing isothiocyanate: 2,4,6-triisothiocyanato-1,3,5-triazine.

Carbonyl isothiocyanate: hexanediol diisothiocyanate, nonanediol diisothiocyanate, carbonic diisothiocyanate, 1,3-benzenedicarbonyl diisothiocyanate, 1-4-benzenedicarbonyl diisothiocyanate and (2,2-bipyridine)-4,4'-dicarbonyl diisothiocyanate.

Further, polyfunctional isothiocyanate having at least one sulfur atom in addition to a sulfur atom of the isothiocyanate group can also be used. Specific examples of such polyfunctional isothiocyanate can include the compounds described below.

Sulfur-containing aliphatic isothiocyanate: thiobis(3-isothiocyanatopropane), thiobis(2-isothiocyanatoethane) and dithiobis(2-isothiocyanatoethane).

Sulfur-containing aromatic isothiocyanate: 1-isothiocyanato-4-{(2-isothiocyanato)sulfonyl}benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-{(4-isothiocyanatophenyl)sulfonyl}-2-methoxy-benzene, 4-methyl-3-isothiocyanatobenzenesulfonyl-4'-isothiocyanatophenyl ester and 4-methyl-3-isothiocyanatobenzenesulfonylanilide-3'-methyl-4'-isothiocyanate.

Sulfur-containing heterocyclic isothiocyanate: thiophene-2,5-diisothiocyanate and 1,4-dithiane-2,5-diisothiocyanate.

<Preferred Examples for (B) Component>

Preferred examples of the polyiso(thio)cyanate compound being the (B) component are preferably selected from pentamethylene diisocyanate, hexamethylene diisocyanate, heptamethylene diisocyanate, octamethylene diisocyanate, isophorone diisocyanate, norbornane diisocyanate, 2,5-bis(isocyanatomethyl)-bicyclo[2,2,1]-heptane, 2,6-bis(isocyanatomethyl)-bicyclo[2,2,1]-heptane, 1,2-bis(2-isocyanatoethylthio)ethane, xylene diisocyanate (o-, m-, p-), 2,4-tolylene diisocyanate, 2,6-tolylene diisocyanate and 4,4'-diphenylmethane diisocyanate, and may be selected from a mixture thereof.

<Preferred Blending Proportion of (A) and (B) Components>

Further, according to the present invention, with regard to an optimum blending proportion of the (A) and (B) components described above for obtaining excellent moldability, mechanical strength and hardness in the optical article or excellent photochromic characteristics upon adding the photochromic compound thereto, to be described later, the resulting blend contains preferably (A) in the range from 50 to 97 parts by mass, and (B) in the range from 3 to 50 parts by mass, further preferably (A) in the range from 60 to 95 parts by mass, and (B) in the range from 5 to 40 parts by mass, and most preferably (A) in the range from 70 to 93 parts by mass, and (B) in the range from 7 to 30 parts by mass, based on a total of 100 parts by mass of the (A) and the (B) described above.

Moreover, in the present invention, in addition to the polyrotaxane being the (A) component, an iso(thio)cyanate reactive group-containing compound (C) in which the group can react with the (B) component can be used. The (C) component will be described below.

<(C) Iso(thio)Cyanate Reactive Group-Containing Compound>

Specific examples of the iso(thio)cyanate reactive group-containing compound can include: a poly(thi)ol compound having two or more hydroxyl groups and/or thiol groups in one molecule (C-1) or a mono(thi)ol compound having one hydroxyl group or thiol group in one molecule (C-2).

<(C-1) Poly(thi)ol Compound Having Two or More Groups of at Least One Kind of Group Selected from a Hydroxyl Group and a Thiol Group in One Molecule>

A poly(thi)ol compound having two or more groups of at least one kind of group selected from a hydroxyl group and a thiol group in one molecule (hereinafter, also referred to simply as "poly(thi)ol compound") is a compound having two or more (in total) of at least one kind of group selected from the hydroxyl group (OH group) and the thiol group (SH group) in the poly(thi)ol compound. Among the poly(thi)ol compounds, the polyol compound is typified, for example, by a di-, tri-, tetra-, penta- or hexa-hydroxy compound, polyester containing two or more OH groups in one molecule (polyester polyol), polyether containing two or more OH groups in one molecule (hereinafter, referred to as polyether polyol), polycarbonate containing two or more OH groups in one molecule (polycarbonate polyol), polycaprolactone containing two or more OH groups in one molecule (polycaprolactone polyol) and an acrylic polymer containing two or more OH groups in one molecule (polyacryl polyol).

Moreover, specific examples of the polythiol compound include: aliphatic polythiol, aromatic polythiol, halogen-substituted aromatic polythiol, heterocycle-containing polythiol and sulfur atom-containing aromatic polythiol in addition to a mercapto group, sulfur atom-containing aliphatic polythiol in addition to a mercapto group, and a sulfur atom-containing heterocycle-containing polythiol in addition to a mercapto group. Specific examples of these compounds are as described below.

Aliphatic alcohol: ethylene glycol, diethylene glycol, propylene glycol, dipropylene glycol, butylene glycol, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, neopentyl glycol, glycerin, trimethylolethane, trimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, dulcitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5,2,1,0$^{2.6}$]decane-dimethanol, bicyclo[4,3,0]-nonanediol, dicyclohexanediol, tricyclo[5,3,1,1$^{3.9}$]dodecanediol, bicyclo[4,3,0]nonanedimethanol, tricyclo[5,3,1,1$^{3.9}$]dodecane-diethanol, hydroxypropyl tricyclo[5,3,1,1$^{3.9}$]dodecanol, spiro[3,4]octanediol, butylcyclohexanediol, 1,1'-bicyclohexylidenediol, cyclohexanetriol, maltitol, lactitol, 3-methyl-1,5-dihydroxypentane, dihydroxyneopentyl, 2-ethyl-1,2-dihydroxyhexane, 2-methyl-1,3-dihydroxypropane, 1,4-cyclohexanedimethanol, 1,3-cyclohexanedimethanol, 1,2-cyclohexanedimethanol, o-dihydroxyxylylene, m-dihydroxyxylylene, p-dihydroxyxylylene, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, 1,4-bis(6-hydroxyhexyl) benzene, 2,2-bis[4-(2"-hydroxyethyloxy)phenyl]propane, as a trifunctional polyol, TMP-30, TMP-60 and TMP-90, manufactured by Nippon Nyukazai Co., Ltd., and as a tetrafunctional polyol, PNT40 and PNT60, manufactured by Nippon Nyukazai Co., Ltd.

Aromatic alcohol: dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, tetrabromobisphenol A, bis(4-hydroxyphenyl)methane, 1,1-bis(4-hydroxyphenyl)ethane, 1,2-bis(4-hydroxyphenyl)ethane, bis(4-hydroxyphenyl)phenylmethane, bis(4-hydroxyphenyl)diphenylmethane, bis(4-hydroxyphenyl)-1-naphthylmethane, 1,1-bis(4-hydroxyphenyl)-1-phenylethane, 2-(4-hydroxyphenyl)-2-(3-hydroxyphenyl)propane, 2,2-bis(4-hydroxyphenyl)butane, 1,1-bis(4-hydroxyphenyl)butane, 2,2-bis(4-hydroxyphenyl)-3-methylbutane, 2,2-bis(4-hydroxyphenyl)pentane, 3,3-bis(4-hydroxyphenyl)pentane, 2,2-bis(4-hydroxyphenyl)hexane, 2,2-bis(4-hydroxyphenyl)octane, 2,2-bis(4-hydroxyphenyl)-4-methylpentane, 2,2-bis(4-hydroxyphenyl)heptane, 4,4-bis(4-hydroxyphenyl)heptane, 2,2-bis(4-hydroxyphenyl)tridecane, 2,2-bis(4-hydroxyphenyl)octane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl) propane, 2,2-bis(3-sec-butyl-4-hydroxyphenyl) propane, 2,2-bis(3-tert-butyl-4-hydroxyphenyl)propane, 2,2-bis(3-cyclohexyl-4-hydroxyphenyl)propane, 2,2-bis(3-allyl-4'-hydroxyphenyl)propane, 2,2-bis(3-methoxy-4-hydroxyphenyl)propane, 2,2-bis(3,5-dimethyl-4-hydroxyphenyl)propane, 2,2-bis(2,3,5,6-tetramethyl-4-hydroxyphenyl)propane, bis(4-hydroxyphenyl)cyanomethane, 1-cyano-3,3-bis(4-hydroxyphenyl)butane, 2,2-bis(4-hydroxyphenyl) hexafluoropropane, 1,1-bis(4-hydroxyphenyl)cyclopentane, 1,1-bis(4-hydroxyphenyl)cyclohexane, 1,1-bis(4-hydroxyphenyl)cycloheptane, 1,1-bis(3-methyl-4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3-methyl-4-hydroxyphenyl)-4-methylcyclohexane, 1,1-bis(4-hydroxyphenyl)-3,3,5-trimethylcyclohexane, 2,2-bis(4-hydroxyphenyl)norbornane, 2,2-bis(4-hydroxyphenyl)adamantane, 4,4'-dihydroxydiphenyl ether, 4,4'-dihydroxy-3,3'-dimethyldiphenyl ether, ethylene glycol bis(4-hydroxyphenyl)ether, 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide, 4,4'-dihydroxydiphenyl sulfoxide, 3,3'-dimethyl-4,4'-dihydroxydiphenyl sulfoxide, 4,4'-dihydroxydiphenyl sulfone, 4,4'-dihydroxy-3,3'-dimethyldiphenyl sulfone, bis(4-hydroxyphenyl)ketone, bis(4-hydroxy-3-methylphenyl)ketone, 7,7'-dihydroxy-3,3',4,4'-tetrahydro-4,4,4',4'-tetramethyl-2,2'-spirobi(2H-1-benzopyran), trans-2,3-bis(4-hydroxyphenyl)-2-butene, 9,9-bis(4-hydroxyphenyl)fluorene, 3,3-bis(4-hydroxyphenyl)-2-butanone, 1,6-bis(4-hydroxyphenyl)-1,6-hexanedione, 4,4'-dihydroxybiphenyl and hydroquinone resorcin.

Sulfur-containing polyol: bis-[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, bis-[2-methyl-4-(hydroxyethoxy)-6-butylphenyl]sulfide, a compound in which three or less molecules (on an average) of ethylenoxide and/or propylene oxide per one hydroxyl group are added to the sulfur-containing polyol, di-(2-hydroxyethyl)sulfide, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone, tetrabromobisphenol S, tetramethylbisphenol S, 4,4'-thiobis(6-tert-butyl-3-methylphenol) and 1,3-bis(2-hydroxyethylthioethyl)-cyclohexane.

Sulfur-containing heterocyclic polyol: 2,5-bis(hydroxymethyl)-1,4-dithiane, 3-hydroxy-6-hydroxymethyl-1,5-dithiacycloheptane and 3,7-dihydroxy-1,5-dithiacyclooctane.

Polyester polyol: a compound obtained by a condensation reaction of polyol with polybasic acid.

Polyether polyol: a compound obtained by a reaction of a compound having two or more active hydrogen-containing groups in a molecule with alkylene oxide, and a modified product thereof.

Polycaprolactone polyol: a compound obtained by ring-opening polymerization of ε-caprolactone.

Polycarbonate polyol: a compound obtained by phosgenation of one or more kinds of low molecular-weight polyols, and a compound obtained by a transesterification process using ethylene carbonate, diethyl carbonate, diphenyl carbonate or the like.

Polyacryl polyol: a compound obtained from a copolymer of hydroxyl group-containing acrylate or methacrylate with a monomer copolymerizable with the ester.

Aliphatic polythiol: methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2,2,1]hepta-exo-cis-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol (2-mercaptoacetate), 2,3-dimercapto-1-propanol (3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), 1,4-bis(3-mercaptobutyryloxy)butane, 1,4-butanediol bis(3-mercaptopropionate), 1,4-butanediol bis(thioglycolate), 1,6-hexanediol bis(thioglycolate), tetraethylene glycol bis(3-mercaptopropionate), trimethylolpropane tris(2-mercaptoacetate), trimethylolpropane tris(3-mercaptopropionate), trimethylolethane tris(3-mercaptobutyrate), trimethylolpropane tris(3-mercaptobutyrate), pentaerythritol tetrakis(2-mercaptoacetate), pentaerythritol tetrakis(3-mercaptopropionate), 1,2-bis(2-mercaptoethylthio)-3-mercaptopropane, dipentaerythritol hexakis(3-mercaptopropionate), pentaerythritol tetrakis(3-mercaptobutyrate), 1,4-bis(3-mercaptobutyryloxy)butane, trimethylolpropane tris(3-mercaptobutyrate), trimethylolethane tris(3-mercaptobutyrate), 1,2-bis[(2-mercaptoethyl)thio]-3-mercaptopropane, 2-mercaptomethyl-1,3-propanedithiol, 2-mercaptomethyl-1,4-butanedithiol, 2,4,5-tris(mercaptomethyl)-1,3-dithiolane, 2,2-bis(mercaptomethyl)-1,4-butanedithiol, 4,4-bis(mercaptomethyl)-3,5-dithiaheptane-1,7-dithiol, 2,3-bis(mercaptomethyl)-1,4-butanedithiol, 2,6-bis(mercaptomethyl)-3,5-dithiaheptane-1,7-dithiol, 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane and 4-mercaptomethyl-1,8-dimercapto-3,6-dithiaoctane.

Aromatic polythiol: 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane and 1,4-bis(mercaptopropylthiomethyl)benzene.

Halogen-substituted aromatic polythiol: 2,5-dichlorobenzene-1,3-dithiol, 1,3-di(p-chlorophenyl)propane-2,2-dithiol, 3,4,5-tribromo-1,2-dimercapto benzene and 2,3,4,6-tetrachloro-1,5-bis(mercaptomethyl)benzene.

Heterocycle-containing polythiol: 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine and 1,3,5-tris(3-mercaptobutyryloxyethyl)-1,3,5-triazine-2,4,6(1H,3H,5H)-trione.

Sulfur atom-containing aromatic polythiol in addition to a mercapto group: 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene and 1,2,4,5-tetrakis(mercaptoethylthio)benzene.

Sulfur atom-containing aliphatic polythiol in addition to a mercapto group: bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3- mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide, bis(mercaptopropyl)disulfide, an ester of thioglycolic acid or mercaptopropionic acid of the compound, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-(mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethylether bis(2-mercaptoacetate), 2-mercaptoethylether bis(3-mercaptopropionate), 1,4-dithiane-2,5-diol bis(2-mercaptoacetate), 1,4-dithiane-2,5-diol bis(3-mercaptopropionate), 2,5-bis(mercaptomethyl)-1,4-dithiane, 2,5-bis(2-mercaptoethyl)-1,4-dithiane, 2,5-bis(3-mercaptopropyl)-1,4-dithiane, 2-(2-mercaptoethyl)-5-mercaptomethyl-1,4-dithiane, 2-(2-mercaptoethyl)-5-(3-mercaptopropyl)-1,4-dithiane, 2-mercaptomethyl-5-(3-mercaptopropyl)-1,4-dithiane, thioglycolic acid bis(2-mercaptoethyl ester), thiodipropionic acid bis(2-mercaptoethyl ester), 4,4'-thiodibutyl acid bis(2-mercaptoethyl ester), dithiodiglycolic acid bis(2-mercaptoethyl ester), dithiodipropionic acid bis(2-mercaptoethyl ester), 4,4'-dithiodibutyl acid bis(2-mercaptoethyl ester), thiodiglycol acid bis(2,3-dimercaptopropyl ester), thiodipropionic acid bis(2,3-dimercaptopropyl ester), dithiodiglycolic acid bis(2,3-dimercaptopropyl ester), dithiodipropionic acid (2,3-dimercaptopropyl ester), 2-mercaptomethyl-6-mercapto-1,4-dithiacycloheptane, 4,5-bis(mercaptomethylthio)-1,3-dithiolane, 4,6-bis(mercaptomethylthio)-1,3-dithiane, 2-bis(mercaptomethylthio)methyl-1,3-dithietane, 2-(2,2-bis(mercaptomethylthio)ethyl)-1,3-dithietane, 1,2,7-trimercapto-4,6-dithiaheptane, 1,2,9-trimercapto-4,6,8-trithianonan, 1,2,11-trimercapto-4,6,8,10-tetrathiaundecane, 1,2,13-trimercapto-4,6,8,10,12-pentathiatridecane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, bis(2,5-dimercapto-4-thiapentyl)disulfide, bis(2,7-dimercapto-4,6-dithiaheptyl)disulfide, 1,2,5-trimercapto-4-thiapentane, 3,3-dimercaptomethyl-1,5-dimercapto-2,4-dithiapentane, 3-mercaptomethyl-1,5-dimercapto-2,4-dithiapentane, 3-mercaptomethylthio-1,7-dimercapto-2,6-dithiaheptane, 3,6-dimercaptomethyl-1,9-dimercapto-2,5,8-trithianonane, 3,7-dimercaptomethyl-1,9-dimercapto-2,5,8-trithianonane, 4,6-dimercaptomethyl-1,9-dimercapto-2,5,8-trithianonane, 3-mercaptomethyl-1,6-dimercapto-2,5-dithiahexane, 3-mercaptomethylthio-1,5-dimercapto-2-thiapentane, 1,1,2,2-tetrakis(mercaptomethylthio)ethane, 1,1,3,3-tetrakis(mercaptomethylthio)propane, 1,4,8,11-tetramercapto-2,6,10-trithiaundecane, 1,4,9,12-tetramercapto-2,6,7,11-tetrathiadodecane, 2,3-dithia-1,4-butanedithiol, 2,3,5,6-tetrathia-1,7-heptanedithiol, 2,3,5,6,8,9-hexathia-1,10-decanedithiol, 2-(1-mercapto-2-mercaptomethyl-3-thiabutyl)-1,3-dithiolane, 1,5-dimercapto-3-mercaptomethylthio-2,4-dithiapentane, 2-mercaptomethyl-4-mercapto-1,3-dithiolane, 2,5-dimercapto-1,4-dithiane, 2,6-dimercapto-1,4-dithiane, 2,4-dimercaptomethyl-1,3-dithietane, 1,2,6,10,11-pentamercapto-4,8-dithiaundecane, 1,2,9,10-tetramercapto-6-mercaptomethyl-4,7-dithiadecane, 1,2,9,13,14-pentamercapto-6-mercaptomethyl-4,7,11-trithiatetradecane, 1,2,6,10,14,15-hexamercapto-4,8,12-trithiapentadecane, 1,4-dithiane-2,5-bis(4,5-dimercapto-2-thiapentane) and 1,4-dithiane-2,5-bis(5,6-dimercapto-2,3-dithiahexane).

Sulfur atom-containing heterocycle-containing polythiol in addition to a mercapto group: 3,4-thiophenedithiol, tetrahydrothiophene-2,5-dimercaptomethyl and 2,5-dimercapto-1,3,4-thiadiazole.

Isocyanurate group-containing polythiol: 1,2-bis[(2-mercaptoethyl)thio]-3-mercaptopropane, tris-{(3-mercaptopropionyloxy)-ethyl}-isocyanurate, 1,3,5-tris(3-mercaptobutyryloxyethyl)-1,3,5-triazine-2,4,6(1H,3H,5H)-trione and tris-[(3-mercaptopropionyloxy)-ethyl]-isocyanurate.

Moreover, as the (C-1) component in the present invention, a compound having one or more hydroxyl groups and thiol groups each in one molecule can also be used. Specific examples thereof can include the following compounds.

2-Mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfide mono(3-mercaptopropionate), dimercaptoethane mono(salicylate) and hydroxyethylthiomethyl-tris(mercaptoethylthio)methane.

As the (C-1) component, a compound having a silsesquioxane structure can be used in addition thereto. The silsesquioxane is a compound represented by the following formula (5).

[Formula 14]

$$(R^6-SiO_{3/2})_n \qquad (5)$$

{where, a plurality of $R^6$ are any of an organic group containing a hydroxyl group and/or thiol group, a hydrogen atom, an alkyl group, a cycloalkyl group, an alkoxy group or a phenyl group, which may be the same with or different from each other, and have two or more the organic group containing the hydroxyl group and/or thiol group in at least one molecule, and a degree of polymerization n is an integer from 6 to 100.}.

The organic group containing the hydroxyl group and/or thiol group in $R^6$ in the formula (5) is a monovalent hydrocarbon group having at least one hydroxyl group and/or thiol group bound thereto and having 1 to 10 carbon atoms, or a monovalent group containing an oxygen atom or a sulfur atom in a chain having at least one hydroxyl group and/or thiol group bound thereto and having 1 to 10 carbons. Specifically, preferred examples include an alkylene chain having 1 to 10 carbon atoms, and an organic group derived from polyol, polythiol or the like.

Moreover, the alkyl group in $R^6$ is preferably an alkyl group having 1 to 10 carbon atoms. Specific examples of the alkyl group having 1 to 10 carbon atoms include a methyl group, an ethyl group, a n-propyl group, an isopropyl group, a n-butyl group, a sec-butyl group, a tert-butyl group, a n-pentyl group, a n-hexyl group, a n-octyl group and an isooctyl group.

The cycloalkyl group is preferably a cycloalkyl group having 3 to 8 carbon atoms. Specific examples of the cycloalkyl group having 3 to 8 carbon atoms include a cyclopropyl group, a cyclobutyl group, a cyclooctyl group, a cyclohexyl group, a cycloheptyl group and a cyclooctyl group.

The alkoxy group is preferably an alkoxy group having 1 to 6 carbon atoms. Specific examples of the alkoxy group having 1 to 6 carbon atoms include a methoxy group, an ethoxy group, a n-propoxy group, an isopropoxy group, a n-butoxy group, a sec-butoxy group and a tert-butoxy group.

In general, a silsesquioxane compound can take various structures such as a cage-like structure, a ladder-like structure and a random structure, but in the present invention, the silsesquioxane compound is preferably a mixture formed of a plurality of structures.

<Preferred Examples of (C-1) Component>

Preferred examples of the poly(thi)ol compound being the (C-1) component include: polyethylene polyol, polycaprolactone polyol, polycarbonate polyol, trimethylolpropane, pentaerythritol, trimethylolpropane tris(3-mercaptopropionate), pentaerythritol tetrakis(3-mercaptopropionate), dipentaerythritol hexakis(3-mercaptopropionate), tetraethylene glycol bis(3-mercaptopropionate), 1,4-butanediol bis(3-mercaptopropionate), 1,6-hexandiol bis(3-mercaptopropionate), 1,2-bis[(2-mercaptoethyl)thio]-3-mercaptopropane, 2,2-bis(mercaptomethyl)-1,4-butanedithiol, 1,4-bis(mercaptopropylthiomethyl)benzene, 2,5-bis(mercaptomethyl)-1,4-dithiane, 4-mercaptomethyl-1,8-dimercapto-3,6-dithiaoctane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane, 2-mercaptomethanol and tris-{(3-mercaptopropionyloxy)-ethyl}-isocyanurate.

Next, (C-2) mono(thi)ol compound having one hydroxyl group or one thiol group in one molecule will be described.

<(C-2) Mono(thi)ol Compound Having One Hydroxyl Group or One Thiol Group in One Molecule>

In the present invention, the mono(thi)ol compound having one hydroxyl group or one thiol group in one molecule (hereinafter, also referred to simply as "mono(thi)ol compound") can be used. If the optical composition according to the present invention is cured, a rigid cured body of a network structure having a (thio)urethane bond can be obtained by a reaction of the polyiso(thio)cyanate compound with the poly(thi)ol compound. Further, a mono(thi)ol compound having one end-free structure is incorporated into the network structure by blending the (C-2) component into the optical composition, and therefore a flexible space is formed in the periphery of the mono(thi)ol compound. Accordingly, the reversible structural change of the photochromic compound existing in the vicinity of the space is further immediately caused, and therefore the photochromic cured body having excellent photochromic characteristics (the color optical density and the color fading rate) can be conceivably produced.

Further, the mono(thi)ol compound has only one hydroxyl group or only one thiol group, and therefore an amount of a hydrogen bond is smaller than an amount in the poly(thi)ol compound. As a result, the mono(thi)ol compound has a high effect on reducing viscosity of the optical composition.

Specific examples of the mono(thi)ol compound can include the compounds described below.

Compound having one hydroxyl group in one molecule: polyethylene glycol monooleyl ether, polyoxyethylene oleate, polyethylene glycol monolaurate, polyethylene glycol monostearate, polyethylene glycol mono-4-octylphenyl ether, straight-chain polyoxyethylene alkyl ether (polyethylene glycol monomethyl ether, polyoxyethylene lauryl ether, polyoxyethylene-2-ethylhexyl ether, polyoxyethylene tridecyl ether, polyoxyethylene cetyl ether, polyoxyethylene stearyl ether), and saturated alkyl alcohol having a straight-chain or branched-chain shape and having 5 to 30 carbon atoms.

Compound having one thiol group in one molecule: 3-methoxybutyl thioglycolate, 2-ethylhexyl thioglycolate, 2-mercaptoethyl octanoate, 3-methoxybutyl 3-mercaptopropionate, 3-methoxybutyl thioglycolate, ethyl 3-mercaptopropionate, 2-octyl 3-mercaptopropionate, n-octyl-3-mercaptopropionate, methyl-3-mercaptopropionate, tridecyl-3-mercaptopropionate, stearyl-3-mercaptopropionate and saturated alkyl thiol having a straight-chain or branched-chain structure and having 5 to 30 carbon atoms.

<Preferred Blending Proportion of (A), (B) and (C) Components>

Further, in the optical composition according to the present invention, with regard to an optimum blending proportion of the (A), (B) and (C) components described above for obtaining excellent moldability, mechanical strength and hardness in the optical article or excellent photochromic characteristics upon adding the photochromic compound thereto, to be described later, the resulting blend contains preferably (A) in the range from 3 to 15 parts by mass, (B) in the range from 25 to 70 parts by mass, and (C) in the range from 20 to 65 parts by mass, and most preferably (A) in the range from 4 to 10 parts by mass, (B) in the range from 30 to 60 parts by mass, and (C) in the range from 30 to 60 parts by mass, when a total of the (A), (B) and (C) components described above is taken as 100 parts by mass.

<(D) Photochromic Compound>

The optical composition to which the photochromic compound is added according to the present invention can be used as a photochromic optical composition.

As the photochromic compound exhibiting the photochromism, publicly-known compounds per se can be used, and these compounds can be used alone, or in combination with two or more kinds thereof. The plastic lens having the photochromic characteristics can be produced by adding these compounds to the optical composition and causing polymerization curing of the resulting material.

Typified materials as such a photochromic compound include a fulgide compound, a chromene compound and a spirooxazine compound, and are disclosed in a lot of literature, such as JP-H2-28154 A, JP-S62-288830 A, WO 94/22850 A and WO 96/14596 A, for example.

In the present invention, among the publicly-known photochromic compounds, from a viewpoint of the photochromism such as color optical density, initial coloring properties, durability and a color fading rate, a chromene compound having an indeno[2,1-f]naphtho[1,2-b]pyran skeleton is further preferably used, and a chromene compound having a molecular weight of 540 or more is particularly preferably used because the compound is particularly excellent in the color optical density and the color fading rate.

The chromene compounds shown below are examples of the chromene compounds particularly preferably used in the present invention.

[Formula 15]

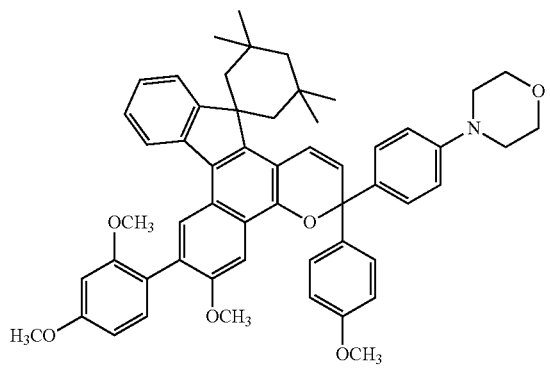

[Formula 16]

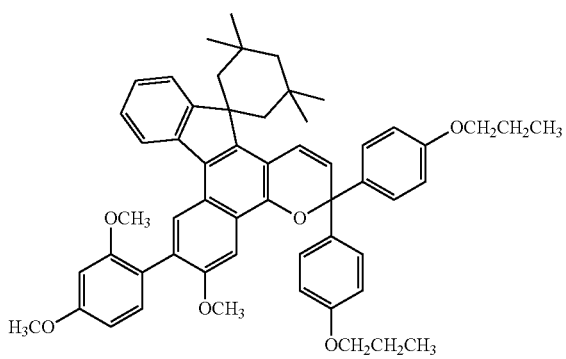

[Formula 17]

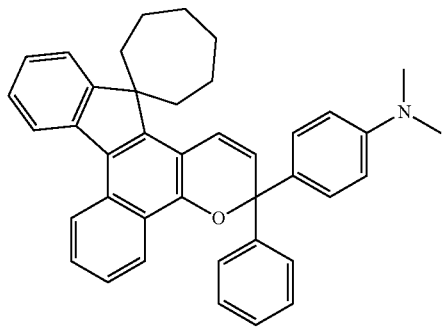

[Formula 18]

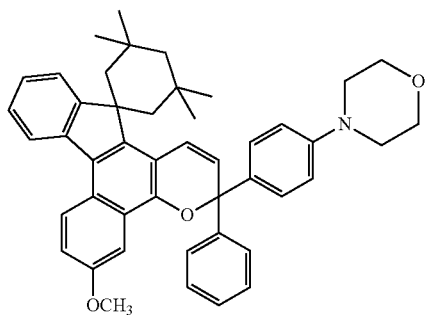

<Preferred Composition of the Photochromic Optical Composition>

In the optical composition according to the present invention, a preferred amount of use thereof is different also depending on a method for developing the photochromism. Upon polymerizing the composition into the photochromic cured body by the kneading method, when the photochromism of the photochromic cured body are developed, the photochromic compound (D) is used preferably in an amount from 0.0001 to 10 parts by mass, further preferably in an amount from 0.001 to 2 parts by mass, and most preferably in an amount from 0.001 to 1 part by mass, based on a total of 100 parts by mass of the (A) component, the (B) component and the (C) component. Moreover, when the photochromism is developed by the lamination method, the photochromic compound (D) is used preferably in an amount from 0.01 to 20 parts by mass, and further preferably in an amount from 0.01 to 10 parts by mass. Moreover, when the photochromism is developed by the binder method, the component (D) is used preferably in an amount from 0.1 to 40 parts by mass, and further preferably from 0.5 to 20 parts by mass.

<(E) Resin Modifier, (F) Polymerization Curing Accelerator or (G) Internal Mold Release Agent>

In the optical composition according to the present invention, in addition to each component of (A), (B) and (C), the optical composition may further contain a resin modifier (E), a polymerization curing accelerator (F) or an internal mold release agent (G) for the purpose of improving a refractive index, moldability, adjusting hardness of the cured body and the like. These materials will be described.

<(E) Resin Modifier>

In the present invention, the resin modifier can be added thereto for the purpose of improving the refractive index of the cured body to be obtained, or adjusting the hardness thereof. Specific examples include an episulfide-based compound, a thietanyl-based compound, an epoxy compound and an olefin compound containing a (meth)acrylate compound. Specific examples will be described below.

<Episulfide-Based Compound>

The episulfide-based compound is a compound having two or more episulfide groups in one molecule, and is cured by the ring-opening polymerization. These compounds may be added thereto for achieving a high refractive index. Specific examples of such an episulfide compound can include compounds described below.

Bis(1,2-epithioethyl)sulfide, bis(1,2-epithioethyl)disulfide, bis(2,3-epithiopropyl)sulfide, bis(2,3-epithiopropylthio)methane, bis(2,3-epithiopropyl)disulfide, bis(2,3-epithiopropyldithio)methane, bis(2,3-epithiopropyldithio)ethane, bis(6,7-epithio-3,4-dithiaheptyl)sulfide, bis(6,7-epithio-3,4-dithiaheptyl)disulfide, 1,4-dithiane-2,5-bis(2,3-epithiopropyldithiomethyl), 1,3-bis(2,3-epithiopropyldithiomethyl)benzene, 1,6-bis(2,3-epithiopropyldithiomethyl)-2-(2,3-epithiopropyldithioethylthio)-4-thiahexane, 1,2,3-tris(2,3-epithiopropyldithio)propane, 1,1,1,1-tetrakis(2,3-epithiopropyldithiomethyl)methane, 1,3-bis(2,3-epithiopropyldithio)-2-thiapropane, 1,4-bis(2,3-epithiopropyldithio)-2,3-dithiabutane, 1,1,1-tris(2,3-epithiopropyldithio)methane, 1,1,1-tris(2,3-epithiopropyldithiomethylthio)methane, 1,1,2,2-tetrakis(2,3-epithiopropyldithio)ethane, 1,1,2,2-tetrakis(2,3-epithiopropyldithiomethylthio)ethane, 1,1,3,3-tetrakis(2,3-epithiopropyldithio)propane, 1,1,3,3-tetrakis(2,3-epithiopropyldithiomethylthio)propane, 2-[1,1-bis(2,3-epithiopropyldithio)methyl]-1,3-dithietane and 2-[1,1-bis(2,3-epithiopropyldithiomethylthio)methyl]-1,3-dithietane.

<Thietanyl-Based Compound>

The thietanyl-based compound is a thietane compound having two or more thietanyl groups in one molecule, and is cured by the ring-opening polymerization. These compounds may be added thereto for achieving the high refractive index. A part of such a thietanyl compound has an episulfide group together with a plurality of thietanyl groups, which are listed in the section of the episulfide-based compound described above. Other thietanyl compounds include a metal-containing thietane compound having a metal atom in the molecule, and a non-metal thietane compound containing no metal therein. Specific examples of such a thietanyl compound can include the compounds described below.

Non-metal thietane compound: bis(3-thietanyl)disulfide, bis(3-thietanyl)sulfide, bis(3-thietanyl)trisulfide, bis(3-thietanyl)tetrasulfide, 1,4-bis(3-thietanyl)-1,3,4-trithiabutane, 1,5-bis(3-thietanyl)-1,2,4,5-tetrathiapentane, 1,6-bis(3-thietanyl)-1,3,4,6-tetrathiahexane, 1,6-bis(3-thietanyl)-1,3,5,6-tetrathiahexane, 1,7-bis(3-thietanyl)-1,2,4,5,7-pentathiaheptane, 1,7-bis(3-thietanylthio)-1,2,4,6,7-pentathiaheptane, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dithiaoctane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, bisthietanyl sulfide, bis(thietanylthio)methane, 3-[<(thietanylthio)methylthio>methylthio]thiethane, bisthietanyl disulfide, bisthietanyl trisulfide, bisthietanyl tetrasulfide, bisthietanyl pentasulfide, 1,4-bis(3-thietanyldithio)-2,3-dithiabutane, 1,1,1-tris(3-thietanyldithio)methane, 1,1,1-tris(3-thietanyldithiomethylthio)methane, 1,1,2,2-tetrakis(3-thietanyldithio)ethane and 1,1,2,2-tetrakis(3-thietanyldithiomethylthio)ethane.

<Metal-Containing Thietane Compound>

This thietane compound contains a Group 14 element such as a Sn atom, a Si atom, a Ge atom and a Pb atom; a Group 4 element such as a Zr atom and a Ti atom; a Group 13 element such as an Al atom; or a Group 12 element such as a Zn atom, as a metal atom in the molecule. For example, the compounds described below are particularly preferably used.

Alkylthio(thietanylthio)tin: methylthio tris(thietanylthio)tin, ethylthio tris(thietanylthio)tin, propylthio tris(thietanylthio)tin and isopropylthio tris(thietanylthio)tin.

Bis(alkylthio)bis(thietanylthio)tin: bis(methylthio)bis(thietanylthio)tin, bis(ethylthio)bis(thietanylthio) tin, bis(propylthio)bis(thietanylthio)tin and bis(isopropylthio)bis(thietanylthio)tin.

Alkylthio(alkylthio)bis(thietanylthio)tin: ethylthio(methylthio)bis(thietanylthio)tin, methylthio(propylthio)bis(thietanylthio)tin, isopropylthio(methylthio)bis(thietanylthio)tin, ethylthio(propylthio)bis(thietanylthio)tin, ethylthio(isopropylthio)bis(thietanylthio)tin and isopropylthio(propylthio)bis(thietanylthio)tin.

Bis(thietanylthio)cyclic dithiotin compound: bis(thietanylthio)dithiastannetane, bis(thietanylthio)dithiastannolane, bis(thietanylthio)dithiastanninane and bis(thietanylthio)trithiastannokane.

Alkyl(thietanylthio)tin compound: methyl tris(thietanylthio)tin, dimethyl bis(thietanylthio)tin, butyl tris(thietanylthio)tin, tetrakis(thietanylthio)tin, tetrakis(thietanylthio)germanium and tris(thietanylthio)bismuth.

<Epoxy Compound>

The epoxy compound has an epoxy group as a polymerizable group in the molecule, and is cured by the ring-opening polymerization. These compounds may be added thereto for adjusting the refractive index and the hardness of the lens. Such an epoxy compound is generally classified into an aliphatic epoxy compound, an alicyclic epoxy compound and an aromatic epoxy compound, and specific examples thereof can include the compounds described below.

Aliphatic epoxy compound: ethylene oxide, 2-ethyl oxirane, butyl glycidyl ether, phenyl glycidyl ether, 2,2'-methylene bis oxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, diglycidyl ether of tris(2-hydroxyethyl)isocyanurate and triglycidyl ether of tris(2-hydroxyethyl)isocyanurate.

Alicyclic epoxy compound: isophoronediol diglycidyl ether and bis-2,2-hydroxycyclohexylpropane diglycidyl ether.

Aromatic epoxy compound: resorcin diglycidyl ether, bisphenol A diglycidyl ether, bisphenol F diglycidyl ether, bisphenol S diglycidyl ether, o-phthalic acid diglycidyl ester, phenol novolak polyglycidyl ether and cresol novolak polyglycidyl ether.

Moreover, in addition to the compounds described above, an epoxy compound having a sulfur atom together with an epoxy group in the molecule can also be used. Such a sulfur atom-containing epoxy compound particularly contributes to improvement in the refractive index, and includes a chain aliphatic group-based compound and a cyclic aliphatic group-based compound. Specific examples thereof are as described below.

Chain aliphatic group-based sulfur atom-containing epoxy compound: bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomethyl)propane and 2,2-bis(2,3-epoxypropylthiomethyl)-1-(2,3-epoxypropylthio)butane.

Cyclic aliphatic group-based sulfur atom-containing epoxy compound: 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[<2-(2,3-epoxypropylthio)ethyl>thiomethyl]-1,4-dithiane and 2,5-bis(2,3-epoxy-propylthiomethyl)-2,5-dimethyl-1,4-dithiane.

<Olefin Compound Containing a (meth)Acrylate Compound, and Compounds Having Other Radical Polymerizable Groups>

An olefin compound containing a (meth)acrylate compound and compounds having other radical polymerizable groups each have a radical polymerizable group as a polymerizable group in the molecule, and are cured by the radical polymerization. These compounds can be used for adjusting the hardness of the lens, and specific examples thereof can include compound described below.

(Meth)acrylate compound: ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, propylene glycol diacrylate, propylene glycol dimethacrylate, dipropylene glycol diacrylate, dipropylene glycol dimethacrylate, tripropylene glycol diacrylate, tripropylene glycol dimethacrylate, polypropylene glycol dimethacrylate, polypropylene glycol diacrylate, neopentyl glycol diacrylate, neopenthyl glycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-methacryloyloxyethoxyphenyl)propane, 2,2-bis(3,5-dibromo-4-methacryloyloxyethoxyphenyl)propane, 2,2-bis(4-methacryloyloxydipropoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, ditrimethylolpropane tetraacrylate, ditrimethylolpropane tetramethacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylylenedithiol diacrylate, xylylenedithiol dimethacrylate, mercaptoethylsulfide diacrylate, mercaptoethylsulfide dimethacrylate, bifuntional urethane acrylate and bifunctional urethane methacrylate.

Allyl compound: allyl glycidyl ether, diallyl phthalate, diallyl terephthalate, diallyl isophthalate, diallyl carbonate, diethylene glycol bis allyl carbonate and methoxy polyethylene glycol allyl ether.

Vinyl compound: α-methylstyrene, an α-methylstyrene dimer, styrene, chlorostyrene, methylstyrene, bromostyrene, dibromostyrene, divinylbenzene and 3,9-divinyl spirobi(m-dioxane).

<(F) Polymerization Curing Accelerator>

In the optical composition according to the present invention, various polymerization curing accelerators can be used for immediately accelerating the polymerization curing according to a kind of the compound described above.

For example, when the accelerator is used for a reaction of the hydroxyl group and the thiol group with a NCO group and a NCS group, a reaction catalyst for urethane or urea or a condensation agent is used as the polymerization curing accelerator.

When the episulfide-based compound, the thietanyl-based compound or the epoxy compound is used therefor, a cationic polymerization catalyst for allowing the ring-opening polymerization of an epoxy curing agent or the epoxy group is used as the polymerization curing accelerator.

When the composition contains a compound having a (meth)acryl group, and other radical polymerizable groups (the olefin compound containing the (meth)acrylate compound and the compounds having other radical polymerizable groups), a radical polymerization initiator is used as the polymerization curing accelerator.

<Reaction Catalyst for Urethane or Urea>

This reaction catalyst is used in formation of a poly(thio) urethane bond by a reaction of polyiso(thia)cyanate with polyol or polythiol. Specific examples of these polymerization catalysts include tertiary amines and inorganic or organic salts corresponding thereto, phosphines, quaternary ammonium salts, quaternary phosphonium salts, Lewis acids or organic sulfonic acid.

Specific examples thereof can include the compounds described below. Moreover, when catalyst activity is excessively high depending on a kind of the compound to be selected as described above, the catalyst activity can be suppressed by mixing tertiary amine and Lewis acid and using the resulting mixture.

Tertiary amines: triethylamine, tri-n-propylamine, triisopropylamine, tri-n-butylamine, triisobutylamine, triethylamine, hexamethylenetetramine, N,N-dimethyloctylamine, N,N,N',N'-tetramethyl-1,6-diaminohexane, 4,4'-trimethylene bis(1-methylpiperidine) and 1,8-diazabicyclo-(5,4,0)-7-undecene.

Phosphines: trimethylphosphine, triethylphosphine, tri-n-propylphosphine, triisopropylphosphine, tri-n-butylphosphine, triphenylphosphine, tribenzylphosphine, 1,2-bis(diphenylphosphino)ethane and 1,2-bis(dimethylphosphino) ethane.

Quaternary ammonium salts: tetramethylammonium bromide, tetrabutylammonium chloride and tetrabutylammonium bromide.

Quaternary phosphonium salts: tetramethylphosphonium bromide, tetrabutylphosphonium chloride and tetrabutylphosphonium bromide.

Lewis acid: triphenyl aluminum, dimethyltin dichloride, dimethyltin bis(isooctylthioglycolate), dibutyltin dichloride, dibutyltin dilaurate, dibutyltin maleate, a dibutyltin maleate polymer, dibutyltin diricinolate, dibutyltin bis(dodecylmercaptide), dibutyltin bis(isooctylthioglycolate), dioctyltin dichloride, dioctyltin maleate, a dioctyltin maleate polymer, dioctyltin bis(butylmaleate), dioctyltin dilaurate, dioctyltin diricinolate, dioctyltin dioleate, dioctyltin di(6-hydroxy) caproate, dioctyltin bis(isooctylthioglycolate), didodecyltin diricinolate; and various metal salts such as copper oleate, copper acetylacetonate, iron acetylacetonate, iron naphthenate, iron lactate, iron citrate, iron gluconate, potassium octoate and 2-ethylhexyl titanate.

Organic sulfonic acid: methanesulfonic acid, benzenesulfonic acid and p-toluenesulfonic acid.

<Condensation Agent>

Specific examples of the condensation agent can include the compounds described below.

Inorganic acid: hydrogen chloride, hydrogen bromide, sulfuric acid and phosphoric acid.

Organic acid: p-toluenesulfonic acid and camphorsulfonic acid.

Acidic ion-exchange resin: Amberlite and Amberlyst.

Carbodiimide: dicyclohexylcarbodiimide and 1-ethyl-3-(3-dimethylaminopyrrolyl)-carbodiimide.

<Epoxy Curing Agent>

Specific examples of the epoxy curing agent can include the compounds described below.

Amine compound and salt thereof: 2-methylimidazole, 2-ethyl-4-methylimidazole, 1,8-diaza-bicyclo(5,4,0)undecene-7-trimethylamine, benzyldimethylamine, triethylamine, 2,4,6-tris(dimethylaminomethyl)phenol and 2-(dimethylaminomethyl) phenol.

Quaternary ammonium salt: tetramethylammonium chloride, benzyltrimethylammonium bromide and tetrabutylammonium bromide.

Organic phosphine compound: tetra-n-butylphosphonium benzotriazolate and tetra-n-butylphosphonium-o,o-diethyl phosphorodithioate.

Metal carboxylate: chromium(III) tricarboxylate and tin octylate.

Acetylacetone chelate compound: chromium acetylacetonate.

<Cationic Polymerization Catalyst>

Specific examples of the cationic polymerization catalyst can include the compounds described below.

Lewis acid-based catalyst: a $BF_3$-amine complex, $PF_5$, $BF_3$, $AsF_5$ and $SbF_5$.

Thermosetting cationic polymerization catalyst: a phosphonium salt or a quaternary ammonium salt, a sulfonium salt, a benzylammonium salt, a benzylpyridinium salt, a benzylsulfonium salt, a hydrazinium salt, carboxylate, sulfonate and amineimide.

Ultraviolet curable cationic polymerization catalyst: diaryliodonium hexafluorophosphate and bis(dodecylphenyl)iodonium hexafluoroantimonate.

<Radical Polymerization Initiator>

The polymerization initiator includes a thermal polymerization initiator, and specific examples are as described below.

Diacyl peroxide: benzoyl peroxide, p-chlorobenzoyl peroxide, decanoyl peroxide and lauroyl peroxide.

Acetyl peroxide peroxyester: t-butylperoxy-2-ethyl hexanate, t-butylperoxy neodecanoate, cumylperoxy neodecanoate and t butylperoxy benzoate.

Percarbonate: diisopropyl peroxydicarbonate and di-sec-butyl peroxydicarbonate.

Azo compound: azobisisobutyronitrile.

The various polymerization curing accelerators (E) described above each can be used alone or in combination with two or more kinds, and an amount of use thereof may be a so-called "catalyst amount". For example, the amount may be as small as in the range from 0.001 to 10 parts by mass, and particularly from 0.01 to 5 parts by mass, based on a total of 100 parts by mass of the (A), (B) and (C) described above.

<(G) Internal Mold Release Agent>

As an example of the internal mold release agent used in the present invention, any agent can be used, as long as the agent has an effect of releasability and does not adversely affect physical properties of the resin, such as transparency, and a surfactant is preferably used. Above all, a phosphate-based surfactant is preferable. The internal mold release agent herein also includes an agent that exhibits a releasing effect among the various catalysts described above, and includes, for example, quaternary ammonium salts and quaternary phosphonium salts in several cases. These internal mold release agents are appropriately selected depending on a combination with a monomer, polymerization conditions, economic efficiency, and ease of handling. Specific examples of the internal mold release agent of the phosphate are as described below.

Alkyl acid phosphate: mono-n-butyl phosphate, mono-2-ethylhexyl phosphate, mono-n-octyl phosphate, mono-n-butyl phosphate, bis(2-ethylhexyl)phosphate, di(2-ethylhexyl)phosphate, di-n-octyl phosphate, di-n-butyl phosphate, butyl acid phosphate (mono- and di- mixture), ethyl acid phosphate (mono- and di-mixture), butoxyethyl acid phosphate (mono- and di- mixture), 2-ethylhexyl acid phosphate (mono- and di-mixture), isotridecyl acid phosphate (mono- and di-mixture), tetracosyl acid phosphate (mono- and di-mixture) and stearyl acid phosphate (mono- and di-mixture).

Other phosphates: oleyl acid phosphate (mono- and di-mixture), dibutyl pyrophosphate, ethylene glycol acid phosphate (mono- and di-mixture) and butoxyethyl acid phosphate (mono- and di-mixture).

The various internal mold release agents (G) described above each can be used alone or in combination with two or more kinds, and an amount of use thereof may be small. For example, the internal mold release agent can be used in an amount from 0.001 to 10 parts by mass based on a total of 100 parts by mass of (A), (B) and (C).

<Other Blending Components>

Upon adding the photochromic compound to the optical composition according to the present invention, publicly-known various blending agents per se can be blended, when necessary, within the range in which advantageous effects of the present invention are not adversely affected. For example, various stabilizers such as an ultraviolet absorber, an antistatic agent, an infrared absorber, an ultraviolet stabilizer, an antioxidant, a coloring inhibitor, an antistatic agent, a fluorescent dye, a dye, a pigment and a flavoring agent, and an additive, a solvent, a leveling agent, and further thiols such as t-dodecylmercaptan as a polymerization modifier can be added thereto.

Above all, if the ultraviolet stabilizer is used therefor, durability of the photochromic compound can be improved, and therefore such use is preferable. As such an ultraviolet stabilizer, a hindered amine light stabilizer, a hindered phenol antioxidant, a sulfur-type antioxidant or the like is known. Particularly preferred ultraviolet stabilizers are as described below.

Bis(1,2,2,6,6-pentamethyl-4-piperidyl)sebacate, ADK STAB LA-52, LA-57, LA-62, LA-63, LA-67, LA-77, LA-82 and LA-87, manufactured by ADEKA Corporation, 2,6-di-t-butyl-4-methyl-phenol, ethylene bis(oxyethylene) bis[3-(5-t-butyl-4-hydroxy-m-tolyl)propionate], and IRGANOX 1010, 1035, 1075, 1098, 1135, 1141, 1222, 1330, 1425, 1520, 259, 3114, 3790, 5057 and 565, manufactured by Ciba Specialty Chemicals Co., Ltd.

An amount of use of such an ultraviolet stabilizer is not particularly limited, as long as the advantageous effects of the present invention are not adversely affected, but the amount is ordinarily in the range from 0.001 part by mass to 10 parts by mass, and particularly in the range from 0.01 part by mass to 1 part by mass, based on a total of 100 parts by mass of (A), (B) and (C). In particular, when the hindered amine light stabilizer is used, an effect of improving the durability is different depending on a kind of the photochromic compound. As a result, in order to avoid occurrence of color shift of an adjusted coloring tone, the amount should be adjusted to an amount from 0.5 to 30 mol, further preferably from 1 to 20 mol, and still further preferably from 2 to 15 mol per one mol of the photochromic compound (D).

Moreover, specific examples of the antistatic agent include an alkali metal or alkaline earth metal salt, a quaternary ammonium salt, a surfactant (a nonionic surfactant, an anionic surfactant, a cationic surfactant, and an amphoteric surfactant), and an ionic liquid (a salt existing in the form of liquid at ordinary temperature and existing in a pair of a cation and an anion). Specific examples thereof are as described below.

Alkali metal or alkaline earth metal salt: a salt between alkali metal (lithium, sodium and potassium) or alkaline earth metal (magnesium and calcium) and organic acid [monocarboxylic acid or dicarboxylic acid having 1 to 7 carbon atoms (formic acid, acetic acid, propionic acid, oxalic acid and succinic acid), sulfonic acid having 1 to 7 carbon atoms (methanesulfonic acid, trifluoromethanesulfonic acid and p-toluenesulfonic acid), and thiocyanic acid]; and a salt between the organic acid and inorganic acid [halogenated hydroacid (hydrochloric acid and hydrobromic acid), perchloric acid, sulfuric acid, nitric acid and phosphoric acid].

Quaternary ammonium salt: a salt between amidinium (1-ethyl-3-methylimidazolium) or guanidinium (2-dimethylamino-1,3,4-trimethylimidazolium) and the organic acid or inorganic acid.

Surfactant: sucrose fatty acid ester, sorbitan fatty acid ester, polyoxyethylene sorbitan fatty acid ester, polyoxyethylene fatty acid ester, fatty acid alkanolamide, polyoxyethylene alkyl ether, alkyl glycoside, polyoxyethylene alkylphenyl ether, a higher fatty acid salt (soap), an $\alpha$-sulfo fatty acid methyl ester salt, straight-chain alkylbenzene sulfonate, alkyl sulfate, alkylether sulfate, (mono)alkyl phosphate, $\alpha$-olefin sulfonate, alkane sulfonate, an alkyltrimethylammonium salt, a dialkyldimethylammonium salt, an alkyldimethylbenzylammonium salt, N-methyl-bis-hydroxyethylamine fatty acid ester-hydrochloride, an alkylamino fatty acid salt, alkyl betaine and alkylamineoxide.

Ionic liquid: 1,3-ethylmethylimidazolium bistrifluoromethanesulfonimide, 1,3-ethylmethylimidazorium tetrafluoroborate, 1-ethylpyridinium bistrifluoromethanesulfonimide, 1-ethylpyridinium tetrafluoroborate, 1-ethylpyridinium hexafluorophosphate and 1-methylpyrazolium bistrifluoromethanesulfonimide.

Further, in the present invention, in order to develop a maximum of the effect of improving the photochromism, with regard to a functional group mole ratio of the hydroxyl group and the thiol group to the isocyanate group and the thioisocyanate group, an amount of the hydroxyl group and the thiol group per one mol of the isocyanate group and the thioisocyanate group should be adjusted to the range from 0.8 to 1.2 mol, particularly preferably from 0.85 to 1.15 mol, and most preferably from 0.9 to 1.1 mol.

<Production Method for a Photochromic Optical Composition>

When the optical composition according to the present invention is used as the photochromic optical composition, in general, in addition to (A) the polyrotaxane, (B) the compound having two or more groups of at least one kind of group selected from the isocyanate group and the isothiocyanate group in one molecule, and (D) the photochromic compound, (C) the iso(thio)cyanate reactive group-containing compound is preferably blended therein. For example, the photochromism is desirably developed by preparing the photochromic optical composition by melting and kneading each component, preparing the photochromic cured body by allowing polymerization curing of the resulting material, and by using the cured body.

Moreover, when the optical composition according to the present invention is used as a photochromic coating agent for improving solubility of a constituent or adjusting a film thickness, a photochromic coating layer is formed by preparing a coating liquid by dispersing or dissolving the photochromic optical composition into an organic solvent, and coating the resulting coating liquid onto a transparent optical sheet or optical film and drying the resulting material, thereby enabling to develop the photochromism. The organic solvent to be used only needs to be selected appropriately according to use thereof, but in view of the solubility, ketones such as methyl ethyl ketone and diethyl ketone, halogens such as methylene chloride and chloroform, aromatic hydrocarbons such as toluene and xylene, and ethers such as dioxane and tetrahydropyan are preferably used.

In the photochromic optical composition, the polymerization curing is performed in order to prepare the photochromic cured body. The polymerization curing is performed by performing the radical polymerization, the ring-opening polymerization, the anionic polymerization or polycondensation by using heat, or when necessary, irradiation with active energy rays such as ultraviolet rays, $\alpha$-rays, $\beta$-rays and $\gamma$-rays or heat, or simultaneous use of both of heat and irradiation, or the like. More specifically, an appropriate polymerization means only needs to be adopted according to a kind of (A) the polyrotaxane, (C) the iso(thio)cyanate reactive group-containing compound, (E) the resin modifier, and further (D) the polymerization curing accelerator, and a form of the photochromic curing body to be formed.

Upon allowing thermal polymerization of the photochromic optical composition, a temperature during the polymerization particularly influences properties of the photochromic cured body to be obtained. The temperature conditions are influenced by a kind and an amount of the thermal polymerization initiator or a kind of the polymerizable monomer, and therefore are unable to be unequivocally limited. However, in general, a method in which the polymerization is started at a relatively low temperature, and the temperature is gradually increased is preferable. A polymerization time is also different depending on various factors in a manner similar to the temperature. Therefore, an optimum time according to these conditions is preferably determined in advance. However, in general, the conditions are preferably selected in such a manner that the polymerization is completed in 2 to 48 hours. When a photochromic laminate sheet is obtained, the polymerization is preferably performed at a temperature at which a reaction between the polymerization functional groups progresses, and on the above occasion, an optimum temperature and the optimum time are preferably determined so as to achieve an objective molecular weight.

Moreover, upon allowing photopolymerization of the photochromic optical composition, among the polymerization conditions, ultraviolet intensity particularly influences the properties of the photochromic cured body to be obtained. The illuminance conditions are influenced by a kind and an amount of the photopolymerization initiator and a king of the polymerizable monomer, and therefore are unable to be unequivocally limited. However, in general, the conditions are preferably selected so as to irradiate the composition with ultraviolet rays having a wavelength of 365 nm and 50 to 500 mW/cm$^2$ for 0.5 to 5 minutes.

When the photochromism is developed by the kneading method by using the polymerization curing described above, the photochromic cured body shaped into the form of the optical material such as the lens can be obtained by casting the photochromic optical composition into a space between the glass molds kept by an elastomer gasket or spacer, and by performing cast polymerization by heating the composition in an air oven or irradiating the composition with the active energy rays such as the ultraviolet rays according to a kind of the polymerizable monomer or the polymerization curing agent. According to such a method, an eyeglass lens provided with the photochromism or the like is directly obtained.

When the photochromism is developed by the lamination method, the coating liquid of the photochromic optical composition is coated onto a surface of the optical base material such as a lens base material by spin coating, dipping or the like. When the photochromic optical composition has high viscosity, the photochromic optical composition only needs to be appropriately dissolved into the organic solvent to prepare the coating liquid, and the coating liquid may be coated thereonto, and dried to remove the organic solvent. A photochromic layer formed of the photochromic cured body is formed on the surface of the optical base material by subsequently performing thermosetting by heating the composition (coating method). Moreover, upon using a material having a radical polymerizable group in the resin modifier, the polymerization curing may be performed by irradiation with ultraviolet rays, heating or the like in an inert gas such as nitrogen.

Moreover, the photochromic layer formed of the photochromic cured body can be formed on the surface of the optical base material also by cast polymerization by inner molding, in which an optical substrate such as the lens base material is arranged by being faced with the glass mold so that a predetermined airspace is formed therebetween, the photochromic optical composition is cast into this airspace, and the polymerization curing is performed by irradiation with ultraviolet rays, heating or the like in this state.

When the photochromic layer is formed on the surface of the optical base material by the lamination method (the coating method and the cast polymerization method) as described above, adhesion between the photochromic layer and the optical base material can also be improved by applying, onto the surface of the optical base material in advance, chemical treatment by an alkali solution, an acid solution or the like, or physical treatment by corona discharge, plasma discharge, polishing or the like. A transparent adhesive resin layer can also be obviously provided on the surface of the optical base material.

Further, when the photochromism is developed by the binder method, the photochromic laminate in which the photochromic layer is applied as an adhesive layer is obtained by preparing a photochromic sheet by sheet forming using the photochromic optical composition, interposing the resulting sheet by two transparent sheets (optical sheets) and performing the polymerization curing described above.

In this case, in preparing the photochromic sheet, a means of coating using the coating liquid in which the photochromic optical composition is dissolved into the organic solvent can also be employed.

The thus prepared photochromic laminate is placed within a mold, for example, and then a thermoplastic resin (for example, polycarbonate) for the optical base material such as the lens is injection-molded thereonto. Thus, the optical base material such as the lens having a predetermined shape and provided with the photochromism is obtained. Moreover, this photochromic laminate can be adhered onto the surface of the optical base material by an adhesive or the like. Thus, the photochromic lens can also be obtained.

The photochromic optical composition described above can cause development of the photochromism excellent in the color optical density, the color fading rate or the like, and furthermore can be effectively used for preparing the optical base material provided with the photochromism, for example, the photochromic lens, without reducing the characteristics such as the mechanical strength.

Moreover, onto the photochromic layer or the photochromic cured body formed using the photochromic optical composition, post-treatment can be applied, according to use thereof, such as dyeing using a dye such as a disperse dye, preparation of a hard coat film using a silane coupling agent or a hard coat agent containing as a main component a sol of silicon, zirconium, antimony, aluminum, tin and tungsten, formation of a thin film by vapor deposition of metallic oxide such as $SiO_2$, $TiO_2$ and $Zro_2$, and anti-reflection treatment and antistatic treatment by a thin film by applying an organic polymer thereonto.

EXAMPLES

Next, the present invention will be described in detail using Examples and Comparative Examples, but the present invention is not limited to the present Examples. In the Examples and Comparative Examples described below, evaluation methods for each component and photochromic characteristics above are as described below.

(A) Preparation of a Polyrotaxane being Characterized in that a Side Chain Having a Secondary or Tertiary Hydroxyl Group is Introduced into at Least Part of a Cyclic Molecule (Polyrotaxane According to Aspect I)

AI-1: Polyrotaxane Having a Tertiary Hydroxyl Group in a Side Chain

Hereinafter, a preparation method for a polyrotaxane (AI-1) will be described below.

(1-1) Preparation of PEG-COOH:

As a polymer for forming an axle molecule, straight-chain polyethylene glycol (PEG) having a weight average molecular weight of 20,000 was arranged.

Each component was dissolved into 100 mL of water according to the formulation described below:

10 g of PEG 100 mg of TEMPO (2,2,6,6-tetramethyl-1-piperidinyloxy radical)

1 g of sodium bromide

To this solution, 5 mL of commercially available sodium hypochlorite aqueous solution (available chlorine concentration: 5%) was added, and the resulting mixture was stirred at room temperature for 10 minutes. Then, ethanol was added thereto in the range of a maximum of up to 5 mL to terminate the reaction. Then, extraction using 50 mL of methylene chloride was performed, and then methylene chloride was distilled off, the resulting material was dissolved into 250 mL of ethanol, and then caused reprecipitation in 12 hours at a temperature of −4° C., and PEG-COOH was collected and dried.

(1-2) Preparation of a Polyrotaxane Having a Primary Hydroxyl Group in a Side Chain Into 50 mL of warm water at 70° C., 3 g of PEG-COOH prepared as described above and 12 g of α-cyclodextrin (α-CD) were each dissolved, and the resulting each solution was mixed and shaken up well. Subsequently, reprecipitation was caused in this mixed solution at a temperature of 4° C. for 12 hours, and a precipitated clathrate complex was freeze-dried and collected. Then, 0.13 g of adamantanamine was dissolved into 50 mL of dimethylformamide (DMF) at room temperature, and then the clathrate complex described above was added thereto, and the resulting mixture was immediately shaken up well. Subsequently, a solution in which 0.38 g of BOP reagent (benzotriazol-1-yl-oxy-tris (dimethylamino)phosphonium hexafluorophosphate) was dissolved into DMF was further added thereto, and the resulting mixture was shaken up well. Further, a solution in which 0.14 mL of diisopropylethylamine was dissolved into DMF was added thereto, and the resulting mixture was shaken up well to obtain a slurry-form reagent. The slurry-form reagent obtained as described above was left to stand at 4° C. for 12 hours. Then, 50 mL of DMF/methanol mixed solvent (volume ratio: 1/1) was added thereto, and mixed, and the resulting mixture was centrifuged, and a supernatant was disposed of. Further, the resulting material was washed with the DMF/methanol mixed solution, and then washed using methanol, and centrifuged to obtain a deposit. The deposit obtained was dried in vacuum, and then dissolved into 50 mL of DMSO (dimethylsulfoxide), and a transparent solution obtained was added dropwise into 700 mL of water to precipitate a polyrotaxane. The polyrotaxane precipitated was collected by centrifugal separation, and dried in vacuum. Further, the resulting polyrotaxane was dissolved into DMSO, precipitated in water, collected and dried to obtain a purified polyrotaxane. A clathration amount of α-CD at this time was 0.25.

Here, with regard to the clathration amount, the polyrotaxane was dissolved into DMSO-d6, and NMR thereof was measured by $^1$H-NMR Spectrometer (JNM-LA500, manufactured by JEOL Ltd.), and the clathration amount was calculated by the following method.

Here, X, Y and X/(Y-X) indicate the following meanings.

X: an integrated value at 4-6 ppm for protons from a hydroxyl group of cyclodextrin Y: an integrated value at 3-4 ppm for protons from methylene chains of cyclodextrin and PEG X/(Y-X): A Proton Ratio of Cyclodextrin to PEG First, the clathration amount was calculated by theoretically calculating in advance X/(Y-X) given at a maximum clathration amount of 1, and comparing this calculated value with X/(Y-X) calculated from an analytical value of an actual compound.

(1-3) Introduction of a Side Chain into a Polyrotaxane

Into 50 mL of 1 mol/L NaOH aqueous solution, 500 mg of the purified polyrotaxane described above was dissolved, 3.83 g (66 mmol) of propylene oxide was added thereto, and under an argon atmosphere, the resulting mixture was stirred at room temperature for 12 hours. Subsequently, the polyrotaxane solution described above was neutralized to be 7 to 8 in pH by using a 1 mol/L HCl aqueous solution, and the resulting material was dialyzed using a dialysis tube, and then freeze-dried to obtain a hydroxypropylated polyrotaxane.

In addition, a degree of modification to a OH group of the cyclic molecule by a hydroxypropyl group was 0.5. A mixed liquid in which 5 g of hydroxypropylated polyrotaxane obtained was dissolved into 22.5 g of ε-caprolactone at 80° C. was prepared. This mixed liquid was stirred at 110° C. for 1 hour while blowing dry nitrogen, and then 0.16 g of 50 wt % xylene solution of tin(II) 2-ethylhexanoate was added thereto, and the resulting mixture was stirred at 130° C. for 6 hours. Then, xylene was added thereto to obtain a xylene solution of a polycaprolactone-modified polyrotaxane into which a side chain was introduced, in which a nonvolatile concentration was about 35% by mass.

The xylene solution of the polycaprolactone-modified polyrotaxane prepared as described above was added dropwise into hexane, and the resulting material was collected and dried to obtain a polyrotaxane modified with a side chain having a primary hydroxyl group as a polymerizable functional group (polyrotaxane in which a molecular weight of the side chain of the polyrotaxane obtained was about 500 on an average, and according to measurement by GPC, a weight average molecular weight (Mw) of the polyrotaxane obtained was 400,000, and a hydroxyl value was 1.35 mmol/g in a measured value).

In addition, in Examples, the weight average molecular weight of the polyrotaxane was measured using Gel Permeation Chromatography (GPC) under the following conditions:

Measuring instrument: Liquid Chromatography (manufactured by Nihon Waters K. K.)

GPC column: Shodex GPC KF-805 (exclusion limit molecular weight: 2,000,000) (manufactured by Showa Denko K. K.)

Flow rate: 1 mL/min

Column temperature: 40° C.

Sample concentration: 0.5% (w/v) (diluted with DMF)

Mobile phase solvent: DMF

Standard polystyrene equivalent

The hydroxyl value of the polyrotaxane was measured by a titration method.

(1-4) Preparation of a Polyrotaxane (AI-1) Having a Tertiary Hydroxyl Group in a Side Chain To 5 g of this polyrotaxane, 15 g of xylene and 0.005 g of dibutylhydroxytoluene (polymerization inhibitor) were added, and then under an argon atmosphere, 1.26 g of 2-methyl-2-(trimethylsiloxy)propyl isocyanate was added dropwise thereto. In addition, 2-methyl-2-(trimethylsiloxy) propyl isocyanate was added dropwise thereto so as to cause a reaction with a hydroxyl group of the polyrotaxane at a ratio of 1/1. The resulting mixture was stirred at 40° C. for 16 hours to obtain a xylene solution of a polyrotaxane in which a side chain having a hydroxyl group protected was introduced into an end of polycaprolactone.

This xylene solution of the polyrotaxane was added dropwise into hexane, the resulting material was collected, and then 20 g of THF was added thereto, and under an argon atmosphere, a TBAF THF solution (10 mL, 1.0 M) was added thereto, and the resulting mixture was stirred under heating reflux. After completion of the reaction, a saturated NH$_4$Cl aqueous solution was added thereto to separate a liquid, and an aqueous layer was subjected to extraction with toluene, and a collected oil layer was dried over Na$_2$SO$_4$. Then, the solvent was removed under reduced pressure. Thus, a polyrotaxane (AI-1) being characterized in that a side chain having a tertiary hydroxyl group was introduced into at least part of the cyclic molecule was able to be obtained. A molecular weight of the side chain of the polyrotaxane obtained was about 600 on an average, and according to measurement by GPC, a weight average molecular weight (Mw) of the polyrotaxane obtained was 460,000, and the hydroxyl group in the side chain was 100% in the tertiary hydroxyl group.

AI-2: Polyrotaxane Having a Tertiary Hydroxyl Group in a Side Chain (1-5) Preparation of a Polyrotaxane (AI-2) Having a Tertiary Hydroxyl Group in a Side Chain:

A polyrotaxane (AI-2) having a tertiary hydroxyl group in a side chain was obtained completely in the same manner as in the (AI-1) except that PEG having a weight average molecular weight of 10,000 was used in place of the PEG having the weight average molecular weight of 20,000 in (1-1).

Physical properties of this polyrotaxane (AI-2) were as described below:

Clathration amount of α-CD: 0.25

Degree of modification with side chain: 0.5

Molecular weight of side chain: about 600 on an average

Weight average molecular weight (Mw) of polyrotaxane (GPC): 230,000

100% in the tertiary hydroxyl group as the hydroxyl group in the side chain

AI-3: Polyrotaxane Having a Tertiary Hydroxyl Group in a Side Chain (1-6) Preparation of a Polyrotaxane (AI-3) Having a Tertiary Hydroxyl Group in a Side Chain:

A polyrotaxane (AI-3) having a tertiary hydroxyl group in a side chain was obtained completely in the same manner as in the (AI-1) except that an amount of ε-caprolactone in (1-3) was changed to 125 g.

Physical properties of this polyrotaxane (AI-3) were as described below:

Clathration amount of α-CD: 0.25
Degree of modification with side chain: 0.5
Molecular weight of side chain: about 2,500 on an average
Weight average molecular weight (Mw) of polyrotaxane (GPC): 1,900,000
100% in the tertiary hydroxyl group as the hydroxyl group in the side chain AI-4: Polyrotaxane Having a Secondary Hydroxyl Group in a Side Chain (1-7) Preparation of a Polyrotaxane (AI-4) Having a Secondary Hydroxyl Group in a Side Chain:

A polyrotaxane (AI-4) having a secondary hydroxyl group in a side chain was obtained completely in the same manner as in the (AI-1) except that 1.45 g of 2-(t-butyldimethylsiloxy)propyl isocyanate was used in place of 2-methyl-2-(trimethylsiloxy)propyl isocyanate in (1-4).

Physical properties of this polyrotaxane (AI-4) were as described below:

Clathration amount of α-CD: 0.25
Degree of modification with side chain: 0.5
Molecular weight of side chain: about 600 on an average
Weight average molecular weight (Mw) of polyrotaxane (GPC): 460,000
100% in the secondary hydroxyl group as the hydroxyl group in the side chain AI-5: Polyrotaxane Having a Tertiary Hydroxyl Group in a Side Chain (1-8) Preparation of a Polyrotaxane (AI-5) Having a Tertiary Hydroxyl Group in a Side Chain:

A polyrotaxane (AI-5) having a tertiary hydroxyl group in a side chain was obtained completely in the same manner as in the (AI-1) except that PEG having a weight average molecular weight of 10,000 was used in place of the PEG having the weight average molecular weight of 20,000 in (1-1), and 22.5 g of ε-caprolactam was used in place of ε-caprolactone in (1-3).

Physical properties of this polyrotaxane (AI-5) were as described below:

Clathration amount of α-CD: 0.25
Degree of modification with side chain: 0.5
Molecular weight of side chain: about 600 on an average
Weight average molecular weight (Mw) of polyrotaxane (GPC): 230,000
100% in the tertiary hydroxyl group as the hydroxyl group in the side chain AI-6: Polyrotaxane Having a Tertiary Hydroxyl Group in a Side Chain (1-8) Preparation of a Polyrotaxane (AI-6) Having a Tertiary Hydroxyl Group in a Side Chain:

A polyrotaxane (AI-6) having a tertiary hydroxyl group in a side chain was obtained completely in the same manner as in the (AI-1) except that 22.5 g of γ-valerolactone was used in place of ε-caprolactone in (1-3).

Physical properties of this polyrotaxane (AI-6) were as described below:

Clathration amount of α-CD: 0.25
Degree of modification with side chain: 0.5
Molecular weight of side chain: about 500 on an average
Weight average molecular weight (Mw) of polyrotaxane (GPC): 400,000
100% in the tertiary hydroxyl group as the hydroxyl group in the side chain AI-7: Polyrotaxane Having a Tertiary Hydroxyl Group in a Side Chain (1-9) Preparation of a Polyrotaxane (AI-7) Having a Tertiary Hydroxyl Group in a Side Chain:

A polyrotaxane (AI-7) having a tertiary hydroxyl group in a side chain was obtained in the same manner as in the preparation method for the (AI-1) except that PEG having a weight average molecular weight of 90,000 was used in place of the PEG having the weight average molecular weight of 20,000 in (1-1), and an amount of ε-caprolactone in (1-3) was changed to 12.5 g.

Physical properties of this polyrotaxane (AI-7) were as described below:

Clathration amount of α-CD: 0.25
Degree of modification with side chain: 0.5
Molecular weight of side chain: about 400 on an average
Weight average molecular weight (Mw) of polyrotaxane (GPC): 1,500,000
100% in the tertiary hydroxyl group as the hydroxyl group in the side chain AI-8: Polyrotaxane Having a Tertiary Hydroxyl Group in a Side Chain (1-10) Preparation of a Polyrotaxane (AI-8) Having a Tertiary Hydroxyl Group in a Side Chain:

A polyrotaxane (AI-8) having a tertiary hydroxyl group in a side chain was obtained in the same manner as in the preparation method for the (AI-1) except that an amount of 2-methyl-2-(trimethylsiloxy)propyl isocyanate was changed to 0.63 g in (1-4).

Clathration amount of α-CD: 0.25
Degree of modification with side chain: 0.5
Molecular weight of side chain: about 550 on an average
Weight average molecular weight (Mw) of polyrotaxane (GPC): 430,000
50% in the tertiary hydroxyl group and 50% in the primary hydroxyl group as the hydroxyl group in the side chain AI-9: Polyrotaxane Having a Tertiary Hydroxyl Group in a Side Chain (1-11) Preparation of a Polyrotaxane (AI-9) Having a Tertiary Hydroxyl Group in a Side Chain:

A polyrotaxane (AI-9) having a tertiary hydroxyl group in a side chain was obtained in the same manner as in the preparation method in preparation method for the (AI-1) except that an amount of 2-methyl-2-(trimethylsiloxy)propyl isocyanate was changed to 1.01 g in (1-4).

Clathration amount of α-CD: 0.25
Degree of modification with side chain: 0.5
Molecular weight of side chain: about 600 on an average
Weight average molecular weight (Mw) of polyrotaxane (GPC): 450,000
80% in the tertiary hydroxyl group and 20% in the primary hydroxyl group as the hydroxyl group in the side chain The features of the (A) polyrotaxanes (AI-1) to (AI-9) prepared as described above were summarized in Table 1.

TABLE 1

(A) Polyrotaxane

| | Straight-chain molecule | Molecular weight of straight chain | Cyclic molecule | Clathration amount of cyclic molecule | Side-chain molecule | Degree of modification of side chain | Shape of side chain end | Molecular weight of side chain | Weight average molecular weight of polyrotaxane |
|---|---|---|---|---|---|---|---|---|---|
| AI-1 | PEG | 20,000 | α-Cyclodextrin | 0.25 | ε-Caprolactone | 0.5 | Tertiary hydroxyl group 100% | 600 | 460,000 |
| AI-2 | PEG | 10,000 | α-Cyclodextrin | 0.25 | ε-Caprolactone | 0.5 | Tertiary hydroxyl group 100% | 600 | 230,000 |
| AI-3 | PEG | 20,000 | α-Cyclodextrin | 0.25 | ε-Caprolactone | 0.5 | Tertiary hydroxyl group 100% | 2,500 | 1,900,000 |
| AI-4 | PEG | 20,000 | α-Cyclodextrin | 0.25 | ε-Caprolactone | 0.5 | Secondary hydroxyl group 100% | 600 | 460,000 |
| AI-5 | PEG | 10,000 | α-Cyclodextrin | 0.25 | ε-Caprolactam | 0.5 | Tertiary hydroxyl group 100% | 600 | 230,000 |
| AI-6 | PEG | 20,000 | α-Cyclodextrin | 0.25 | γ-Valerolactone | 0.5 | Tertiary hydroxyl group 100% | 500 | 400,000 |
| AI-7 | PEG | 90,000 | α-Cyclodextrin | 0.25 | ε-Caprolactone | 0.5 | Tertiary hydroxyl group 100% | 400 | 1,500,000 |
| AI-8 | PEG | 20,000 | α-Cyclodextrin | 0.25 | ε-Caprolactone | 0.5 | Tertiary hydroxyl group/ Primary hydroxyl group 50%/50% | 550 | 430,000 |
| AI-9 | PEG | 20,000 | α-Cyclodextrin | 0.25 | ε-Caprolactone | 0.5 | Tertiary hydroxyl group/ Primary hydroxyl group 80%/20% | 600 | 450,000 |

(A) Preparation of a polyrotaxane being characterized in that a side chain having a hydroxyl group a pKa of which is 6 or more and less than 14 is introduced into at least part of a cyclic molecule (polyrotaxane according to Aspect II):

AII-1: Polyrotaxane Having a Hydroxyl Group a pKa of which is 10 in a Side Chain A preparation method for a polyrotaxane (AII-1) will be described below.

The operation up to "(1-3) Introduction of a side chain into a polyrotaxane" described above was performed in the same manner as in the preparation method for the polyrotaxane (AI-1).

A polyrotaxane modified with a side chain having a primary hydroxyl group as a polymerizable functional group obtained in "(1-3) Introduction of a side chain to a polyrotaxane" being the preparation method for the polyrotaxane (AI-1) (polyrotaxane in which a molecular weight of the side chain of the polyrotaxane obtained was about 500 on an average, and according to measurement by GPC, a weight average molecular weight (Mw) of the polyrotaxane obtained was 400,000, and a hydroxyl value was 1.35 mmol/g in a measured value) was a polyrotaxane modified with a side chain having a primary hydroxyl group a pKa of which is 15.5 (H-A in the formula (2): methanol).

(1-4) Preparation of a Polyrotaxane Having a Hydroxyl Group a pKa of which is 10 in a Side Chain To 5 g of this polyrotaxane, 15 g of xylene and 0.005 g of dibutylhydroxytoluene (polymerization inhibitor) were added, and then under an argon atmosphere, 1.59 g of 1-(2-isocyanatoethyl)-4-[(trimethylsilyl)oxy]-benzene was added dropwise thereto, in which 1-(2-isocyanatoethyl)-4-[(trimethylsilyl)oxy]-benzene was added dropwise thereto to be equimolar with the mole of the hydroxyl group in the polyrotaxane. The resulting mixture was stirred at 40° C. for 16 hours, and overall consumption of the raw materials was confirmed to obtain a xylene solution of a polyrotaxane in which a side chain having a hydroxyl group protected was introduced into an end of polycaprolactone.

This xylene solution of the polyrotaxane was added dropwise into hexane, the resulting material was collected, and then 20 g of THF was added thereto, and under an argon atmosphere, a tetra-n-butylammonium fluoride (TBAF) THF solution (10 mL, 1.0 M) was added thereto, and the resulting mixture was stirred under heating reflux. After completion of the reaction, a saturated NH$_4$Cl aqueous solution was added thereto to separate a liquid, and an aqueous layer was subjected to extraction with toluene, and a collected oil layer was dried over Na$_2$SO$_4$. Then, the solvent was removed under reduced pressure, and a polyrotaxane in which a side chain having a hydroxyl group a pKa of which is 10 in a side chain was introduced into at least part of a cyclic molecule was able to be obtained (H-A in the formula (2): phenol). In addition, the pKa is expressed in terms of a value in water, and the pKa described in (a) "Handbook of Chemistry edited by the Chemical Society of Japan" (3$^{rd}$ edition, published on Jun. 25, 1984, published by Maruzen Co., Ltd.). With regard to the pKa not described in (a), a value of pKa can be obtained by carrying out measurement according to the method described in (b) The Journal of Physical Chemistry, vol. 68, number 6, page 1560 (1964). A molecular weight of the side chain of the polyrotaxane obtained was about 650 on an average, and according to measurement by GPC, a weight average molecular weight of the polyrotaxane obtained was 477,000. Moreover, with regard to the hydroxyl group at the end, from overall consumption of 1-(2-isocyanatoethyl)-4-[(trimethylsilyl) oxy]-benzene, all the hydroxyl groups of the polyrotaxane obtained in (1-3) were substituted.

AII-2: Preparation of a Polyrotaxane Having a Hydroxyl Group a pKa of which is 10 in a Side Chain (1-5) Preparation of a Polyrotaxane (AII-2) Having a Hydroxyl Group a pKa of which is 10 in a Side Chain:

A polyrotaxane (AII-2) having a hydroxyl group a pKa of which is 10 in a side chain was obtained completely in the same manner as in the (AII-1) except that PEG having a weight average molecular weight of 10,000 was used in place of the PEG having the weight average molecular weight of 20,000 in (1-1).

Physical properties of this polyrotaxane (AII-2) were as described below:
  Clathration amount of α-CD: 0.25
  Degree of modification with side chain: 0.5
  Molecular weight of side chain: about 650 on an average
  Weight average molecular weight (Mw) of polyrotaxane (GPC): 239,000
  100% in the hydroxyl group the pKa of which is 10 in the side chain (H-A in the formula (2): phenol)

AII-3: Preparation of a Polyrotaxane Having a Hydroxyl Group a pKa of which is 10 in a Side Chain (1-6) Preparation of a Polyrotaxane (AII-3) Having a Hydroxyl Group a pKa of which is 10 in a Side Chain:

A polyrotaxane (AII-3) having a hydroxyl group a pKa of which is 10 in a side chain was prepared completely in the same manner as in the (AII-1) except that an amount of ε-caprolactone in (1-3) was changed to 125 g.

Physical properties of this polyrotaxane (AII-3) were as described below:
  Clathration amount of α-CD: 0.25
  Degree of modification with side chain: 0.5
  Molecular weight of side chain: about 2,500 on an average
  Weight average molecular weight (Mw) of polyrotaxane (GPC): 1,900,000
  100% in the hydroxyl group the pKa of which is 10 in the side chain (H-A in the formula (2): phenol)

AII-4: Polyrotaxane Having a Hydroxyl Group a pKa of which is 9.3 in a Side Chain (1-7) Preparation of a Polyrotaxane (AII-4) Having a Hydroxyl Group a pKa of which is 9.3 in a Side Chain:

A saturated solution of 140 mL of dichloromethane and 140 mL of NaHCO$_3$ was added to 1.94 g of 3,3,3-trifluoro-2-(phenylmethoxy)-2-(trifluoromethyl)-1-propaneamine at room temperature, and then the resulting mixture was cooled to 0° C. while stirring the mixture, and then stirring was stopped. Then, the liquid was separated into two layers, and then 1.35 g of triphosgene dissolved in a dichloromethane solution (15 mL) was added to an organic layer with a syringe, and the resulting mixture was immediately stirred again for 30 minutes. Then, the mixture was separated into an aqueous layer and an organic layer, the aqueous layer was subjected to liquid separation and extraction with dichloromethane again, and then a moisture was removed from the organic layer with Na$_2$SO$_4$, and the resulting mixture was concentrated to be taken as 3,3,3-trifluoro-2-(phenylmethoxy)-2-(trifluoromethyl)-1-propane isocyanate. Then, to 3,3,3-trifluoro-2-(phenylmethoxy)-2-(trifluoromethyl)-1-propane isocyanate concentrated, under an argon atmosphere, 5 g of the polyrotaxane synthesized in (1-3), 15 g of xylene and 0.005 g of dibutylhydroxytoluene (polymerization inhibitor) were added, and then under the argon atmosphere, the resulting mixture was stirred at 40° C. for 16 hours. Completion of the reaction was confirmed by overall consumption of 3,3,3-trifluoro-2-(phenylmethoxy)-2-(trifluoromethyl)-1-propane isocyanate to obtain a xylene solution of a polyrotaxane in which a side chain having a hydroxyl group protected was introduced into an end of the polycaprolactone.

This xylene solution of the polyrotaxane was added dropwise into hexane, and the resulting material was collected, and then a mixed solution of 18 g of THF and 2 g of MeOH was added thereto. Further, 0.07 g of 10% Pd/C was added thereto at room temperature, and then an atmosphere was replaced by hydrogen, the resulting mixture was stirred at 60° C. for 1.5 hours, and a polyrotaxane being characterized in that a side chain having a hydroxyl group a pKa of which is 9.3 was introduced thereinto was able to be obtained (H-A in the formula (2): (CF$_3$)$_2$—CH$_2$—OH). A molecular weight of the side chain of the polyrotaxane obtained was about 700 on an average, and according to measurement by GPC, a weight average molecular weight (Mw) of the polyrotaxane obtained was 470,000. Moreover, all the hydroxyl groups at the end were substituted because all of 1-(2-isocyanatoethyl)-4-[(trimethylsilyl)oxy]-benzene were consumed.

Physical properties of this polyrotaxane (AII-4) were as described below:
  Clathration amount of α-CD: 0.25
  Degree of modification with side chain: 0.5
  Molecular weight of side chain: about 700 on an average
  Weight average molecular weight (Mw) of polyrotaxane (GPC): 500,000
  100% in the hydroxyl group the pKa of which is 9.3 in the side chain (H-A in the formula (2): (CF$_3$)$_2$—CH$_2$—OH)

AII-5: Preparation of a Polyrotaxane Having a Hydroxyl Group a pKa of which is 12.5 in a Side Chain (1-8) Preparation of a Polyrotaxane (A-5) Having a Hydroxyl Group a pKa of which is 12.5 in a Side Chain:

A polyrotaxane (A-5) having a hydroxyl group a pKa of which is 12.5 in a side chain was obtained in the same manner as in the preparation method for the (AII-4) except that 1.58 g of 4,4,4-trifluoro-3-(phenylmethoxy)-1-butaneamine was applied in place of 3,3,3-trifluoro-2-(phenylmethoxy)-2-(trifluoromethyl)-1-propaneamine in (1-7) (H-A in the formula (2): CF$_3$—CH$_2$—OH).

Physical properties of this polyrotaxane (AII-5) were as described below:
  Clathration amount of α-CD: 0.25
  Degree of modification with side chain: 0.5
  Molecular weight of side chain: about 650 on an average
  Weight average molecular weight (Mw) of polyrotaxane (GPC): 477,000
  100% in the hydroxyl group the pKa of which is about 12.5 in the side chain (H-A in the formula (2): CF$_3$—CH$_2$—OH)

AII-6: Polyrotaxane Having a Hydroxyl Group a pKa of which is 10 in a Side Chain (1-9) Preparation of a Polyrotaxane Having a Hydroxyl Group a pKa of which is 10 in a Side Chain:

A polyrotaxane (AII-6) having a hydroxyl group a pKa of which is 10 in a side chain was obtained in the same manner as in the preparation method for the (AII-1) except that PEG having a molecular weight of 90,000 was used in place of the PEG having the weight average molecular weight of 20,000 in (1-1), and an amount of ε-caprolactone in (1-3) was changed to 10.5 g.

Physical properties of this polyrotaxane (AII-6) were as described below:
  Clathration amount of α-CD: 0.25
  Degree of modification with side chain: 0.5
  Molecular weight of side chain: about 400 on an average
  Weight average molecular weight (Mw) of polyrotaxane (GPC): 1,500,000
  100% in the hydroxyl group the pKa of which is 10 in the side chain (H-A in the formula (2): phenol)

AII-7: Polyrotaxane Having a Hydroxyl Group a pKa of which is 10 in a Side Chain (1-10) Preparation of a Polyrotaxane (AII-7) Having a Hydroxyl Group a pKa of which is 10 in a Side Chain:

A polyrotaxane (AII-7) having a hydroxyl group a pKa of which is 10 in a side chain was obtained in the same manner as in the preparation method for the (AII-1) except that an amount of 1-(2-isocyanatoethyl)-4-[(trimethylsilyl)oxy]-benzene was changed to 0.80 g in (1-4).

Physical properties of this polyrotaxane (AII-7) were as described below:

Clathration amount of α-CD: 0.25
Degree of modification with side chain: 0.5
Molecular weight of side chain: about 600 on an average
Weight average molecular weight (Mw) of polyrotaxane (GPC): 439,000
50% in the hydroxyl group the pKa of which is 10 in the side chain (H-A in the formula (2): phenol) and 50% in the hydroxyl group the pKa of which is 15.5 in the side chain (H-A in the formula (2): methanol)

AII-8: Polyrotaxane Having a Hydroxyl Group a pKa of which is 10 in a Side Chain (1-11) Preparation of a Polyrotaxane (AII-8) Having a Hydroxyl Group a pKa of which is 10 in a Side Chain:

A polyrotaxane (AII-8) having a hydroxyl group a pKa of which is 10 in a side chain was obtained in the same manner as in the preparation method for the (AII-1) except that an amount of 1-(2-isocyanatoethyl)-4-[(trimethylsilyl)oxy]-benzene was changed to 1.43 g in (1-4).

Physical properties of this polyrotaxane (AII-8) were as described below:

Clathration amount of α-CD: 0.25
Degree of modification with side chain: 0.5
Molecular weight of side chain: about 650 on an average
Weight average molecular weight (Mw) of polyrotaxane (GPC): 470,000
90% in the hydroxyl group the pKa of which is 10 in the side chain (H-A in the formula (2): phenol) and 10% in the hydroxyl group the pKa of which is 15.5 in the side chain (H-A in the formula (2): methanol)

Features of the (A) polyrotaxanes (AII-1) to (AII-8) prepared as described above were summarized in Table 2.

(B) Compound Having Two or More Groups of at Least One Kind of Group Selected from an Isocyanate Group and an Isothiocyanate Group in One Molecule:

XDI: m-xylene diisocyanate
NBDI: (bicyclo[2.2.1]heptane-2,5(2,6)-diyl)bismethylene diisocyanate
HXDI: 1,3-bis(isocyanatomethyl)cyclohexane (C) Iso(thio)Cyanate Reactive Group-Containing Compound (C-1) Poly(thi)ol Compound Having Two or More Groups of at Least one Kind of Group Selected from a Hydroxyl Group and a Tthiol Group in One Molecule PL1: DURANOL, manufactured by Asahi Kasei Chemicals Co., Ltd. (polycarbonate diol, number average molecular weight: 500)
TMP: trimethylolpropane
PNT-40: pentaerythritol polyoxyethylene ether (tetrafunctional polyol, manufactured by Nippon Nyukazai Co., Ltd.)
Polythiol:
PEMP: pentaerythritol tetrakis(3-mercaptopropionate)
DPMP: dipentaerythritol hexakis(3-mercaptopropionate)
EGMP-4: tetraethylene glycol bis(3-mercaptopropionate)
PRX: polyrotaxane having a primary hydroxyl group in a side chain A polyrotaxane having a primary hydroxyl group in a side chain obtained in "(1-3) Introduction of a side chain into a polyrotaxane" in the process of producing AI-1 (H-A in the formula (2): methanol)

Degree of modification with side chain: 0.5
Molecular weight of side chain: about 500 on an average
Weight average molecular weight (Mw) of polyrotaxane (GPC): 400,000
100% in the primary hydroxyl group as the hydroxyl group in the side chain (H-A in the formula (2): methanol)

(C-2) Mono(thi)ol Compound Having One Hydroxyl Group or One Thiol Group in One Molecule:

PGME10: polyethylene glycol monooleyl ether (n≈10, Mw=668) 3-MBMA: 3-methoxybutyl thioglycolate 1-DT: dodecanethiol

TABLE 2

| | (A) Polyrotaxane | | | | | | | | |
|---|---|---|---|---|---|---|---|---|---|
| | Straight-chain molecule | Molecular weight of straight chain | Cyclic molecule | Clathration amount of cyclic molecule | Side-chain molecule | Degree of modification of side chain | Shape of side chain end | Molecular weight of side chain | Weight average molecular weight of polyrotaxane |
| AII-1 | PEG | 20,000 | α-Cyclodextrin | 0.25 | ε-Caprolactone | 0.5 | pKa = 10 100% | 650 | 477,000 |
| AII-2 | PEG | 10,000 | α-Cyclodextrin | 0.25 | ε-Caprolactone | 0.5 | pKa = 10 100% | 650 | 239,000 |
| AII-3 | PEG | 20,000 | α-Cyclodextrin | 0.25 | ε-Caprolactone | 0.5 | pKa = 10 100% | 2,500 | 1,900,000 |
| AII-4 | PEG | 20,000 | α-Cyclodextrin | 0.25 | ε-Caprolactone | 0.5 | pKa = 9.3 100% | 700 | 500,000 |
| AII-5 | PEG | 20,000 | α-Cyclodextrin | 0.25 | ε-Caprolactone | 0.5 | pKa = 12.5 100% | 650 | 477,000 |
| AII-6 | PEG | 90,000 | α-Cyclodextrin | 0.25 | ε-Caprolactone | 0.5 | pKa = 10 100% | 400 | 1,500,000 |
| AII-7 | PEG | 20,000 | α-Cyclodextrin | 0.25 | ε-Caprolactone | 0.5 | pKa = 10/pKa = 15.5 50%/50% | 600 | 439,000 |
| AII-8 | PEG | 20,000 | α-Cyclodextrin | 0.25 | ε-Caprolactone | 0.5 | pKa = 10/pKa = 15.5 90%/10% | 650 | 470,000 |

Photochromic compound (D): PC1:

[Formula 19]

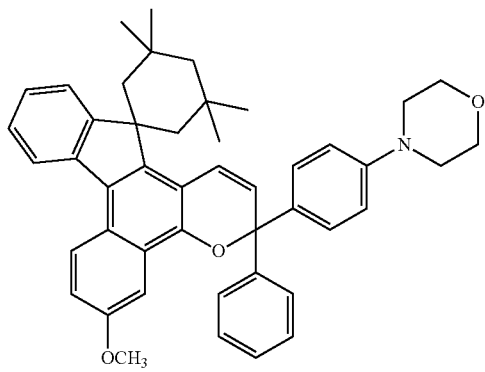

(F) Polymerization curing accelerator:
Reaction catalyst for urethane or urea:
DBTD: dibutyltin dilaurate
(G) Internal mold release agent:
DBP: di-n-butyltin
PA2EE: phosphoric acid 2-ethylhexyl (mono- and di- mixture)
Other blends
Stabilizer:
HALS: bis(1,2,2,6,6-pentamethyl-4-piperidyl)sebacate (molecular weight: 508)

Example I-1

A homogeneous liquid (optical composition) was prepared by mixing each component according to the following formulation. Each blending amount is shown in Table 3.
Formulation:
(A) Polyrotaxane: 8 parts by mass of AI-1
(B) Polyisocyanate compound: 47 parts by mass of NBDI
(C) Poly(thi)ol compound: 20 parts by mass of PL1, 16 parts by mass of TMP,
Mono(thi)ol compound: 9 parts by mass of PGME10
(D) Photochromic compound: 0.04 part by mass of PC1
(H) Internal mold release agent: 0.3 part by mass of PA2EE (based on a total amount of the mixture)
(Other blends): 0.1 part by mass of HALS A photochromic cured body was obtained according to a kneading method by using the optical composition. A polymerization method is described below.

More specifically, the homogeneous liquid was sufficiently defoamed, and then cast into two kinds of mold forms, including a glass mold designed to be 2 mm and 10 mm in a thickness of a cured body obtained, and a casting mold formed of a gasket composed of an ethylene-vinyl acetate copolymer. Subsequently, while a temperature was gradually raised from 30° C. to 100° C., the composition was cured in 15 hours. After completion of polymerization, a photochromic cured body was removed from the glass mold of the form to obtain the photochromic cured bodies having a thickness of 2 mm and a thickness of 10 mm. Photochromic characteristics, Rockwell hardness L scale (HL), moldability and cloudiness of the photochromic cured body (2 mm-thick) obtained were evaluated. As a result, a maximum absorption wavelength was 577 nm, color optical density was 0.89, a color fading rate was 52 seconds, Rockwell hardness L scale (HL) was 77, moldability-1 was 1, and cloudiness-1 was 1. Moreover, moldability and cloudiness of the photochromic cured body (10 mm-thick) were evaluated. As a result, moldability-2 was 1, and cloudiness-2 was 1. In addition, the maximum absorption wavelength, the color optical density, the color fading rate, the Rockwell hardness L scale, the moldability-1 and the moldability-2, and the cloudiness-1 and the cloudiness-2 were evaluated according to the methods described below.

[Evaluation Itemsx]

(1) Maximum absorption wavelength ($\lambda$max): A maximum absorption wavelength after color development, which was determined using Spectrophotometer (Instantaneous Multi Channel Photo Detector MCPD1000), manufactured by Otsuka Electronics Co., Ltd., after a photochromic cured body (2 mm-thick) obtained was applied as a sample, and irradiated with light having a beam intensity of 2.4 mW/cm$^2$ at 365 nm and 24 $\mu$W/cm$^2$ at 245 nm on a surface of the cured body at 20° C.±1° C. for 120 seconds through Aero Mass Filter (manufactured by Corning Corporation) by using Xenon Lamp L-2480 (300 W) SHL-100 manufactured by Hamamatsu Photonics K. K. to develop color. The maximum absorption wavelength relates to a color tone during color development.

(2) Color optical density $\{\varepsilon(120)-\varepsilon(0)\}$: A difference between, at the maximum absorption wavelength, an absorbance ($\varepsilon(120)$) after irradiation with light for 120 seconds and an absorbance ($\varepsilon(0)$) before irradiation with light. As this value is higher, the photochromism may be reasonably referred to as being superb. Moreover, when the color was developed outdoors, a coloring tone was visually evaluated.

(3) Color fading rate [t1/2(sec)]: A time required for reduction to one half of $\{\varepsilon(120)-\varepsilon(0)\}$ in the absorbance at the maximum absorption wavelength of the sample upon irradiating the sample with light for 120 seconds and then stopping the irradiation with light. As this time is shorter, the photochromism may be reasonably referred to as being superb.

(4) Rockwell hardness L scale (HL): Rockwell harness L scale of the photochromic cured body (2 mm-thick) was measured using Akashi Rockwell Hardness Tester (Model: AR-10) after the cured body (2 mm-thick) was kept at 25° C. for one day in a room.

(5) Moldability-1:
Optical strain of the photochromic cured body (2 mm-thick) was visually observed. Evaluation criteria are as described below.
1: Free from optical strain
2: Optical strain partially observable in a half part or less of a lens
3: Optical strain observable wholly in a lens (6) Cloudiness-1:
Cloudiness of the photochromic cured body (2 mm-thick) was visually evaluated. Evaluation criteria are as described below.
1: Level having no problem as a product, and free from cloudiness or almost invisible
2: Level having no problem as a product, but somewhat cloudy
3: Level having no problem as a product, but stronger in cloudiness than the level 2
4: Cloudy, and unusable as a product (7) Moldability-2:
Optical strain of the cured body (10 mm-thick) was evaluated using a high-pressure mercury lamp. More specifically, a surface of the cured body (10 mm-thick) was irradiated with light from the high-pressure mercury lamp, and moldability was evaluated by visually observing a projection thereof. Evaluation criteria are as described below.

1: Free from optical strain
2: Optical strain partially observable in a half part or less of a lens
3: Optical strain observable in a half part or more of a lens
4: Optical strain observable wholly in a lens (8) Cloudiness-2:

Cloudiness of the cured body (10 mm-thick) was evaluated using a high-pressure mercury lamp. More specifically, a side surface of the cured body (10 mm-thick) was irradiated with light from the high-pressure mercury lamp, and a degree of cloudiness was evaluated by visually observing the cured body (10 mm-thick) from the surface. Evaluation criteria are as described below.

1: Free from cloudiness or almost invisible
2: Level having no problem as a product, but somewhat cloudy
3: Level having no problem as a product, but stronger in cloudiness than the level 2
4: Cloudy, and unusable as a product Example I-2 to I-11, Comparative Examples I-1 to I-3

A photochromic cured body was prepared in the same manner as in Example I-1 except that a photochromic optical composition having a formulation shown in Table 3 was used, and the resulting material was evaluated. The results were shown in Table 4. Moreover, the photochromic compound (D) component was not added thereto in Example I-11 and Comparative Example 1-3, and therefore the photochromic characteristics were not measured. Moreover, moldability-1 and cloudiness-1 were evaluated with reference to Patent literature 8.

TABLE 3

| No. | (A) Component (parts by mass) | (B) Component (parts by mass) | (C) Component (parts by mass) | (D) Component | (F) Component | (G) Component | Other blends |
|---|---|---|---|---|---|---|---|
| Example I-1 | AI-1 (8) | NBDI (47) | PL1 (20)/TMP (16)/PGME10 (9) | PC1 (0.04) | — | PA2EE (0.3) | HALS (0.1) |
| Example I-2 | AI-2 (10) | NBDI (36) | PNT-40 (19)/PL1 (24)/PGME10 (11) | PC1 (0.04) | — | PA2EE (0.3) | — |
| Example I-3 | AI-5 (12) | NBDI (52) | PL1 (16)/TMP (20) | PC1 (0.04) | — | PA2EE (0.3) | HALS (0.1) |
| Example I-4 | AI-3 (16) | XDI (37) | PEMP (47) | PC1 (0.04) | DBTD (0.1) | DBP (0.3) | — |
| Example I-5 | AI-4 (5) | XDI (40) | DPMP (50)/3-MBMA (5) | PC1 (0.04) | DBTD (0.1) | DBP (0.3) | — |
| Example I-6 | AI-6 (2) | XDI (39) | DPMP (48)/1-DT (11) | PC1 (0.04) | DBTD (0.1) | DBP (0.3) | HALS (0.1) |
| Example I-7 | AI-7 (5) | XDI (40) | PEMP (46)/EGMP-4 (9) | PC1 (0.04) | DBTD (0.1) | DBP (0.3) | — |
| Example I-8 | AI-6 (5) | XDI (39) | DPMP (46)/EGMP-4 (5)/3-MBMA (5) | PC1 (0.04) | DBTD (0.1) | DBP (0.3) | HALS (0.1) |
| Example I-9 | AI-8 (9) | XDI (39) | PEMP (43)/1-DT (9) | PC1 (0.04) | DBTD (0.1) | — | — |
| Example I-10 | AI-9 (7) | NBDI (55) | PL1 (17)/TMP (21) | PC1 (0.04) | — | PA2EE (0.3) | — |
| Example I-11 | AI-1 (6) | XDI (40) | DPMP (54) | — | DBTD (0.1) | DBP (0.3) | — |
| Comparative Example I-1 | — | NBDI (47) | PL1 (20)/TMP (16)/PGME10 (9)/PRX (8) | PC1 (0.04) | — | PA2EE (0.3) | — |
| Comparative Example I-2 | — | XDI (39) | DPMP (46)/EGMP-4 (5)/3-MBMA (5)/PRX (5) | PC1 (0.04) | DBTD (0.1) | DBP (0.3) | HALS (0.1) |
| Comparative Example I-3 | — | XDI (36) | DPMP (50)/PRX (14) | — | DBTD (0.1) | DBP (0.3) | HALS (0.1) |

TABLE 4

| No. | Maximum absorption wavelength ($\lambda$max) | Color optical density | Color fading rate (second) | HL | Moldability-1 | Cloudiness-1 | Moldability-2 | Cloudiness-2 |
|---|---|---|---|---|---|---|---|---|
| Example I-1 | 577 | 0.89 | 52 | 77 | 1 | 1 | 1 | 1 |
| Example I-2 | 578 | 0.92 | 48 | 77 | 1 | 1 | 1 | 1 |
| Example I-3 | 579 | 0.78 | 55 | 95 | 1 | 1 | 2 | 1 |
| Example I-4 | 585 | 0.64 | 53 | 99 | 1 | 1 | 2 | 2 |
| Example I-5 | 584 | 0.79 | 51 | 76 | 1 | 1 | 1 | 1 |
| Example I-6 | 584 | 0.57 | 55 | 88 | 1 | 1 | 1 | 1 |
| Example I-7 | 590 | 0.58 | 72 | 82 | 1 | 1 | 2 | 1 |
| Example I-8 | 585 | 0.88 | 50 | 75 | 1 | 1 | 1 | 1 |
| Example I-9 | 584 | 0.60 | 52 | 84 | 1 | 1 | 1 | 2 |
| Example I-10 | 579 | 0.74 | 56 | 96 | 1 | 1 | 2 | 1 |
| Example I-11 | — | — | — | 110 | 1 | 1 | 1 | 1 |

TABLE 4-continued

| No. | Maximum absorption wavelength (λmax) | Color optical density | Color fading rate (second) | HL | Moldability-1 | Cloudiness-1 | Moldability-2 | Cloudiness-2 |
|---|---|---|---|---|---|---|---|---|
| Comparative Example I-1 | 576 | 0.90 | 48 | 75 | 1 | 1 | 4 | 1 |
| Comparative Example I-2 | 584 | 0.88 | 48 | 73 | 1 | 1 | 3 | 3 |
| Comparative Example I-3 | — | — | — | 85 | 1 | 2 | 3 | 4 |

Example II-1

A homogeneous liquid (optical composition) was prepared by mixing each component according to the following formulation. Each blending amount is shown in Table 5.
Formulation:
(A) Polyrotaxane: 8 parts by mass of AII-1
(B) Polyisocyanate compound: 47 parts by mass of NBDI
(C) Poly(thi)ol compound: 22 parts by mass of PL1, 16 parts by mass of TMP,
Mono(thi)ol compound: 7 parts by mass of PGME10
(D) Photochromic compound: 0.04 part by mass of PC1
(H) Internal mold release agent: 0.3 part by mass of PA2EE
(Other blends): 0.1 part by mass of HALS A photochromic cured body was obtained according to a kneading method by using the optical composition. A polymerization method will be described below.

More specifically, the homogeneous liquid was sufficiently defoamed, and then cast into two kinds of mold forms, including a glass mold designed to be 2 mm and 10 mm in a thickness of a cured body obtained, and a casting mold formed of a gasket composed of an ethylene-vinyl acetate copolymer. Next, while a temperature was gradually raised from 30° C. to 100° C., the composition was cured in 15 hours. After completion of polymerization, a photochromic cured body was removed from the glass mold of the form to obtain the photochromic cured bodies having a thickness of 2 mm and a thickness of 10 mm. Photochromic characteristics, Rockwell hardness L scale (HL), moldability and cloudiness of the photochromic cured body (2 mm-thick) obtained were evaluated. As a result, a maximum absorption wavelength was 579 nm, color optical density was 0.90, a color fading rate was 54 seconds, Rockwell hardness L scale (HL) was 80, moldability-1 was 1 and cloudiness-1 was 1. Moreover, moldability and cloudiness of the photochromic cured body (10 mm-thick) were evaluated. As a result, moldability-2 was 1 and cloudiness-2 was 1. In addition, the maximum absorption wavelength, the color optical density, the color fading rate, the Rockwell hardness L scale, the moldability-1 and the moldability-2, and the cloudiness-1 and the cloudiness-2 were evaluated according to the methods described above.

Examples II-2 to II-8, Comparative Examples II-1 to II-3

A photochromic cured body was prepared in the same manner as in Example II-1 except that a photochromic optical composition having a formulation shown in Table 5 was used, and the resulting material was evaluated. The results were shown in Table 6. Moreover, the photochromic compound (D) component was not added thereto in Example II-7 and Comparative Example II-3, and therefore the photochromic characteristics were not measured. Moreover, moldability-1 and cloudiness-1 were evaluated with reference to Patent literature 8.

In addition, experiments in Comparative Examples I-1 to I-3 are the same experiments in Comparative Examples II-1 to II-3, respectively.

TABLE 5

| No. | (A) Component (parts by mass) | (B) Component (parts by mass) | (C) Component (parts by mass) | (D) Component | (F) Component | (G) Component | Other blends |
|---|---|---|---|---|---|---|---|
| Example II-1 | AII-1 (8) | NBDI (47) | PL1 (22)/TMP (16)/PGME 10 (7) | PC1 (0.04) | — | PA2EE (0.3) | HALS (0.1) |
| Example II-2 | AII-2 (5) | NBDI (38) | PNT-40 (20)/PL1 (25)/PGME10 (12) | PC1 (0.04) | — | PA2EE (0.3) | — |
| Example II-3 | AII-3 (8) | XDI (40) | PEMP (48)/3-MBMA (4) | PC1 (0.04) | DBTD (0.1) | DBP (0.3) | HALS (0.1) |
| Example II-4 | AII-4 (5) | XDI (40) | DPMP (45)/PEMP (10) | PC1 (0.04) | DBTD (0.1) | DBP (0.3) | — |
| Example II-5 | AII-5 (12) | HXDI (49) | PL1 (20)/TMP (19) | PC1 (0.04) | — | PA2EE (0.3) | HALS (0.1) |
| Example II-6 | AII-6 (8) | XDI (39) | PEMP (48)/EGMP-4 (6) | PC1 (0.04) | DBTD (0.1) | DBP (0.3) | HALS (0.1) |
| Example II-7 | AII-7 (5) | XDI (42) | PEMP (53) | — | DBTD (0.1) | DBP (0.3) | — |
| Example II-8 | AII-8 (4) | XDI (40) | DPMP (23)/EGMP-4 (7)/PEMP (24)/3-MBMA (2) | PC1 (0.04) | DBTD (0.1) | DBP (0.3) | HALS (0.1) |
| Comparative Example II-1 | — | NBDI (47) | PL1 (20)/TMP (16)/PGME10 (9)/PRX (8) | PC1 (0.04) | — | PA2EE (0.3) | — |
| Comparative Example II-2 | — | XDI (39) | DPMP (46)/EGMP-4 (5)/3-MBMA (5)/PRX (5) | PC1 (0.04) | DBTD (0.1) | DBP (0.3) | HALS (0.1) |
| Comparative Example II-3 | — | XDI (36) | DPMP (50)/PRX (14) | — | DBTD (0.1) | DBP (0.3) | HALS (0.1) |

TABLE 6

| No. | Maximum absorption wavelength (λmax) | Color optical density | Color fading rate (second) | HL | Moldability-1 | Cloudiness-1 | Moldability-2 | Cloudiness-2 |
|---|---|---|---|---|---|---|---|---|
| Example II-1 | 579 | 0.90 | 54 | 80 | 1 | 1 | 1 | 1 |
| Example II-2 | 580 | 0.91 | 49 | 79 | 1 | 1 | 1 | 1 |
| Example II-3 | 589 | 0.84 | 55 | 97 | 1 | 1 | 2 | 2 |
| Example II-4 | 585 | 0.70 | 60 | 93 | 1 | 1 | 1 | 1 |
| Example II-5 | 578 | 0.71 | 54 | 100 | 1 | 1 | 2 | 1 |
| Example II-6 | 584 | 0.58 | 52 | 85 | 1 | 1 | 1 | 2 |
| Example II-7 | — | — | — | 105 | 1 | 1 | 1 | 2 |
| Example II-8 | 588 | 0.88 | 50 | 75 | 1 | 1 | 1 | 1 |
| Comparative Example II-1 | 576 | 0.90 | 48 | 75 | 1 | 1 | 4 | 1 |
| Comparative Example II-2 | 584 | 0.88 | 48 | 73 | 1 | 1 | 3 | 3 |
| Comparative Example II-3 | — | — | — | 85 | 1 | 2 | 3 | 4 |

Example I-12

A homogeneous liquid (optical composition) was prepared by mixing each component according to the following formulation. Each blending amount is shown in Table 7.
Formulation:
(A) Polyrotaxane: 12 parts by mass of AI-1
(B) Polyisocyanate compound: 37 parts by mass of XDI
(C) Poly(thi)ol compound: 38 parts by mass of DPMP, Mono(thi)ol compound: 13 parts by mass of 1-DT
(D) Photochromic compound: 0.04 part by mass of PC1
(F) Polymerization curing accelerator: 0.001 part by mass of DBTD: dibutyltin dilaurate (based on a total amount of the mixture)
(Other blends): 0.1 part by mass of HALS
A photochromic laminate was obtained according to a coating method by using the optical composition. A polymerization method is described below.

As an optical base material, a thiourethane-based plastic lens having a center thickness of about 2 mm, a spherical power of −6.00 D, and a refractive index of 1.60 was arranged. In addition, with regard to this thiourethane-based plastic lens, alkali etching was applied thereto in advance at 50° C. for 5 minutes by using a 10% sodium hydroxide aqueous solution, and then the resulting material was sufficiently washed with distilled water.

A photochromic coating composition was added dropwise onto a surface of the plastic lens rotated at 2,000 rpm by using Spin Coater (1H-DX2, manufactured by MIKASA, Co., Ltd.). Then, a photochromic laminate was obtained by heating the resulting material at 120° C. for 1 hour to cause polymerization curing. A film thickness of a photochromic layer was about 30 μm.

In the photochromic laminate obtained, a maximum absorption wavelength was 586 nm, color optical density was 0.93, a color fading rate was 50 seconds, Vickers hardness was 7, moldability-1 was 1 and cloudiness-1 was 1. Moreover, moldability and cloudiness of the photochromic cured body (10 mm-thick) were evaluated. As a result, moldability-2 was 1, and cloudiness-2 was 1. In addition, the maximum absorption wavelength, the color optical density, the color fading rate, the moldability-1 and the moldability-2, and the cloudiness-1 and the cloudiness-2 were evaluated by the same methods as the methods in Example 1 or the like, and the Vickers hardness was evaluated by the method described below. These measured values were shown in Table 8.

(9) Vickers hardness: Vickers hardness of the photochromic layer obtained was measured using Micro Vickers Hardness Testing Machine PMT-X7A (manufactured by Matsuzawa Co., Ltd.). The hardness was evaluated by using a rectangular pyramid-type diamond indenter as an indenter and under conditions of a load of 10 gf and an indenter's retention time of 30 seconds. Measurements four times in total were carried out, a first value having a large measurement error was excluded, and the measurement results were shown in terms of a mean value of measurements three times.

Example II-9

A photochromic cured body was prepared in the same manner as in <Example I-12> except that a photochromic optical composition having a formulation shown in Table 7 was used, and was evaluated. The results were shown in Table 8.

TABLE 7

| No. | (A) Component (parts by mass) | (B) Component (parts by mass) | (C) Component (parts by mass) | (D) Component | (F) Component | Other blends |
|---|---|---|---|---|---|---|
| Example I-12 | AI-1 (12) | XDI (37) | DPMP (38)/1-DT (13) | PC1 (0.04) | DBTD (0.001) | HALS (0.1) |
| Example II-9 | AII-1 (9) | XDI (46) | PEMP (35)/PGME10 (10) | PC1 (0.04) | DBTD (0.001) | HALS (0.1) |

TABLE 8

| No. | Maximum absorption wavelength (λmax) | Color optical density | Color fading rate (second) | Moldability-1 | Cloudiness-1 | Moldability-2 | Cloudiness-2 | Vickers hardness |
|---|---|---|---|---|---|---|---|---|
| Example I-12 | 586 | 0.93 | 46 | 1 | 1 | 1 | 1 | 7 |
| Example II-9 | 593 | 0.85 | 49 | 1 | 1 | 1 | 1 | 9 |

As is evident from the Examples and the Comparative Examples described above, the cured body obtained by polymerizing the optical composition according to the present invention has excellent moldability and mechanical strength, and further reduced cloudiness. Moreover, when the photochromic compound is added thereto, the cured body is excellent in the photochromic characteristics in addition to the physical properties described above.

In contrast, in Comparative Examples I-1 and I-2, while the photochromic characteristics, the moldability-1, the cloudiness-1 and the like were satisfactory, the evaluation results of the moldability-2 and the cloudiness-2, which were severer, were insufficient. Moreover, also in Comparative Example 3, the evaluation results of the moldability-2 and the cloudiness-2 were insufficient.

Moreover, the optical composition according to the present invention can also be applied to the coating method.

REFERENCE SIGNS LIST

1: Polyrotaxane
2: Axle molecule
3: Cyclic molecule
4: Bulky end group
5: Side chain having a secondary or tertiary hydroxyl group

The invention claimed is:

1. An optical composition, comprising a polyrotaxane, wherein the polyrotaxane comprises a composite molecular structure formed of an axle molecule and a plurality of cyclic molecules clathrating the axle molecule, wherein the polyrotaxane satisfies at least one of requirements (X) and (Y):

requirement (X): a side chain having a secondary or tertiary hydroxyl group is introduced into at least part of the cyclic molecule of the polyrotaxane; and requirement (Y): a side chain having a group represented by the following formula (1):

-A  (1)

wherein, A is an organic group having 1 to 10 carbon atoms and contains at least one hydroxyl group is introduced into at least part of the cyclic molecule of the polyrotaxane; and a pKa of a hydroxyl group of a compound represented by the following formula (2):

H-A  (2)

is 6 or more and less than 14, wherein the side chain having the secondary or tertiary hydroxyl group comprises a structure represented by the following formula (1) or formula (1'):

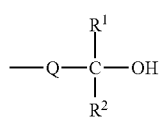

(1)

wherein, Q is formed of at least one kind selected from structures represented by the following formulas (Q-2) and (Q-3):

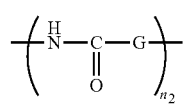

(Q-2)

(Q-3)

wherein, G in the formula (Q-2) is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond, or a —SiO— bond; or an alkylene group formed by replacement of a part of hydrogen of the alkylene group by at least one kind selected from the group consisting of a hydroxyl group, a carboxyl group, an acyl group, a phenyl group, a halogen atom, and an olefin group, and G in the formula (Q-3) is a straight-chain alkylene group having 3 to 8 carbon atoms or a straight-chain alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond, or a —SiO— bond;

or an alkylene group formed by replacement of a part of hydrogen of the alkylene group by at least one kind selected from the group consisting of a hydroxyl group, a carboxyl group, an acyl group, a phenyl group, a halogen atom, and an olefin group, and when a plurality of G exist, each G may be a same group or a different group, and $n_2$ and $n_3$ are each independently an integer from 1 to 200, and when Q is formed of two or more kinds selected from the formulas (Q-2) and (Q-3), G constituting (Q-2) and (Q-3) may be a same group or a different group, a total of $n_2$ and $n_3$ is an integer from 1 to 200, $R^1$ and $R^2$ are each independently a group selected from hydrogen, a straight-chain alkyl group having 1 to 6 carbon atoms and a branched-chain alkyl group having 1 to 6 carbon atoms, excluding a group in which $R^1$ and $R^2$ are simultaneously hydrogen,

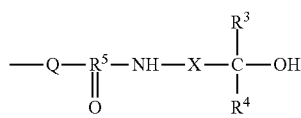
(1')

wherein, Q is formed of at least one kind selected from structures represented by the following formulas (Q-1), (Q-2), and (Q-3):

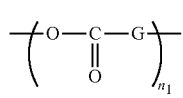
(Q-1)

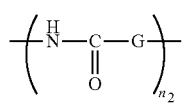
(Q-2)

(Q-3)

wherein, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond, or a —SiO— bond; or an alkylene group formed by replacement of a part of hydrogen of the alkylene group by at least one kind selected from the group consisting of a hydroxyl group, a carboxyl group, an acyl group, a phenyl group, a halogen atom, and an olefin group, and when a plurality of G exist, each G may be a same group or a different group, and $n_1$, $n_2$, $n_3$ are each independently an integer from 1 to 200, and when Q is formed of two or more kinds selected from the formulas (Q-1), (Q-2), and (Q-3), G constituting (Q-1) to (Q-3) may be a same group or a different group, a total of $n_1$, $n_2$, and $n_3$ is an integer from 1 to 200, X is an alkylene group or alkenylene group having 2 to 20 carbons, or an alkylene group or alkenylene group formed by replacement of a part of the alkylene group or alkenylene group by a —O— bond or a —NH— bond; $R^3$ and $R^4$ are each independently selected from hydrogen, a straight-chain alkyl group having 1 to 6 carbon atoms or a branched-chain alkyl group having 1 to 6 carbon atoms, excluding a group in which $R^3$ and $R^4$ are simultaneously hydrogen; and $R^5$ is carbon or sulfur, when the polyrotaxane satisfies requirement (Y), a side chain represented by the following formula (3) or formula (3') is introduced into at least part of the cyclic molecule:

-Q-A    (3)

wherein, Q is formed of at least one kind selected from structures represented by the following formulas (Q-1), (Q-2) and (Q-3):

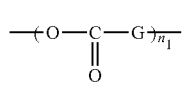
(Q-1)

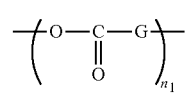
(Q-2)

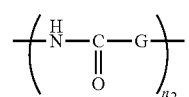
(Q-3)

wherein, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond or a —SiO— bond, or an alkylene group formed by replacement of a part of hydrogen of the alkylene group by at least one kind selected from the group consisting of a carboxyl group, an acyl group, a phenyl group, a halogen atom and an olefin group, and when a plurality of G exist, each G may be a same group or a different group, and $n_1$, $n_2$ and $n_3$ are each independently an integer from 1 to 200, and when Q is formed of two or more kinds selected from the formulas (Q-1), (Q-2) and (Q-3), G constituting (Q-1) to (Q-3) may be a same group or a different group, a total of $n_1$, $n_2$ and $n_3$ is an integer from 1 to 200, and A is an organic group having 1 to 10 carbon atoms, and contains at least one hydroxyl group,

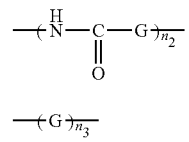
(3')

wherein, Q is formed of at least one kind selected from structures represented by the following formulas (Q-1), (Q-2) and (Q-3):

[Formula 7]

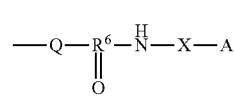
(Q-1)

(Q-2)

(Q-3)

wherein, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond or a —SiO— bond; or an alkylene group formed by replacement of a part of hydrogen of the alkylene group by at least one kind selected from the group consisting of a carboxyl group, an acyl group, a phenyl group, a halogen atom and an olefin group, and when a plurality of G exist, each G may be a same group or a different group, and $n_1$, $n_2$ and $n_3$ are each independently an integer from 1 to 200, and when Q is formed of two or more kinds selected from the formulas (Q-1), (Q-2) and (Q-3), G constituting (Q-1) to (Q-3) may be a same group or a different group, a total of $n_1$, $n_2$ and $n_3$ is an integer from 1 to 200, and $R^6$ is carbon or sulfur, X is an alkylene group or alkenylene group having 2 to 20 carbons; or an alkylene group or alkenylene group formed by replacement of a part of the alkylene group or alkenylene group by a —O— bond or a —NH— bond, and A is an organic group having 1 to 10 carbon atoms and contains at least one hydroxyl group.

2. The optical composition according to claim 1, further comprising a compound (B) having two or more groups of at least one kind of group selected from an isocyanate group and an isothiocyanate group in one molecule.

3. The optical composition according to claim 2, further comprising an iso(thio)cyanate reactive group-containing compound (C).

4. The optical composition according to claim 3, further comprising a photochromic compound (D).

5. The optical composition according to claim 2, further comprising a photochromic compound (D).

6. The optical composition according to claim 1, further comprising an iso(thio)cyanate reactive group-containing compound (C).

7. The optical composition according to claim 3, further comprising a photochromic compound (D).

8. The optical composition according to claim 1, further comprising a photochromic compound (D).

9. The optical composition according to claim 1, wherein the polyrotaxane satisfies the requirement (X).

10. The optical composition according to claim 9, wherein a proportion of a primary hydroxyl group is 50% or less, when the total mole number of primary, secondary and tertiary hydroxyl groups of the side chain is taken as 100%.

11. The optical composition according to claim 1, wherein the polyrotaxane satisfies the requirement (Y).

12. The optical composition according to claim 11, wherein a proportion of a hydroxyl group having a pKa of less than 6 or 14 or more is 50% or less, when the total mole number of the hydroxyl groups of the side chain is taken as 100%.

13. The optical composition according to claim 1, wherein a ring contained in the cyclic molecule of the polyrotaxane is a cyclodextrin ring.

14. The optical composition according to claim 1, wherein the axle molecule threading through an inside of the ring of the cyclic molecule has a chain structure having bulky groups at both ends, a chain portion is formed of polyethylene glycol, and the bulky groups at both ends each is an adamantyl group.

15. The optical composition according to claim 1, wherein the Q is not formed of structures represented by the following formula (Q-1):

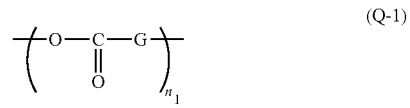

wherein, G is a straight-chain alkylene group or alkenylene group having 1 to 8 carbon atoms; a branched-chain alkylene group or alkenylene group having 3 to 20 carbon atoms; an alkylene group or alkenylene group formed by replacement of a part of the alkylene group or alkenylene group by a —O— bond, a —NH— bond, a —SO— bond, or a —SiO— bond; or an alkylene group formed by replacement of a part of hydrogen of the alkylene group by at least one kind selected from the group consisting of a hydroxyl group, a carboxyl group, an acyl group, a phenyl group, a halogen atom, and an olefin group, and when a plurality of G exist, each G may be a same group or a different group, and n1 is independently an integer from 1 to 200.

* * * * *